United States Patent [19]

Shimizu et al.

[11] Patent Number: 5,762,826
[45] Date of Patent: Jun. 9, 1998

[54] LIQUID CRYSTAL COMPOSITION AND A LIQUID CRYSTAL DISPLAY ELEMENT WHICH CONTAINS IT

[75] Inventors: Takaaki Shimizu; Tatsushi Kaneko; Tsutomu Ogihara; Takeshi Kinsho; Kazuyuki Asakura; Mutsuo Nakashima, all of Nigata-ken, Japan

[73] Assignee: Shin-Etsu Chemical Co., Ltd., Tokyo, Japan

[21] Appl. No.: 576,319

[22] Filed: Dec. 21, 1995

[30] Foreign Application Priority Data

Dec. 22, 1994 [JP] Japan .................. 6-336184
Dec. 22, 1994 [JP] Japan .................. 6-336185

[51] Int. Cl.$^6$ .................. C09K 19/34; C09K 19/30
[52] U.S. Cl. .................. 252/299.61; 252/299.63; 556/406
[58] Field of Search .................. 252/299.61, 299.63; 556/406

[56] References Cited

U.S. PATENT DOCUMENTS

| | | | |
|---|---|---|---|
| 5,454,977 | 10/1995 | Shimizu et al. | 252/299.61 |
| 5,560,866 | 10/1996 | Ogihara et al. | 252/299.61 |
| 5,567,350 | 10/1996 | Shimizu et al. | 252/299.61 |
| 5,573,705 | 11/1996 | Kaneko et al. | 252/299.61 |
| 5,578,244 | 11/1996 | Shimizu et al. | 252/299.61 |
| 5,582,764 | 12/1996 | Nakashima et al. | 252/299.61 |
| 5,582,765 | 12/1996 | Kinsho et al. | 252/299.61 |
| 5,595,686 | 1/1997 | Shimizu et al. | 252/299.61 |
| 5,624,601 | 4/1997 | Shimizu et al. | 252/299.61 |
| 5,641,430 | 6/1997 | Nakashima et al. | 252/299.61 |

FOREIGN PATENT DOCUMENTS

| | | |
|---|---|---|
| A0665232 | 1/1994 | European Pat. Off. |
| A0630903 | 12/1994 | European Pat. Off. |
| A0648773 | 4/1995 | European Pat. Off. |
| A0659753 | 6/1995 | European Pat. Off. |
| A0668284 | 8/1995 | European Pat. Off. |
| A067322 | 9/1995 | European Pat. Off. |

*Primary Examiner*—Cynthia Harris Kelly
*Attorney, Agent, or Firm*—Townsend & Banta

[57] ABSTRACT

A liquid crystal composition comprising one or more types compounds represented by general formula II:

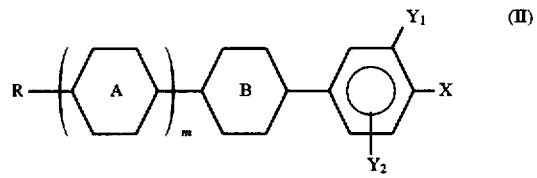

and one or more types of compounds selected from the group consisting of:

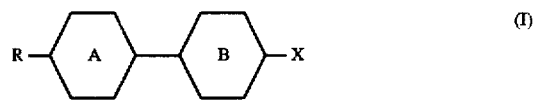

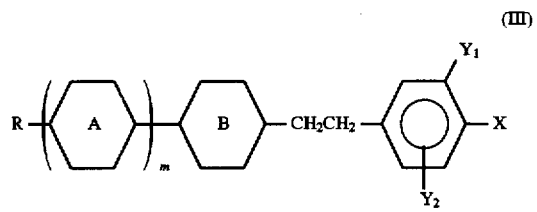

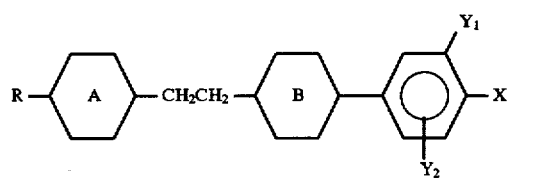

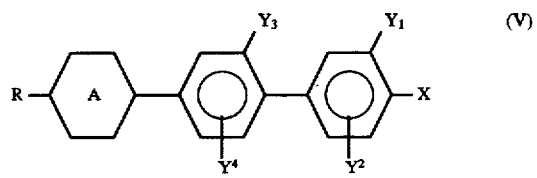

wherein R, rings A and B, X, Y1, Y2, Y3, Y4 and m are defined herein.

10 Claims, No Drawings

LIQUID CRYSTAL COMPOSITION AND A LIQUID CRYSTAL DISPLAY ELEMENT WHICH CONTAINS IT

RELATED APPLICATION

This application claims the priority of Japanese Patent applications No.6-36184 and No.6-336185 both filed on Dec. 22, 1994, which are incorporeted herein by reference.

BACKGROUND OF THE INVENTION

1. Field of the Invention

This invention relates to a liquid crystal composition for an active matrix containing as an ingredient at least one type of compound which has a silacyclohexane ring and a liquid crystal display element which contains it.

2. The Prior Art

A liquid crystal display element utilizes the optical anisotropy and dielectric anisotropy of liquid crystal substances. Display methods include the TN mode (twisted nematic mode), the STN mode (super twisted nematic mode), a-he SBE mode (super birefringence mode), the DS mode (dynamic scattering mode), the guest-host mode, the DAP mode ("deformation of aligned phase" mode) and the OMI mode (optical mode interference mode). The most common display device has a twisted nematic structure based on the Schadt-Helfrich mode.

The properties required of the liquid crystal substance used in these liquid crystal displays are somewhat different depending on the display method. However, a wide liquid crystal temperature range and stability with regard to moisture, air, light, heat, electric fields, etc., are properties commonly required by all display methods. Furthermore, it is desirable for the liquid crystal material to have a low viscosity, and also to have a short address time, low threshold voltage and high contrast in the cell(s).

Currently, there is no single compound which satisfies all these requirements. In practice, liquid crystal mixtures are used which are obtained by mixing several to more than ten liquid crystal compounds and latent liquid crystal compounds. Because of this, it is also important that the components of a liquid crystal composition mix easily.

For the display method, the TN (Twisted-Nematic) mode driven by an active matrix (AM) using the TFT (Thin Film Transistor) element array or the MIM (Metal Insulator Metal) element array is being increasingly adopted because of its image display quality (high minuteness, high contrast and fast response). This is because the DRAM manufacturing technology of the silicon semiconductor industry has been imported to the liquid crystal panel manufacturing technology and accelerated the cost reduction and technical progress.

The nematic liquid crystal substance used for this active matrix liquid crystal (AM-LCD) is required to have, in addition to those required characteristics mentioned above, a signal voltage retaining ability because of the reason intrinsic to its drive method. The signal voltage retaining ability refers to the degree of reduction of the signal voltage applied to the TFT pixel containing the liquid crystal within a given frame period. When there is no reduction in the signal voltage, i.e. when the voltage retaining ratio is 100%, the arrangement of the liquid crystal molecules is not dissolved and the reduction in contrast does not occur. The voltage retaining ability is also influenced by the environment in which the liquid crystal panel is used, and the characteristic life time tends to become shorter in an environment in which the panel is exposed to a high intensity light, such as in a liquid crystal panel for projection, and in an environment in which the panel is exposed to high temperatures, such as in an automobile onboard liquid crystal panel.

One of the disadvantages a liquid crystal panel has compared with a CRT is a limited angle of visibility. In order to improve this, most panels are designed using the first minimum with regard to retardation (dΔn). Δn is an anisotropy of refractive index. Because of this, liquid crystal materials with a relatively small Δn are required.

Reduction in the drive voltage, i.e. reduction in the threshold voltage of the liquid crystal composition can be achieved by increasing the anisotropy of the dielectric constant ($\Delta \epsilon$). From this point of view, various compositions for AM-LCD have been disclosed as compositions of liquid crystal compounds which have a core structure comprising a cyclohexane ring and a benzene ring and have a positive anisotropy of the dielectric constant ($\Delta \epsilon$) (Japanese unexamined patent publication Tokkai Hei 4-226589. Japanese unexamined patent publication Tokuhyo Hei 4-505477, Tokuhyo Hei 4-504880, Tokkai Hei 5-331464, Tokuhyo Hei 5-500680, Tokuhyo Hei 5-500681, Tokuhyo Hei 5-00682 and Tokuhyo Hei 6-501520).

In recent years, as a result of the functional improvements and the cost reduction of the liquid crystal displays, their applications are expanding more and more. Also, the introduction of multimedia and popularization of portable equipment demand liquid crystal displays with ever lower power and lower drive voltage.

As described above, since the drive voltage can be lowered by increasing the anisotropy of the dielectric constant ($\Delta \epsilon$), there have been various attempts to increase $\Delta \epsilon$ of conventional liquid crystal materials. However, so far no liquid crystal composition with a satisfactorily low threshold voltage has been obtained.

BRIEF SUMMARY OF THE INVENTION

The object of the invention is to provide a liquid crystal composition which has a wide temperature range of the nematic liquid crystal phase, a low viscosity, a fast response, compatibility between the liquid crystal compounds and stability with regard to moisture, air, light, heat and electric fields, as well as nematic stability at low temperatures, a high voltage retaining ability in harsh environments and a low threshold voltage for a low drive voltage in spite of a relatively small Δn.

The present invention in one aspect provides a liquid crystal composition which contains one or more types of compounds chosen from among a group of compounds represented by she following general formulas (I) through (V):

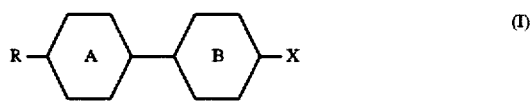

(I)

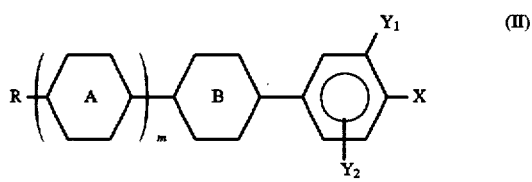

(II)

-continued

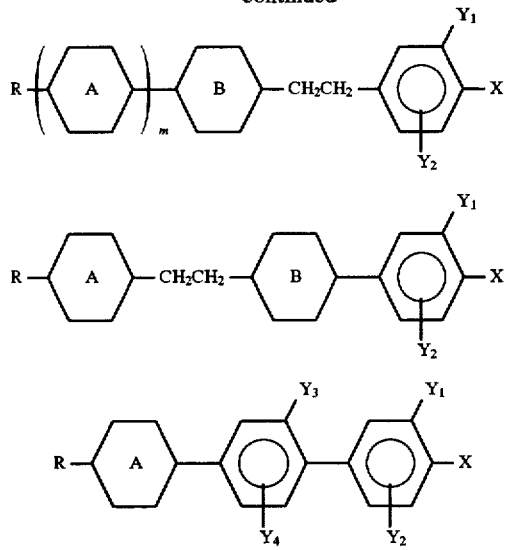

wherein R denotes an alkyl group with 1–7 carbons, an alkoxyalkyl group with 2–7 carbons, a mono- or di-fluoroalkyl group with 2–7 carbons or an alkenyl group with 2–7 carbons; m denotes 0 or 1;

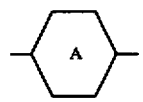

and

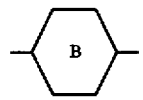

independently denote a trans-1-sila-1,4-cyclohexylene group, a trans-4-sila-1,4-cyclohexylene group or a trans-1, 4-cyclohexylene group; X denotes H, F, Cl OCHF$_2$, OCF$_3$, CF$_3$, OC$_k$H$_{2k+1}$(k denotes an integer of 1–5), C$_k$H$_{2k+1}$, (O)$_s$C$_p$H$_q$F$_r$ (p denotes 2,3 or 4 and q and r are integers which satisfy the equation q+r=2p+1, and s denotes 0 or 1), (O)$_s$CY=CX$_1$X$_2$ (X$_1$ and Y denote H, F or Cl, and X$_2$ denotes F or Cl) or an alkoxy or alkyl group with 5 or less carbons; Y$_1$, Y$_2$, Y$_3$ and Y$_4$ independently denote H or F; and at least one of the compounds contains a trans-1-sila -1,4 -cyclohexylene group or a trans-4-sila-1,4-cyclohexylene group.

The present invention also provides a liquid crystal composition mentioned above: wherein:

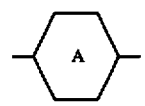

in the formula (V) and

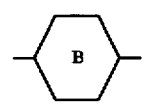

independently denote a trans-1-sila-1,4-cyclohexylene group or a trans-4-sila-1,4-cycloheaxylene group when m=0; and at least one of:

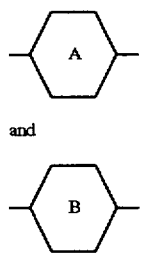

denotes a trans-1-sila-1,4-cyclohexylene group or a trans-4-sila-1,4-cyclohexylene group and the other denotes a trans-1,4-cyclohexylene group, a trans-4-sila-1,4-cyclohexylene group or a trans-1-sila-1,4-cyloheyaxlene group when m=1.

The present invention also provides a liquid crystal composition mentioned above: which contains one or more types of compounds chosen from among a group of compounds represented by the following general formulas (VI), (VII), (VIII) and (IX):

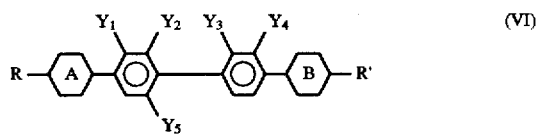

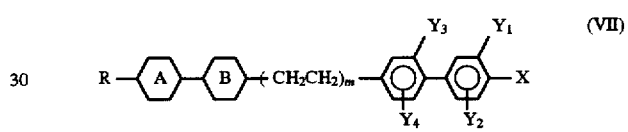

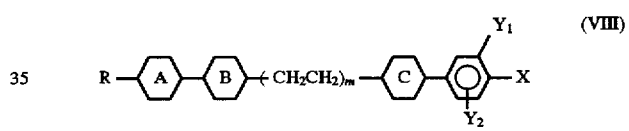

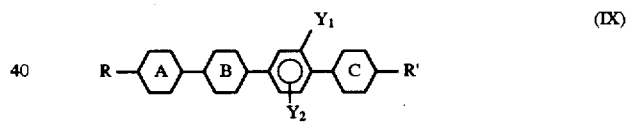

wherein the definitions of R, m and X are the same as those mentioned above;

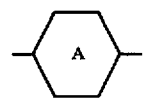

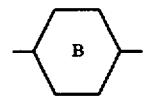

and

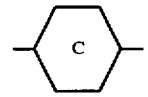

independently denote a trans-1-sila-1,4-cyclohexylene group, a trans-4-sila-1,4-cyclohexylene group or a trans-1, 4-cyclohexylene group, and at least one of them is a sila-cyclohexylene group. The definition of R' is the same as R. Y$_1$, Y$_2$, Y$_3$, Y$_4$, and Y$_5$ independently denote H or F).

The present invention also provides a liquid crystal composition mentioned above: wherein the blend ratios of one or more types of compounds chosen from among the compounds represented by the general formulas (I)–(IV) is 70–98 wt% in the composition.

The present invention also provides a liquid crystal display element which contains the liquid crystal composition mentioned above.

DETAILED DESCRIPTION

Further details of the present invention are described below.

The liquid crystal composition according to one aspect of the present invention contains at least one compound which includes at least one Si atom. The liquid crystal composition according to the other aspect of the present invention consists of one or more compounds any of which includes at least one Si atom.

Examples of the specific chemical structure of the compound represented by the general formula (I) follow:

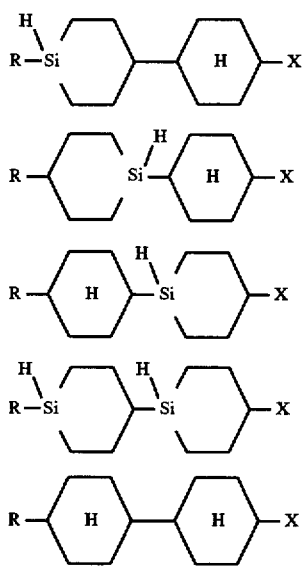

R denotes one of the following:

(a) A linear-chain alkyl group with a carbon number of 1–7, i.e. a methyl, ethyl, n-propyl, n-butyl, n-pentyl, n-hexyl or n-heptyl group;

(b) An alkoxyalkyl group with a carbon number of 2–7, i.e. a methoxymethyl, 2-methoxyethyl, 3-methoxypropyl, 4-methoxybutyl, 5-methoxypentyl, 6-methoxyhexyl, ethoxymethyl, 2-ethoxyethyl, 3-ethoxypropyl, 4-ethoxybutyl, 5-ethoxypentyl, (n-propoxy) methyl, 2-(n-propoxy) ethyl, 3-(n-propoxy) propyl, 4-(n-propoxy) butyl, (n-butoxy) methyl, 2- (n-butoxy) ethyl, 3- (n-butoxy) propyl, (n-pentoxy) methyl, 2-(n-pentoxy) ethyl or (n-hexyloxy) methyl group;

(c) A mono- or di-fluoroalkyl group with a carbon number of 2–7, i. e. 1-fluoroethyl, 1-fluoropropyl, 1-fluorobutyl, 1-fluoropentyl, 1-fluorohexyl, 1-fluoroheptyl, 2-fluoroethyl, 2-fluoropropyl, 2-fluorobutyl, 2-fluoropentyl, 2-fluorohexyl, 2-fluoroheptyl, 3-fluoropropyl, 3-fluorobutyl, 3-fluoropentyl, 3-fluorohexyl, 3-fluoroheptyl, 4-fluorobutyl, 4-fluoropentyl, 4-afluorohexyl, 4-fluoroheptyl, 5-fluoropentyl, 5-fluorohexyl, 5-fluoroheptyl, 6-fluorohexyl, 6-fluoroheptyl, 7-fluoroheptyl, 1,1-difluoroethyl, 1,1-difluoropropyl, 1,1-difluorobutyl, 1,1-difluoropentyl, 2,2-difluoroethyl, 2,2-difluoropropyl, 2,2-difluorobutyl, 2,2-difluoropentyl, 3,3-difluoropropyl, 3,3-difluorobutyl, 3,3-difluoropentyl, 4,4-difluorobutyl, 4,4-difluoropentyl or 5,5-difluoropentyl group; or (d) An alkenyl group with a carbon number of 2–7, i.e. a vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl, 5E-heptenyl, 5Z-heptenyl or 6-heptenyl group.

X denotes H, F, Cl, $OCHF_2$, $OCF_2$, $CF_4$, $C_kH_{2k+1}$ ($1 \leq k \leq 5$), $OC_kH_{2k+1}$ or $(O)_sC_pH_qF_r$, i. e. $CH_2CH_2F$, $CH_2CHF_2$, $CH_2CF_3$, $CH_2CH_2CF_3$, $CF_2CHFCF_3$, $OCH_2CH_2F$, $OCH_2CHF_2$, $OCH_2CF_3$, $OCH_2CH_2CHF_2$, $OCH_2CH_2CF_3$, $OCH_2CF_2CHF_2$, $OCH_2CF_2CF_3$, $OCF_2CHFCF_3$ or $OCF_2CF_3$ ; or $(O)_n$ $CY=CX_1X_2$, i.e. $-CH=CF_2$, $OCH=CF_2$, $CF=CFH$, $OCF=CFH$, $CF=CF_2$, $OCF=CF_2$, $CF=CHCl$, $CF=CCl_2$, $CCl=CHCl$ or $CH=CCl_2$.

Both the silacyclohexane ring and the cyclohexane ring have the trans configuration.

Examples of the specific chemical structure of the compound represented by the general formula (II) follow:

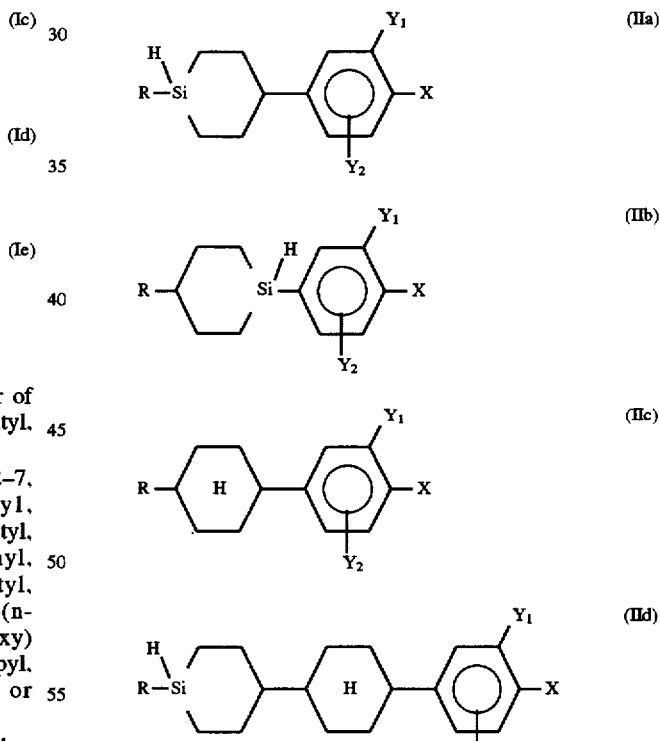

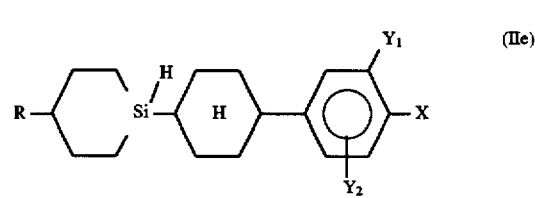

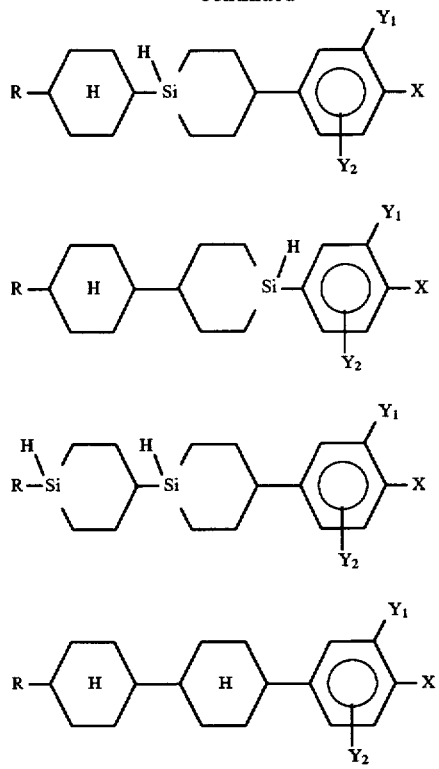
Both the silacyclohexane ring and the cyclohexane ring have the trans configuration.
Specific examples of the chemical structure of the partial structure:
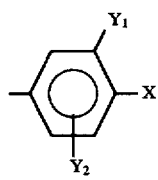
follow.
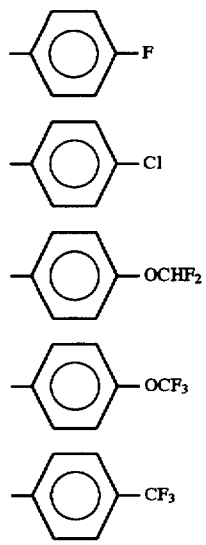
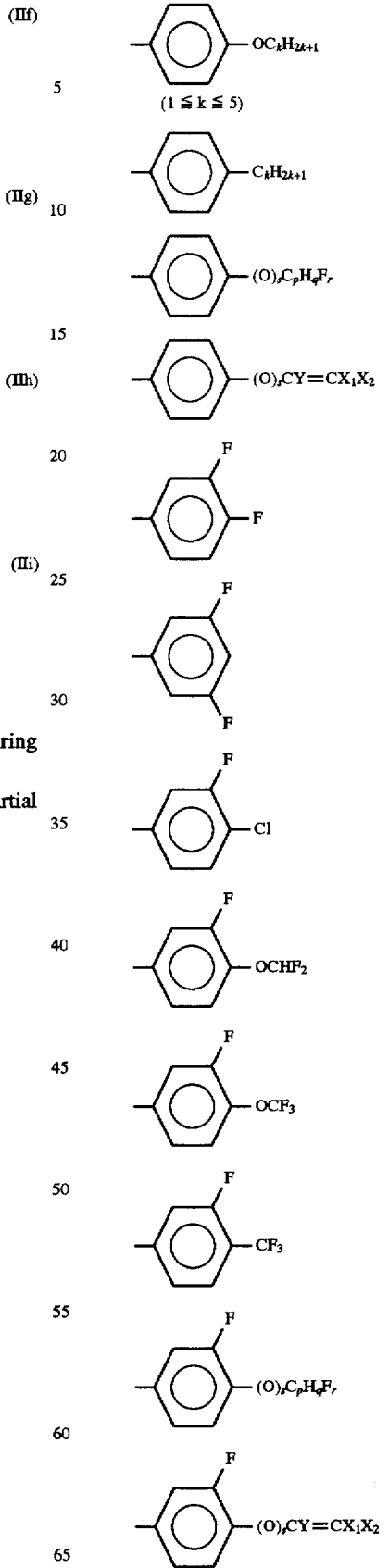
$(1 \leq k \leq 5)$ -continued
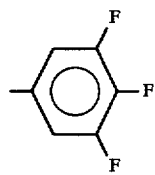
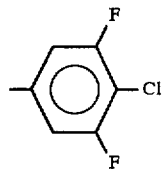
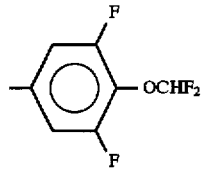
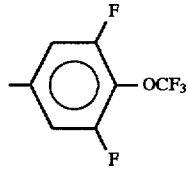
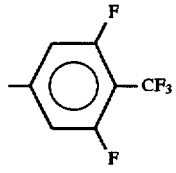
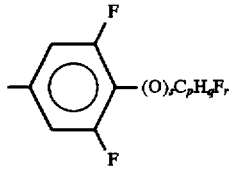
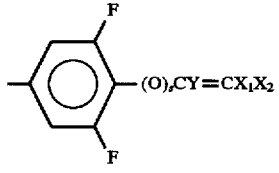
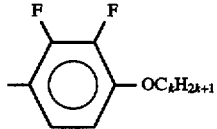
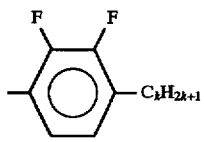
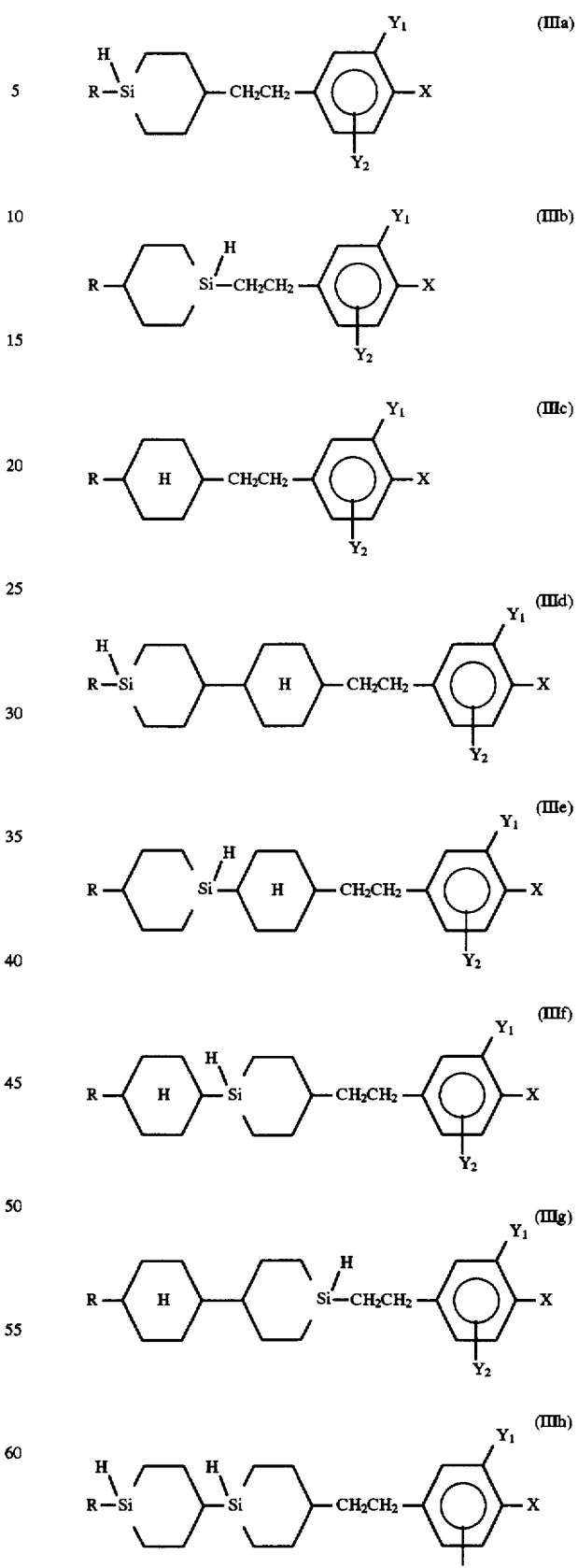
Examples of the specific chemical structure of the compound represented by the general formula (III) follow:

-continued

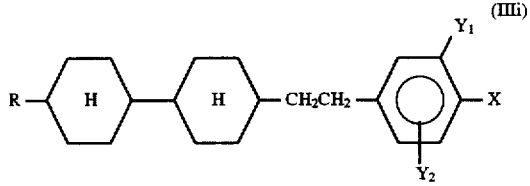
(IIIi)

The definitions of R, the configuration and the partial structure:

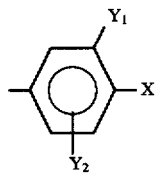

are the same as those for the compounds represented by the general formulas (I) and (II).

Examples of the specific chemical structure of the compound represented by the general formula (IV) follow.

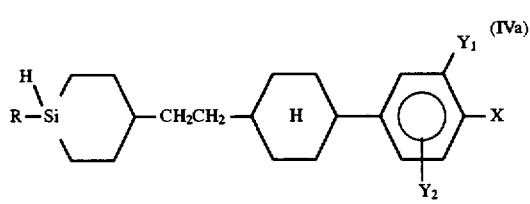
(IVa)

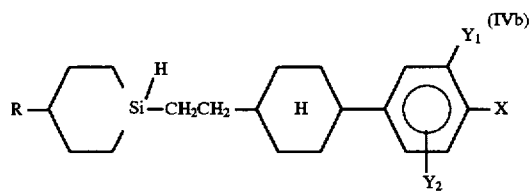
(IVb)

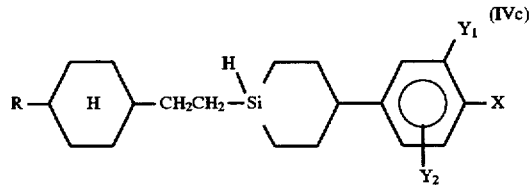
(IVc)

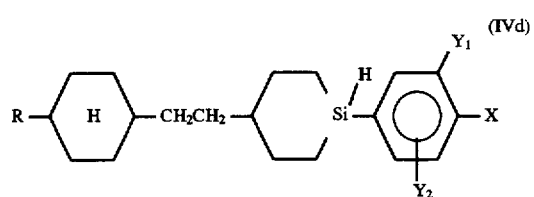
(IVd)

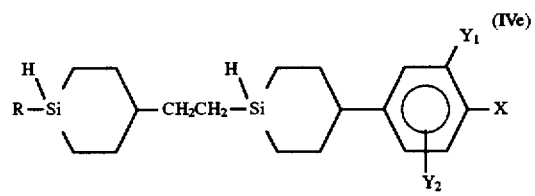
(IVe)

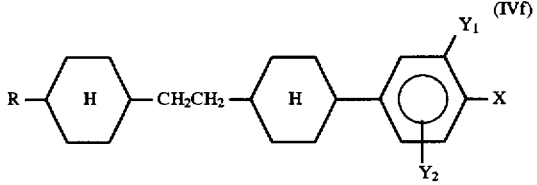
(IVf)

The definitions of R, the configuration and the partial structure:

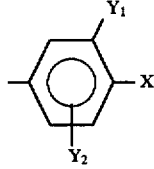

are the same as those for the compounds represented by the general formulas (I) and (II).

Examples of the specific chemical structure of the compound represented by the general formula (V) follow.

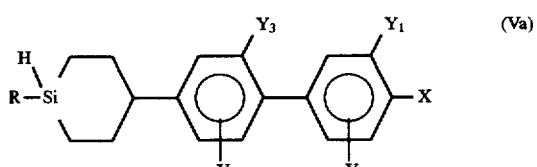
(Va)

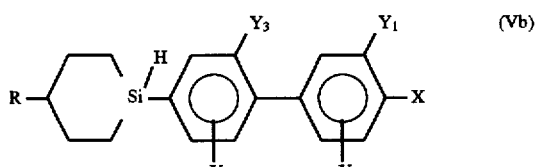
(Vb)

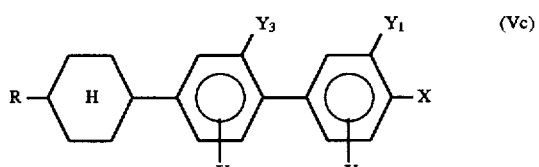
(Vc)

The definitions of R and the configuration are the same as those for the compounds represented by the general formulas (I) and (II).

Specific examples of the chemical structure of the partial structure:

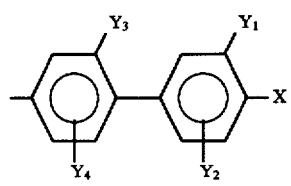

follow.

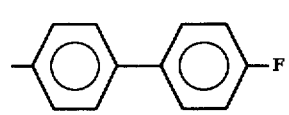

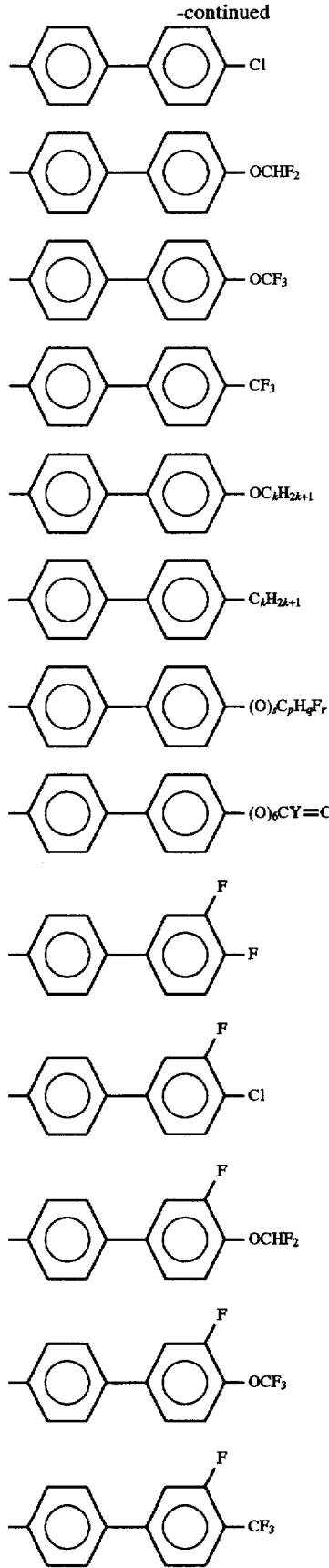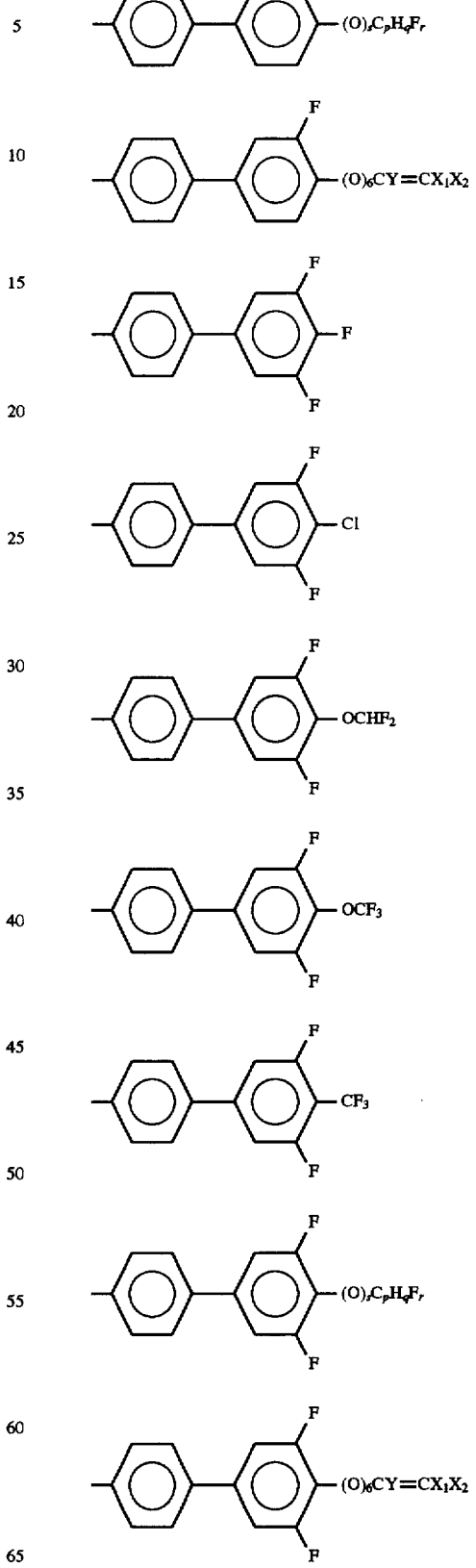

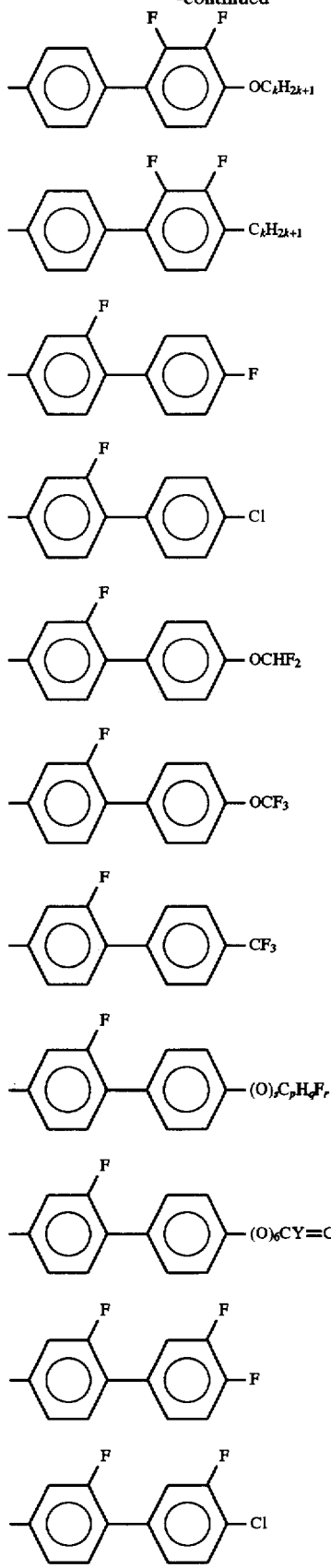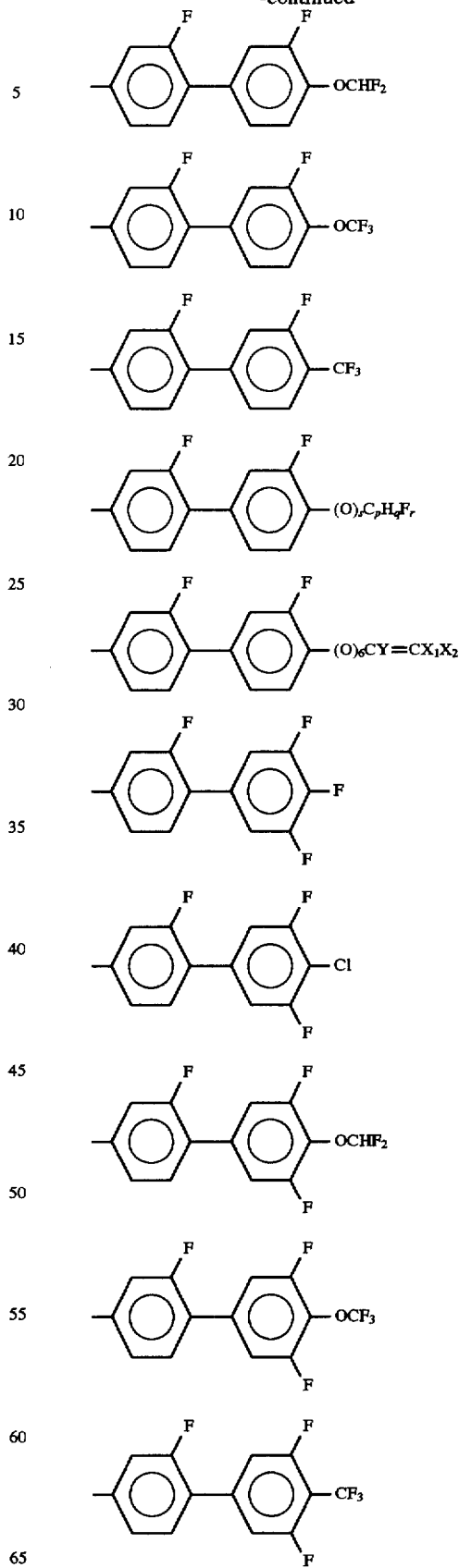

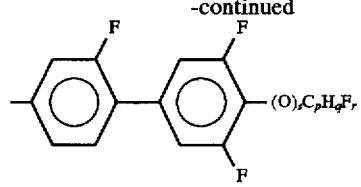
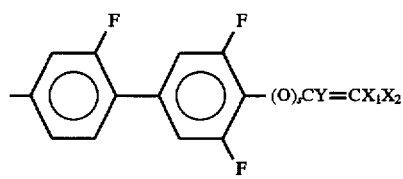
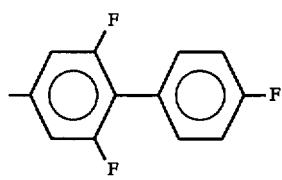
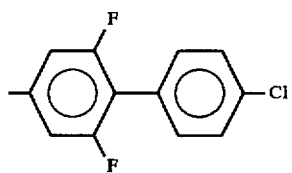
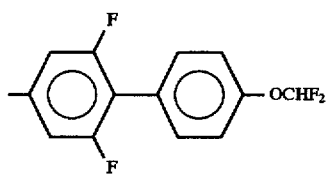
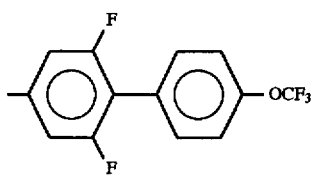
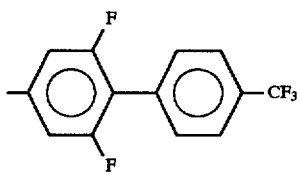
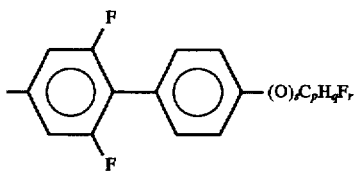
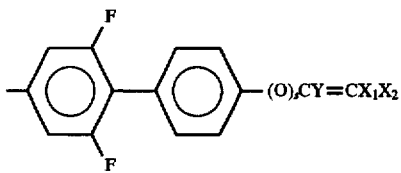
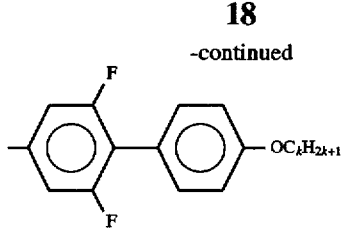
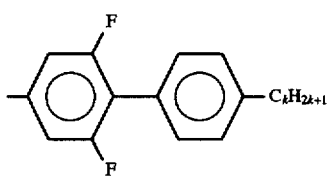
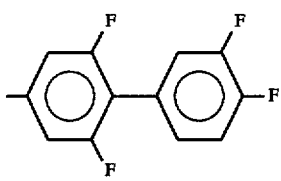
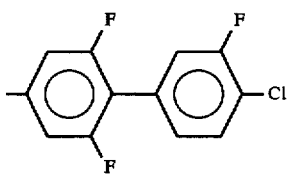
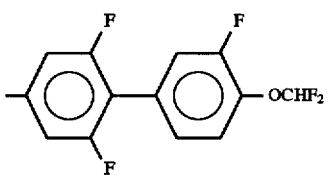
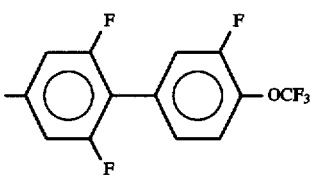
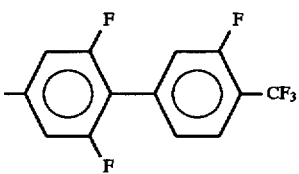
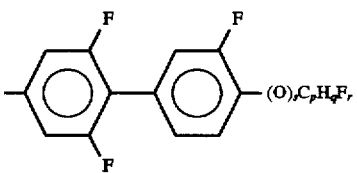
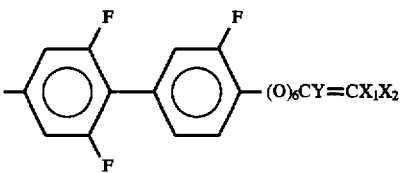

-continued
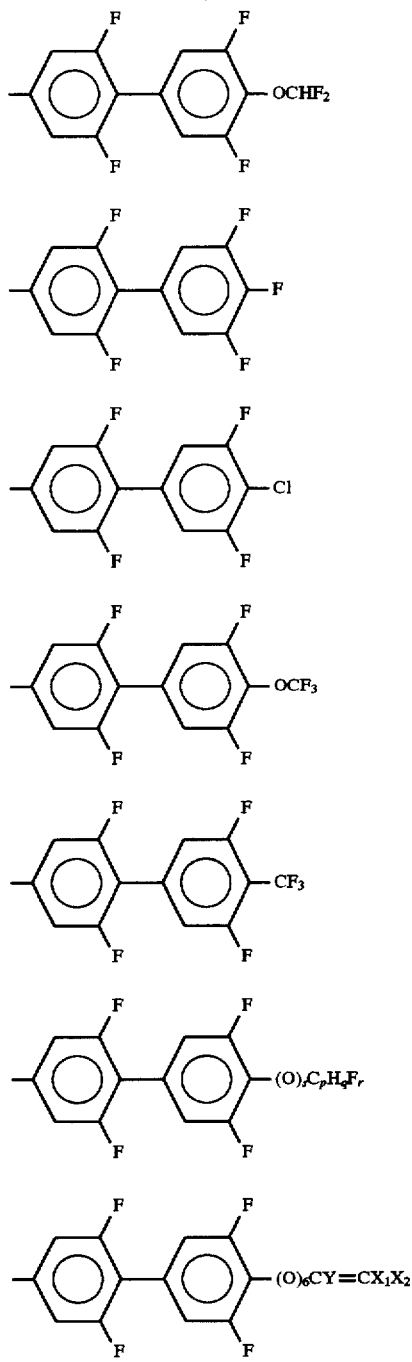
Examples of the specific chemical structure of the compound represented by the general formula (VI) follow.
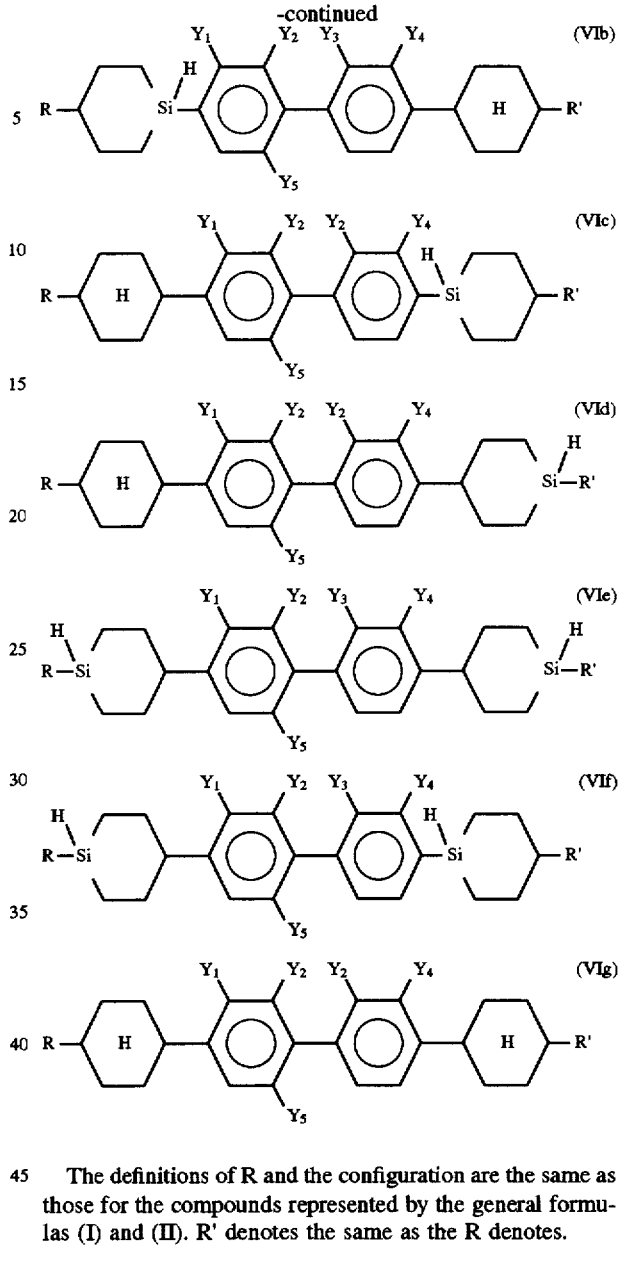
The definitions of R and the configuration are the same as those for the compounds represented by the general formulas (I) and (II). R' denotes the same as the R denotes.
Specific examples of the chemical structure of the partial structure:
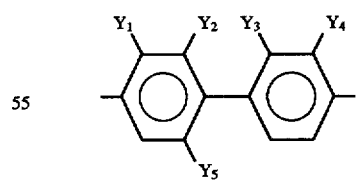
follow.
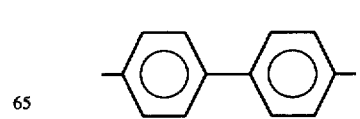

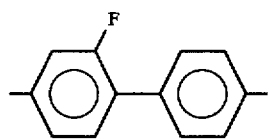
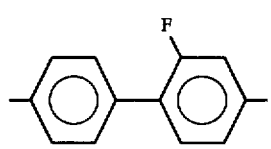
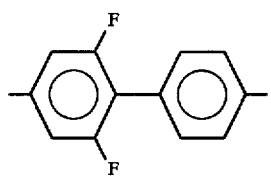
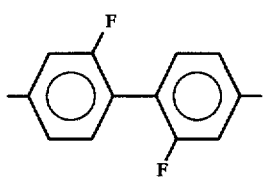
Examples of the specific chemical structure of the compound represented by the general formula (VII) follow.
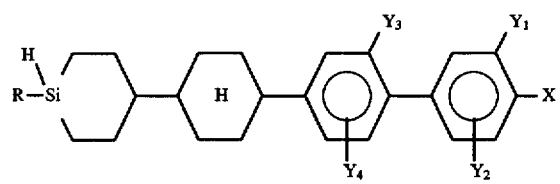
(VIIa)
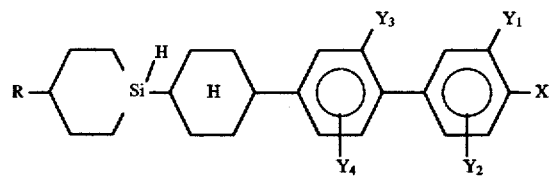
(VIIb)
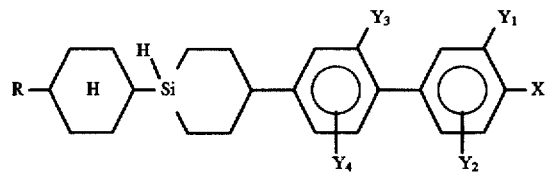
(VIIc)
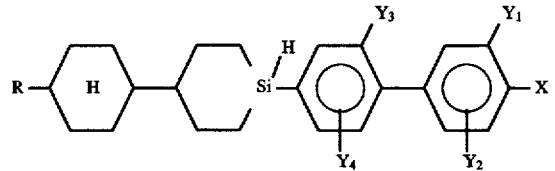
(VIId)
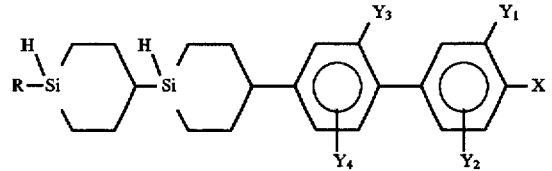
(VIIe)

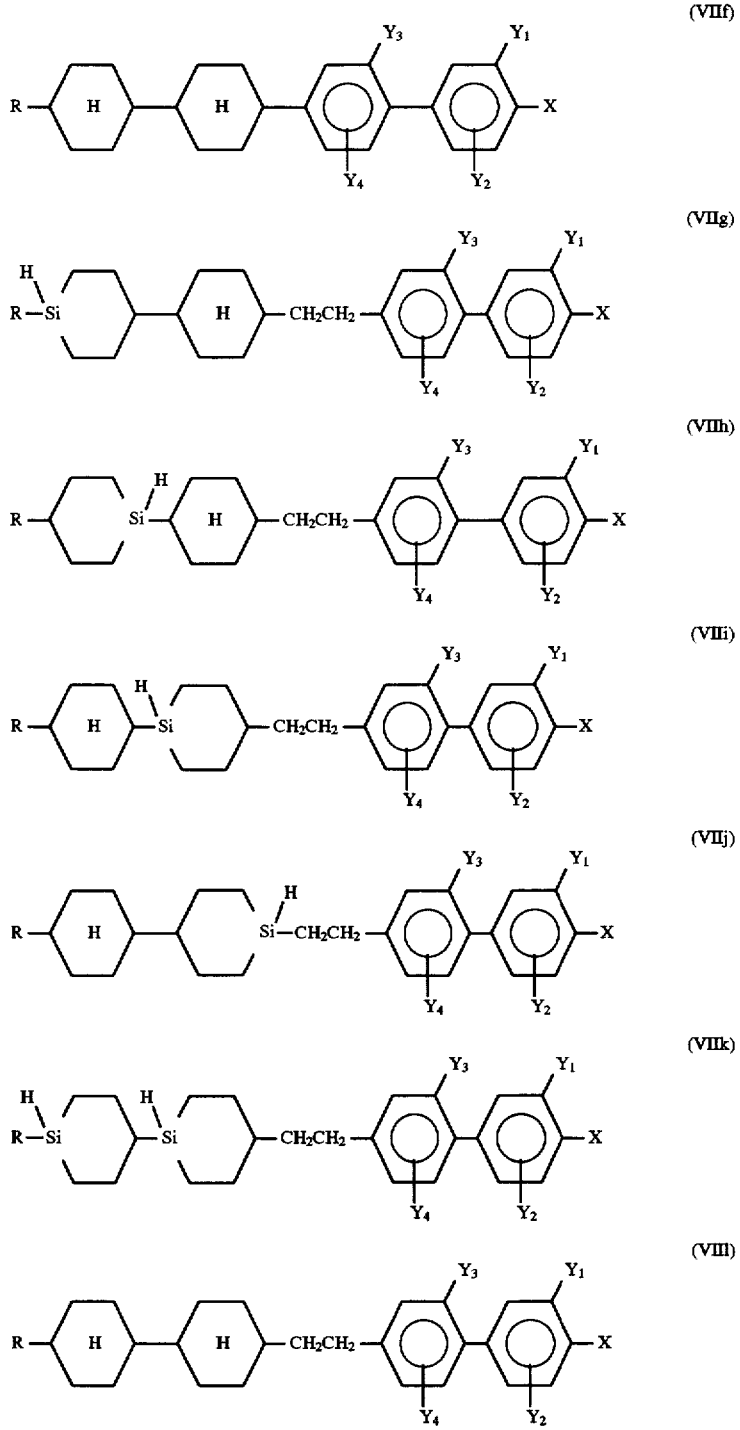
The definitions of R and the configuration are the same as those for the compounds represented by the general formulas (I) and (II).
The definition of the partial structure:
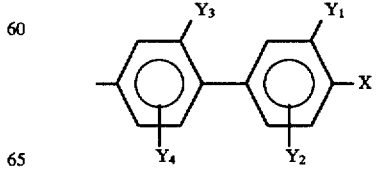

is the same as those for the compounds represented by the general formula (V).
Examples of the specific chemical structure of the compound represented by the general formula (VIII) follow.
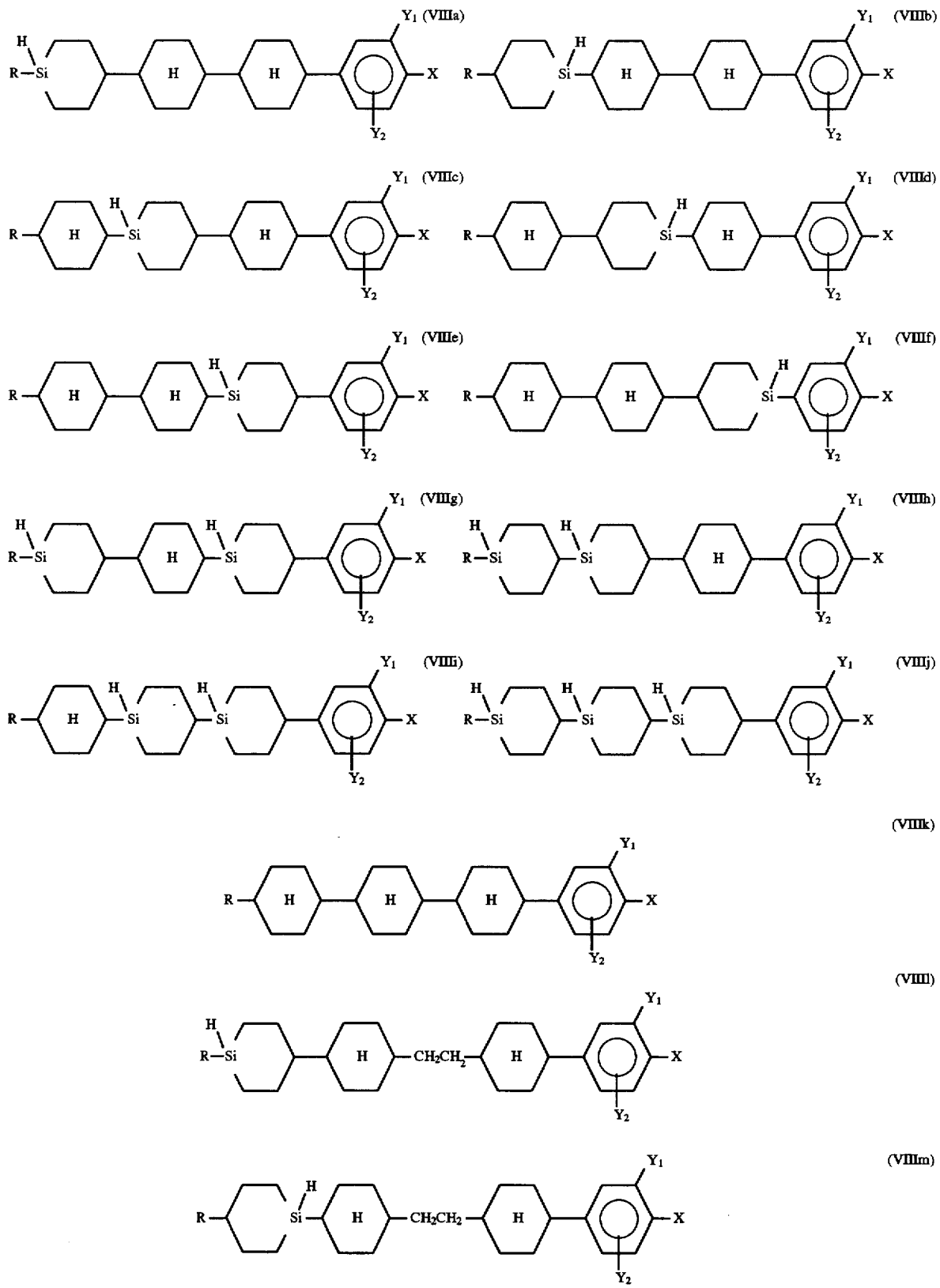

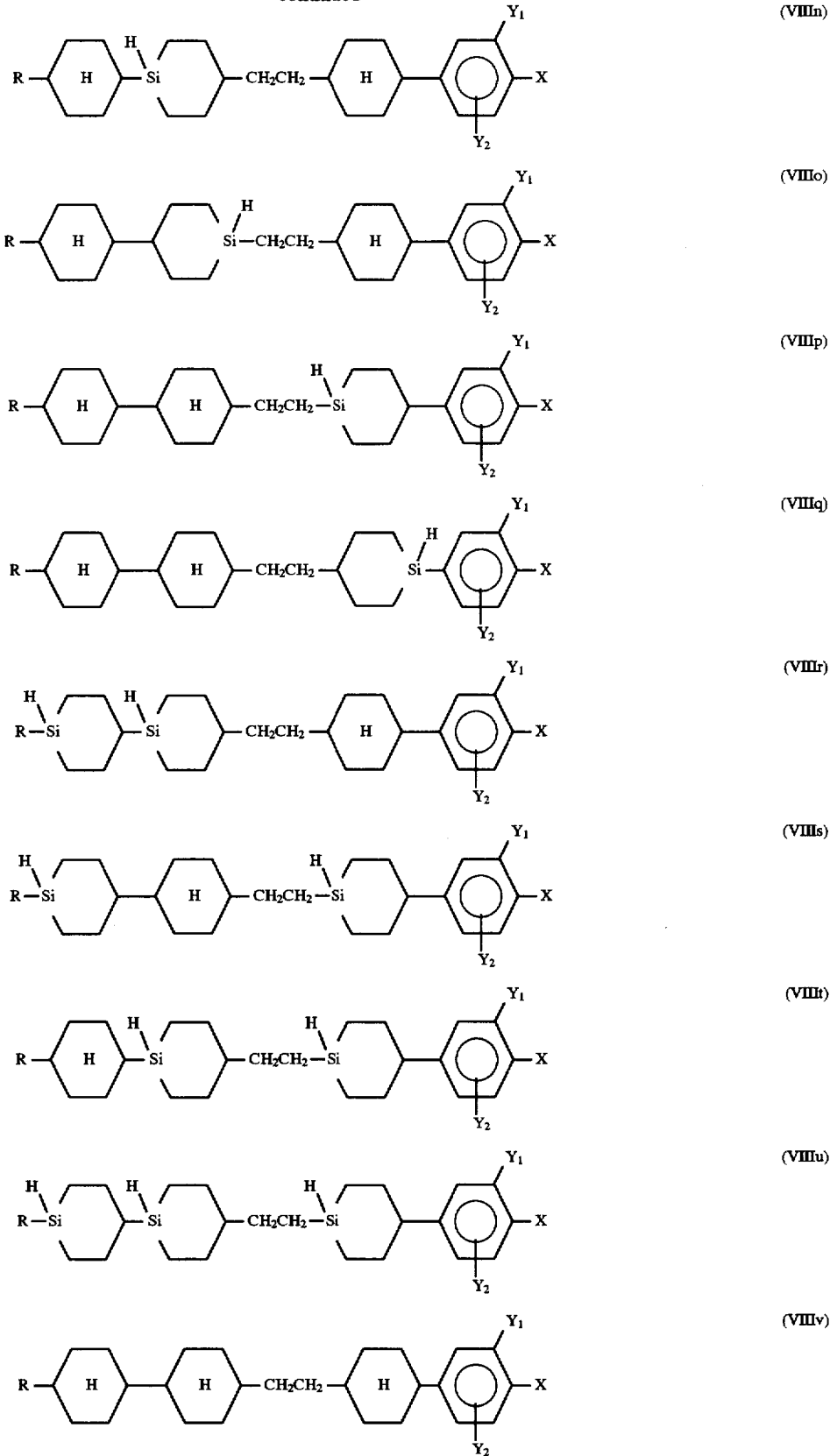

The definitions of R and the configuration are the same as those for the compounds represented by the general formulas (I) and (II).
The definition of the partial structure:
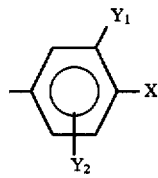
is the same as those for the compounds represented by the general formula (II).
Examples of the specific chemical structure of the compound represented by the general formula (IX) follow.
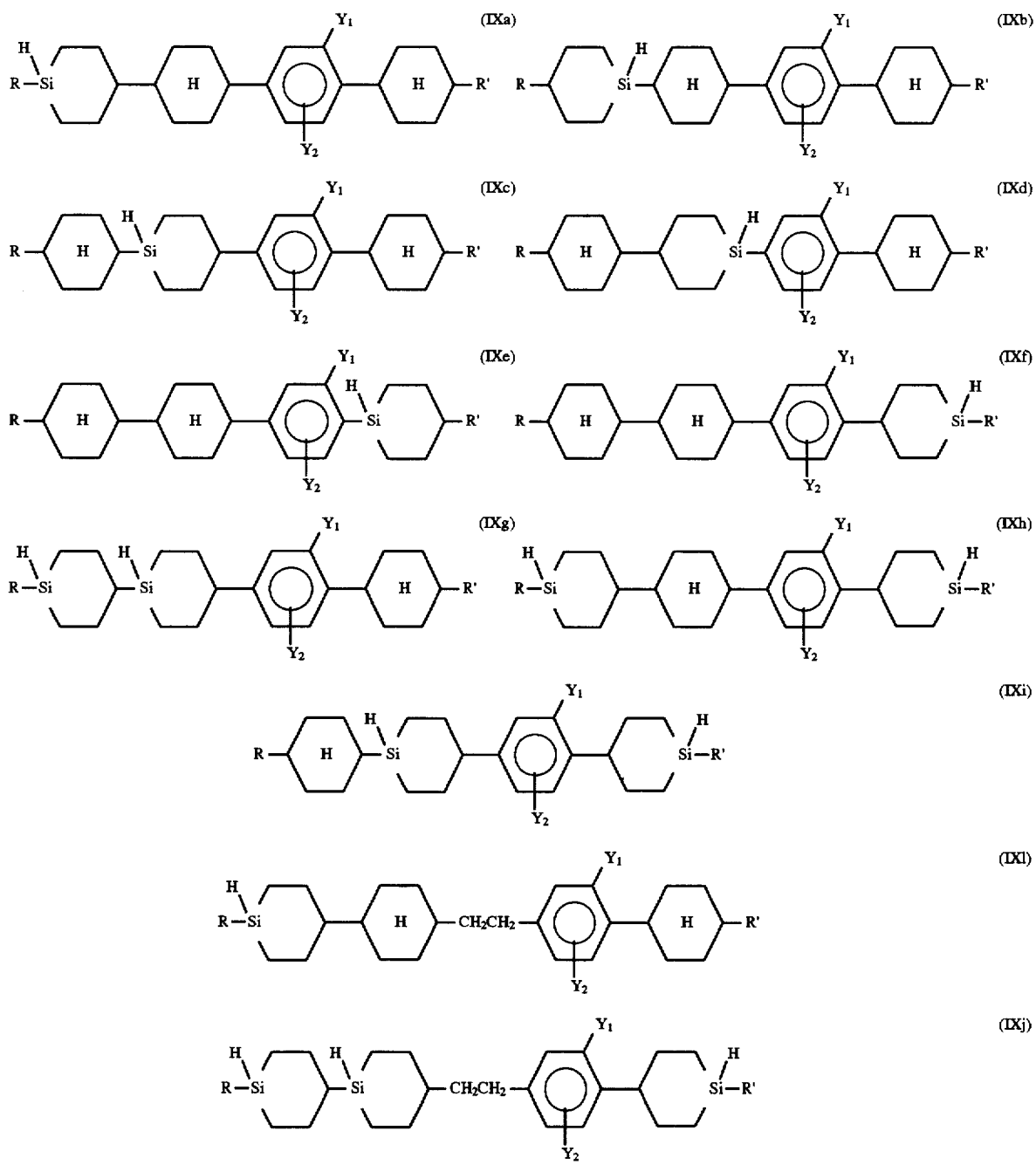

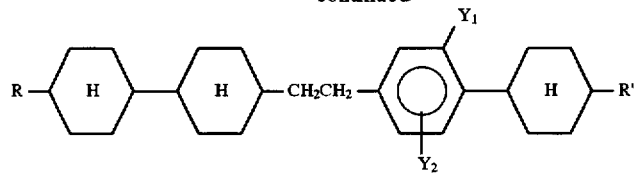
(IXk)
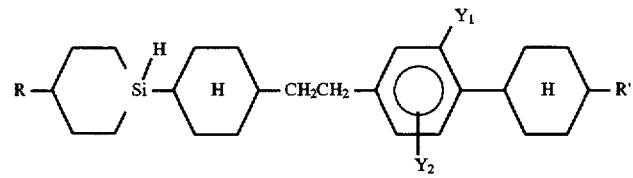
(IXm)
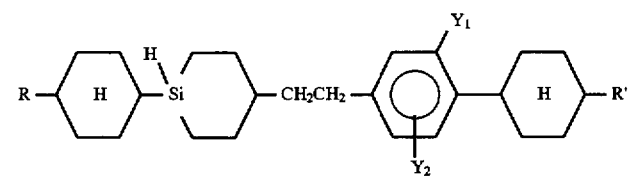
(IXn)
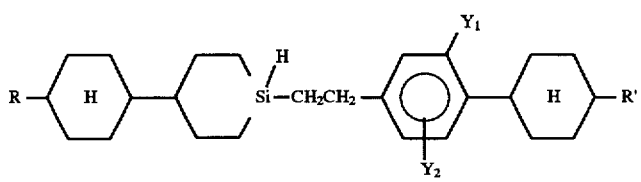
(IXo)
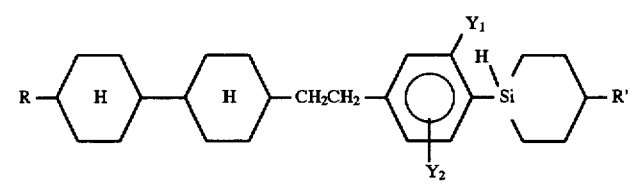
(IXp)
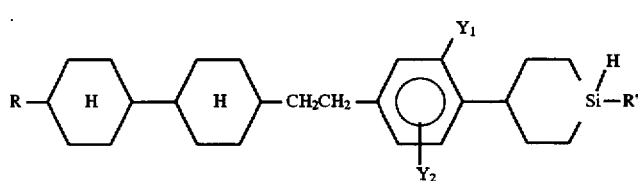
(IXq)
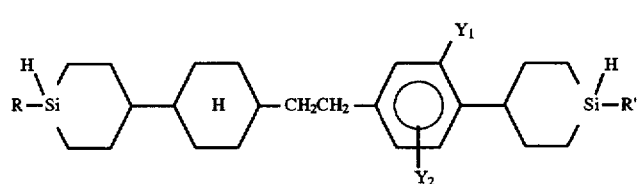
(IXr)
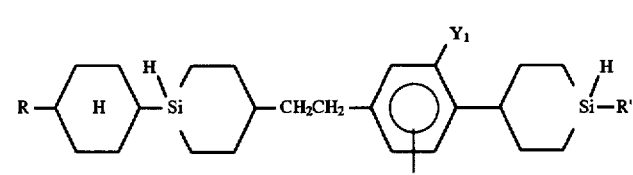
(IXs)
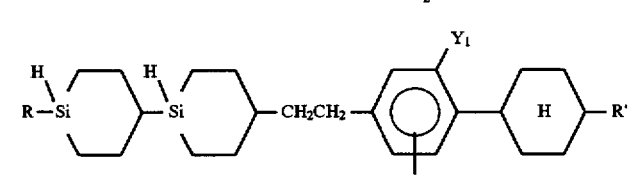
(IXt)

-continued

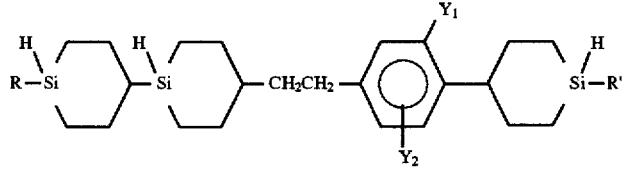 (IXu)

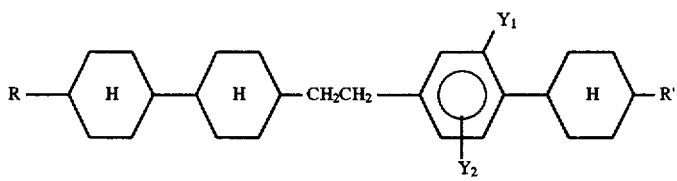 (IXv)

The definitions of R and the configuration are the same as those for the compounds represented by the general formulas (I) and (II). The definition of R' is the same as that of R.

The partial structure:

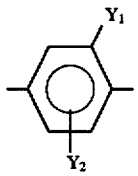

represents the following:

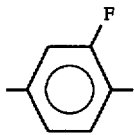

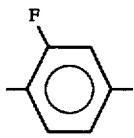

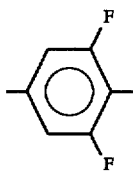

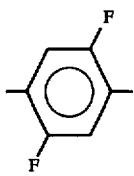

-continued

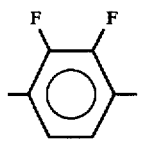

Of those described above, the following, are particularly preferable for giving the liquid crystal composition a wide temperature range of the nematic liquid crystal phase, a last response, a low threshold voltage, a high voltage remaining ratio and nematic stability in low temperatures.

The following are preferable for R:

(e) A linear-chain alkyl group with 2–7 carbons, i.e. an ethyl, n-propyl, n-butyl, n-,pentyl, n-hexyl or n-heptyl group;

(f) Some alkoxyalkyl groups with 2–7 carbons, i.e. a methoxymethyl, 2-methoxyethyl, 3-methoxypropyl, 5-methoxypentyl, ethoxymethyl, 2-ethoxyethyl, (n-propoxy) methyl or (n-pentoxy) methyl group;

(g) Some mono- or di-fluoroalkyl groups with 2–7 carbons, i.e. a 2-fluoroethyl, 2-fluoropropyl, -fluorobutyl, 4-fluoropentyl, 5-fluoropentyl, 6-fluorohexyl, 7-fluoroheptyl, 1,1-difluoroethyl, 2,2-difluoroethyl, 2,2-difluoropropyl, 2,2-diafluorobutyl, 4,4-difluorobutyl or 4,4-difluoropentyl group; or (h) Some alkenyl groups with 2–7 carbos, i.e. a vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl or 6-heptenyl group.

For X in the general formula (I), $OC_kH_{2k+1}$, $C_kH_{2k+1}$, $OCH_2CHF_2$, $OCH_2CF_3$, $OCF_2CHFCF_3$, $CH_2CHF_2$, $CH=CF_2$, and $CF_2=CFH$ are preferable.

For the partial structure:

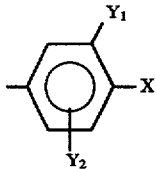

the following are preferable:
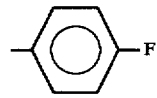
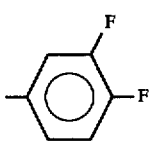
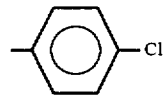
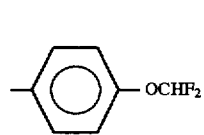
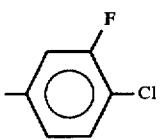
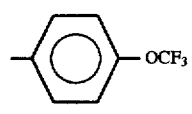
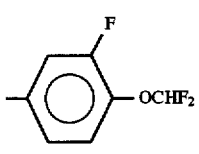
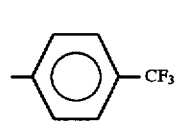
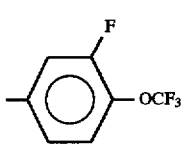
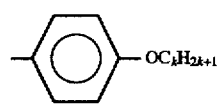
($1 \leq k \leq 5$)
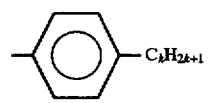
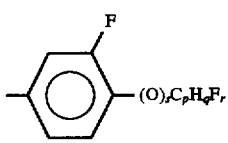
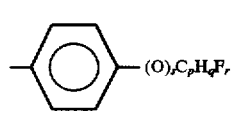
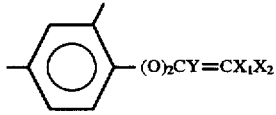
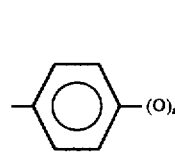
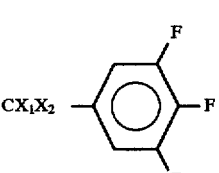
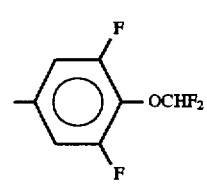
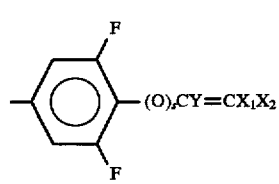
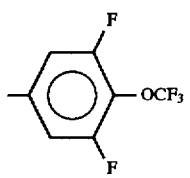
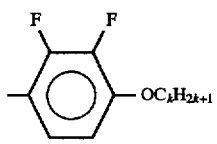
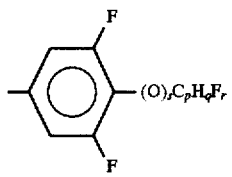
For the partial structure:
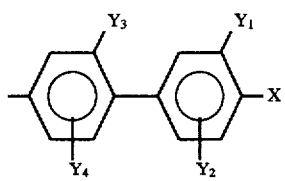
the following are preferable:
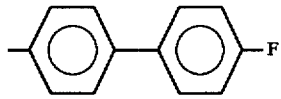
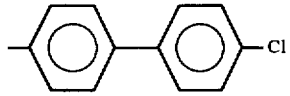
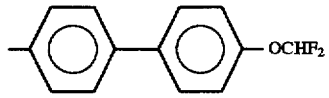
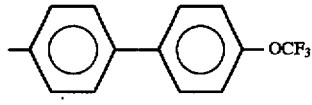
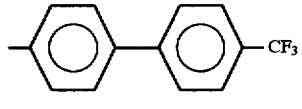
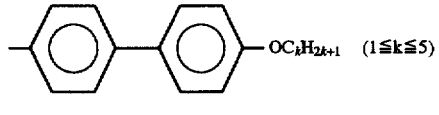
($1 \leq k \leq 5$)
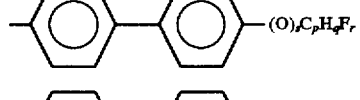

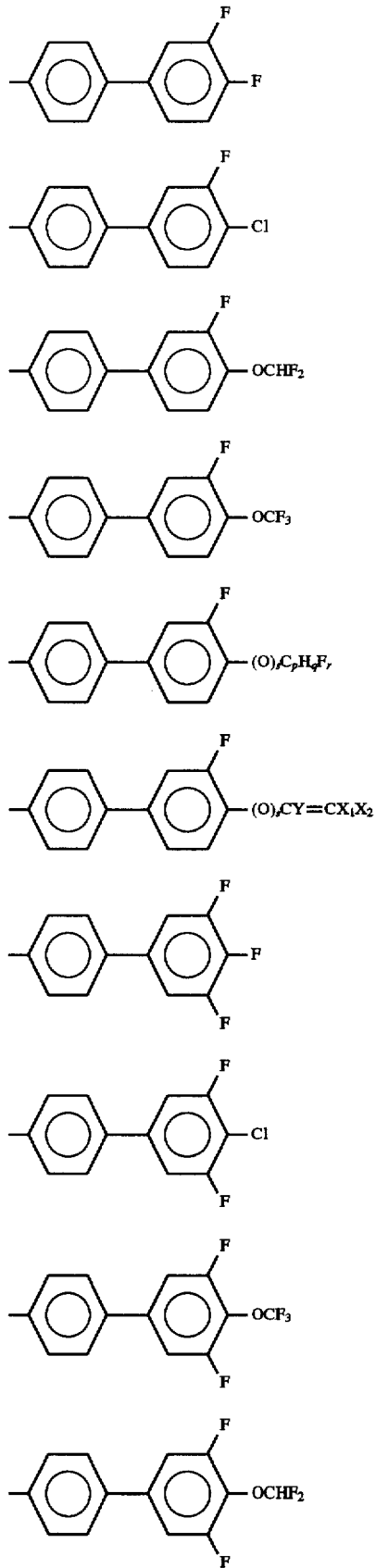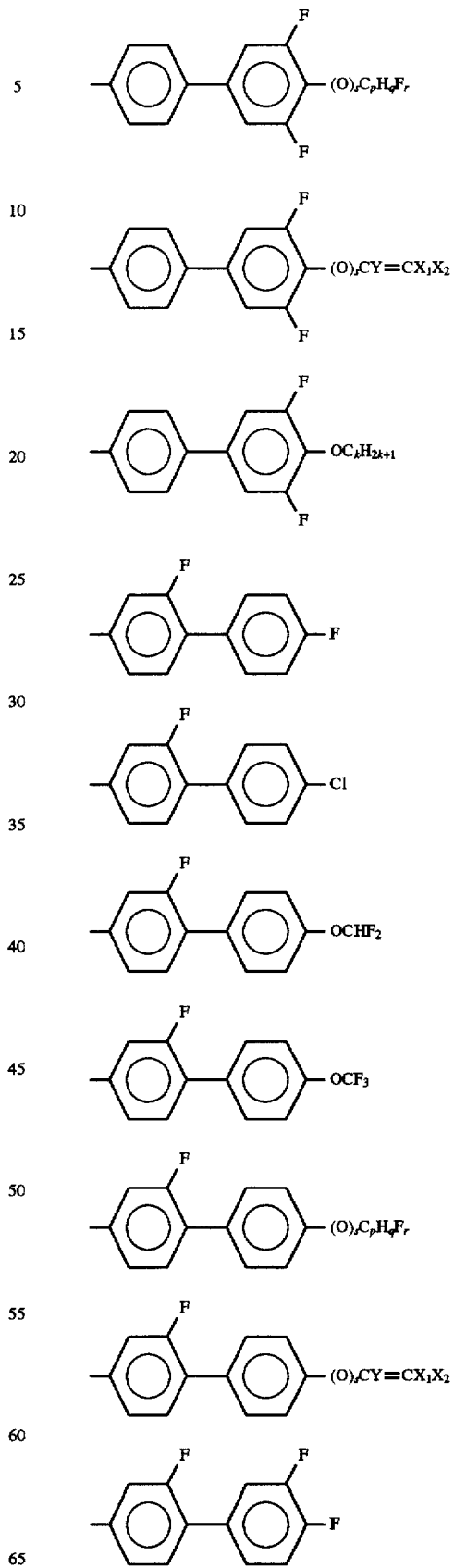

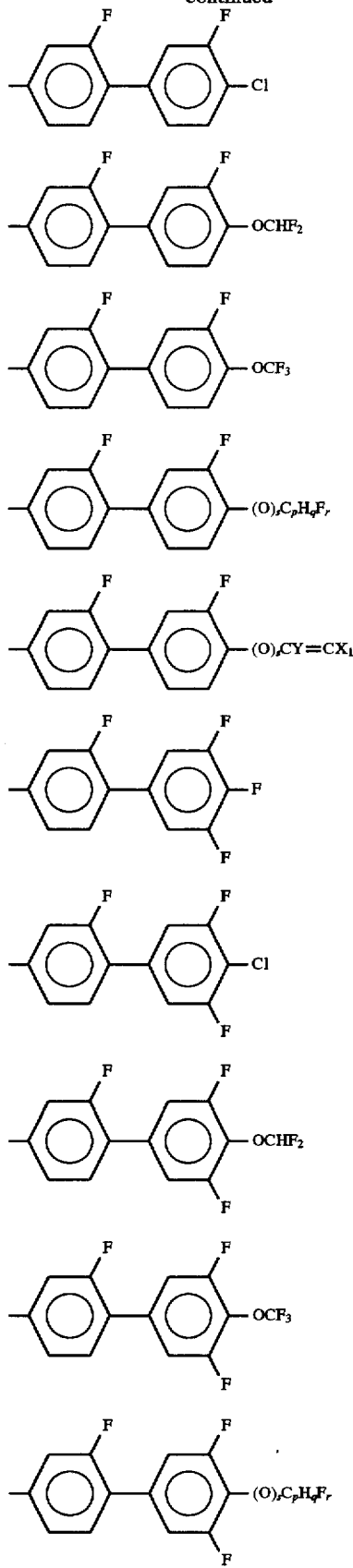
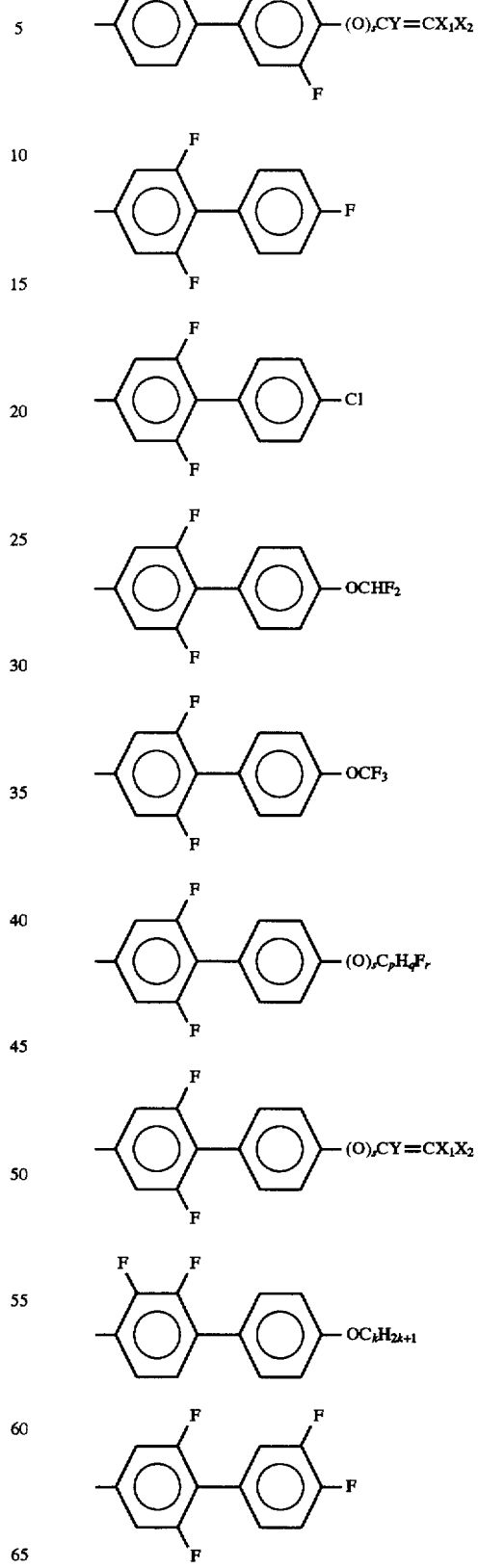

41
-continued
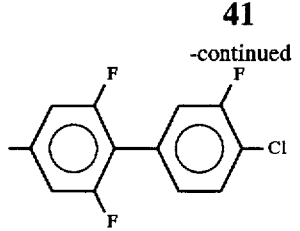
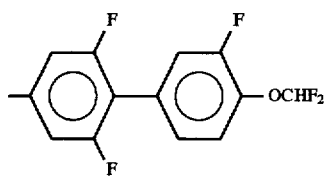
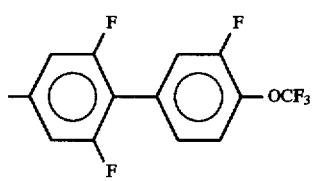
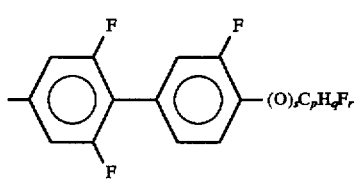
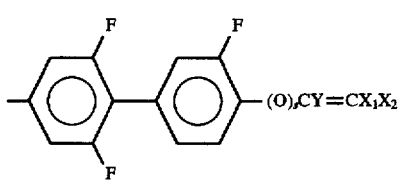
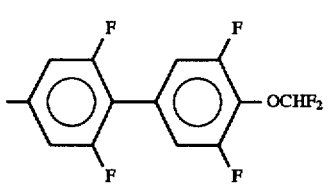
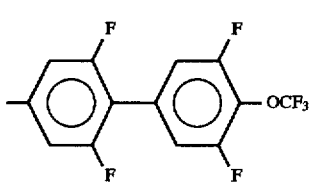
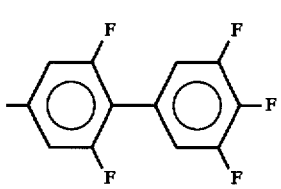
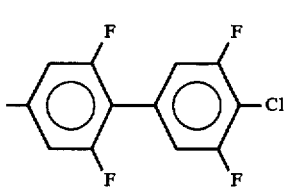
42
-continued
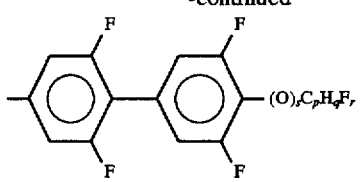
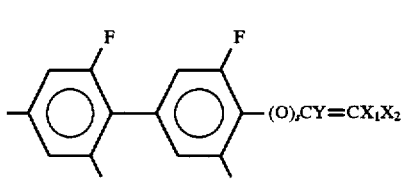
For the partial structure:
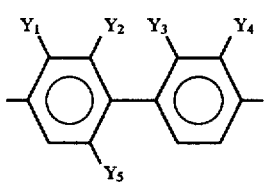
the following are preferable:
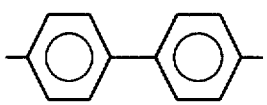
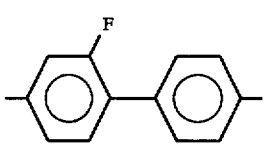
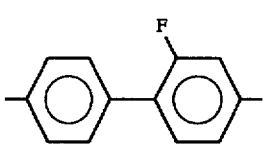
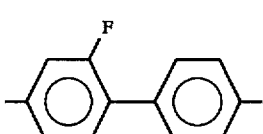
For the partial structure:
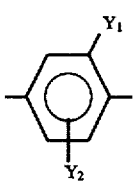

the following are preferable:
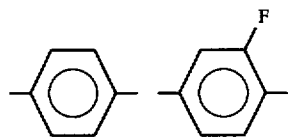 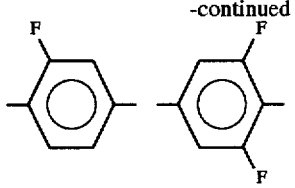
For the ring structure, the following are preferable:
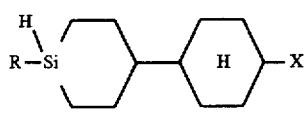 (Ia)  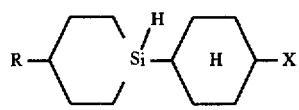 (Ib)
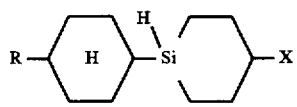 (Ic)  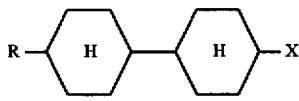 (Ie)
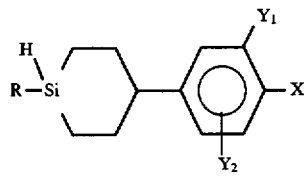 (IIa)  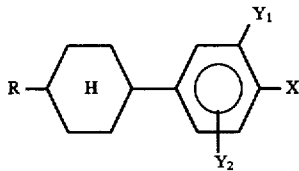 (IIc)
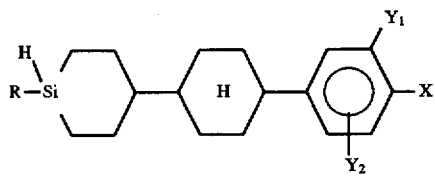 (IId)  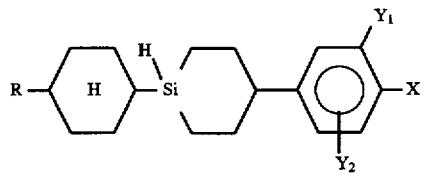 (IIf)
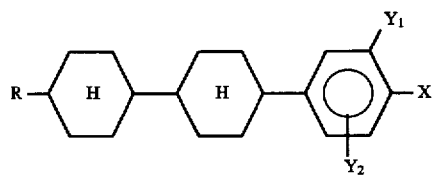 (IIi)  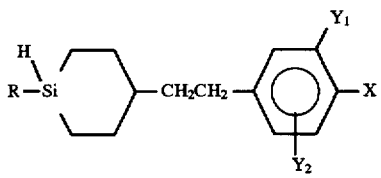 (IIIa)
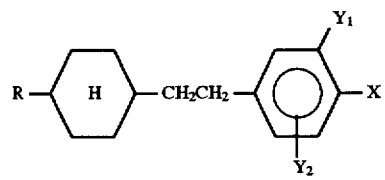 (IIIc)  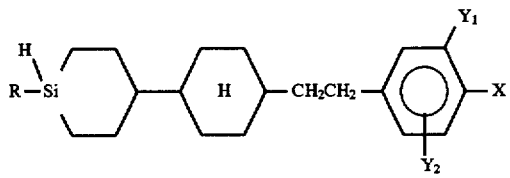 (IIId)
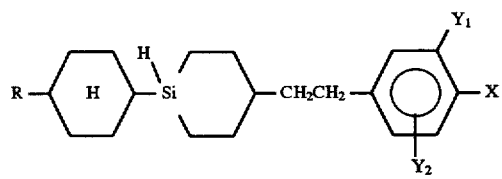 (IIIf)  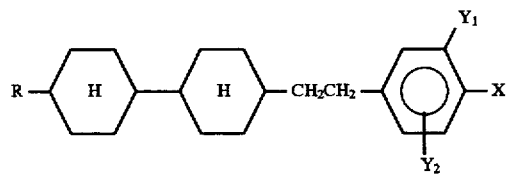 (IIIi)
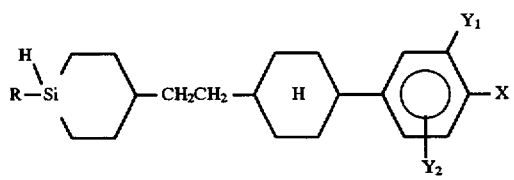 (IVa)  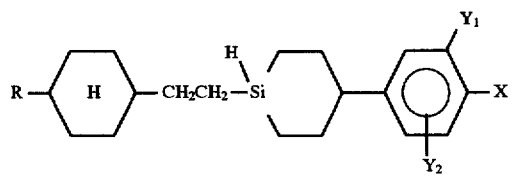 (IVc)

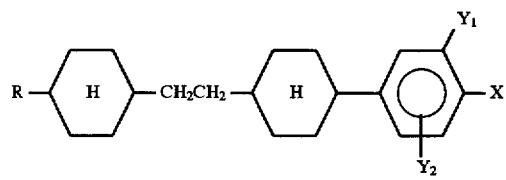
(IVf)
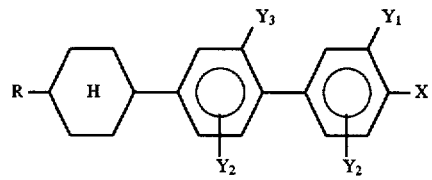
(Vc)
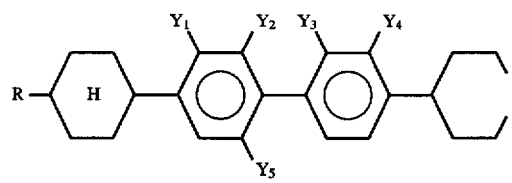
(VId)
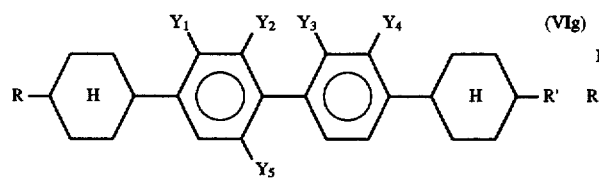
(VIg)
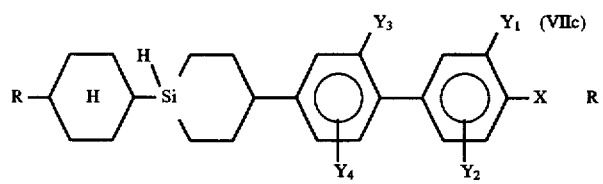
(VIIc)
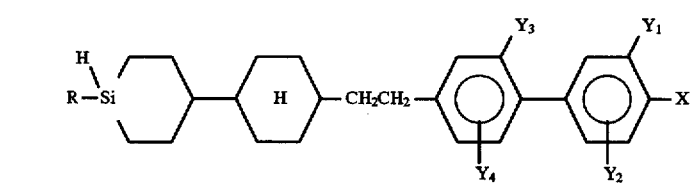
(VIIg)
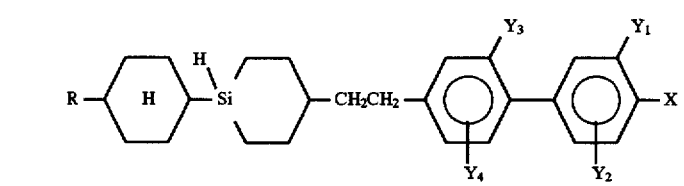
(VIIi)
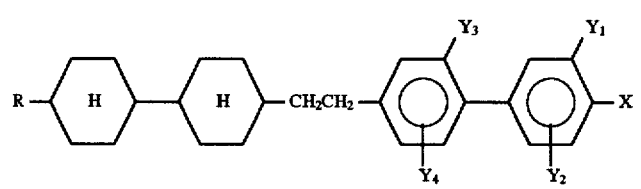
(VIII)
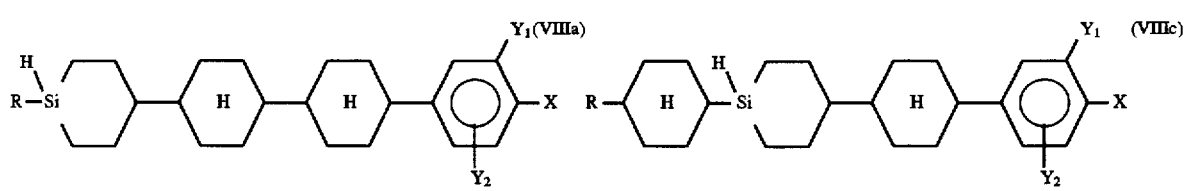
(VIIIa)
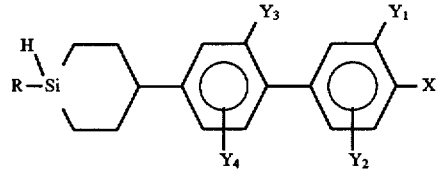
(Va)
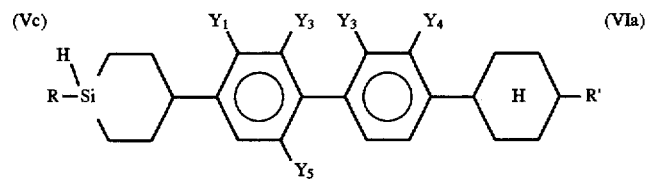
(VIa)
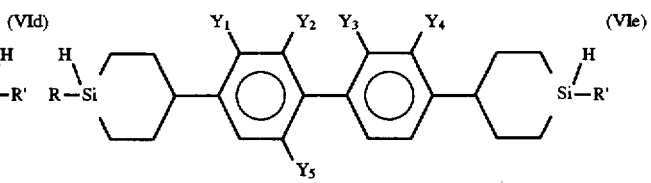
(VIe)
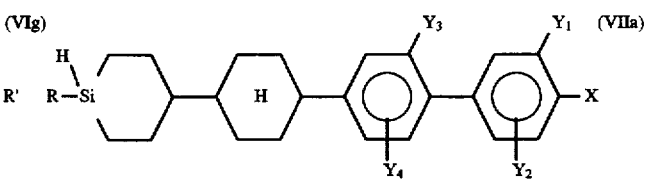
(VIIa)
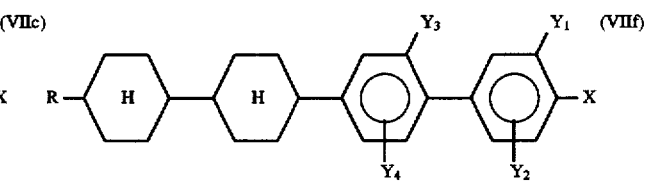
(VIIf)
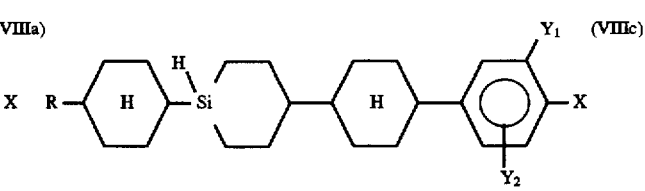
(VIIIc)

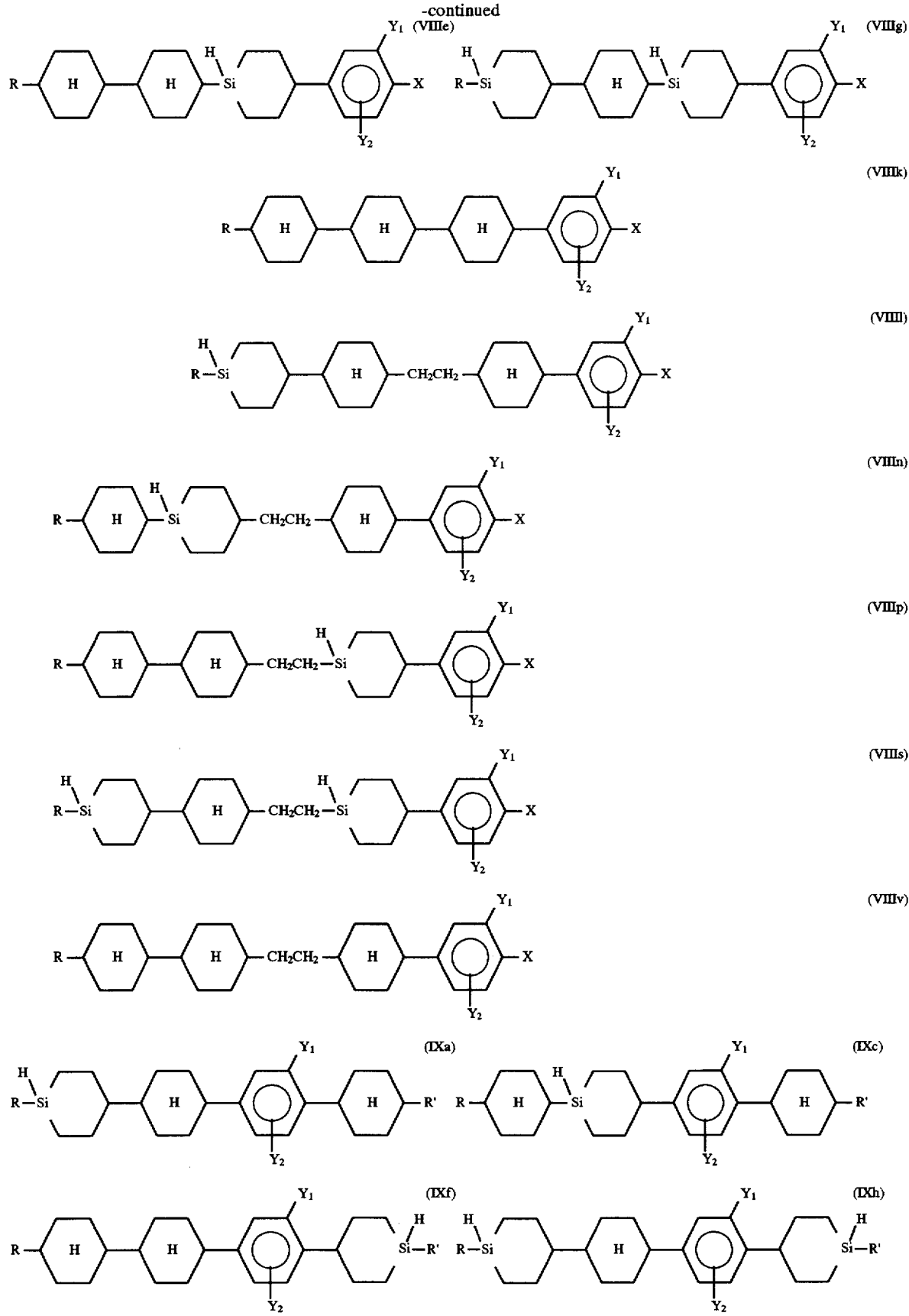

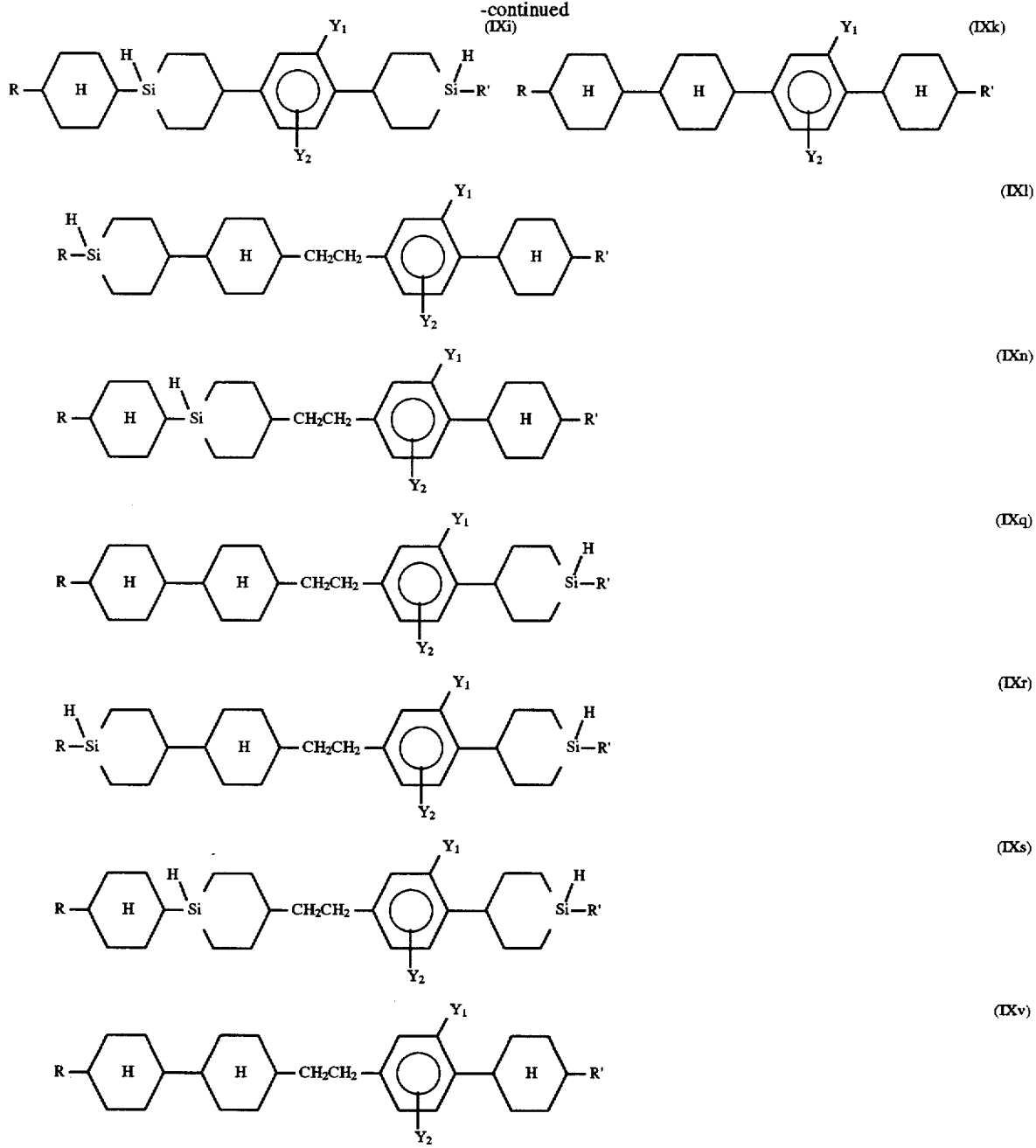

For the blend ratios of these ingredients in the liquid crystal composition, it is preferable to have 0–30 mol% of group A comprising one or more types of compounds chosen from among the compounds represented by the general formulas (Ia) to (Ie), (IIa) to (IIc) and (IIIa) to (IIIc) and 50–100 mol % of group B comprising one or more types of compounds chosen from among the compounds represented by the general formulas (IId) to (IIi), (IIId) to (IIIi), (IVa) to (IVf) and (Va) to (Vc). It is more preferable to have 2–20 mol% of one or more compounds of group A and 70–96 mol% of one or more compounds of group B. Further, it is preferable to have 70–98 mol% of one or more compounds of group A and group B in the total amount of the liquid crystal composition if any of the compounds includes at least one Si atom.

When group C comprising one or more types of compounds chosen from among the compounds represented by the general formulas (VIa)–(VIg), (VII)–(VII λ) (VIIIa)–(VIIIv), (IXa)–(IXv) is added to those described above, its blend ratio should preferably be 0–20 mol% and more preferably be 2–10 mol%.

Use of an excessive amount of group A is advantageous for accelerating the response time and lowering the threshold voltage, but lowers the upper limit temperature of the nematic phase, narrowing the liquid crystal range. On the other hand, if the amount of group A is too small, then the response becomes slower.

Use of an excessive amount of group B is advantageous for lowering the threshold voltage, but slows the response. On the other hand, if the amount of group B is too small, it becomes harder to lower the threshold voltage.

Although it is possible to compose the liquid crystal composition only with croup A and group B, group C is added when expansion of the nematic phase even further to higher temperatures is desired. However, use of an excessive amount of group C is disadvantageous for accelerating the response time, lowering the threshold voltage and stabilizing the nematic phase at low temperatures.

The anisotropy of the refractive index ($\Delta n$), which is a physical property related to panel design specifications such as the visual angle, is adjusted by adding controlled amounts of compounds represented by the general formulas (Va), (Vb) and (Vc), or, although the effect is secondary, by adding controlled amounts or compounds represented by The general formulas (VIa)–(VIg) and (VII)–(VII $\lambda$). For the first trans- mission minimum panels of Gooch and Tarry, the ingredients mentioned above are added in small amounts, and for the second transmission minimum panels the ingredients mentioned above are added in large amounts.

In recent years, The applications of liquid crystal panels are expanding more and more, and the physical properties required have become diversified for applications such as OA devices, automobile onboard devices, portable devices, etc. It is possible to obtain the different physical properties required by selecting types and amounts from among the compounds represented by the general formulas (I)–(VI) and adjusting the blend ratios for optimal results.

The mixing of these ingredients may be conducted by mixing the minor ingredients with the major ingredients to dissolve, or further by heat-dissolving at 30°–100° C., or by mixing solutions made of each ingredient dissolved in an organic solvent such as acetone, methanol and chloroform whose amount is 1–10 equivalent or the composition and then evaporating the organic solvent.

The liquid crystal composition of the present invention thus obtained has a wide temperature range of the nematic liquid crystal phase with a lower temperature limit of the nematic phase of –20° C. or lower and an upper temperature limit of 70°–100° C., and the smectic phase or the crystalline phase does not occur even after prolonged storage at –20° C. The threshold voltage obtained was 1.6 V or lower, particularly in the range of 1.1–1.5 V. As for the voltage retaining ability, the measured value was 98% or more even for the measur ments at 100° C.

The liquid crystal composition used in liquid crystal display elements can also contain other additives including polygenetic dye to generate a colored guest-host system and a chiral-doping agent to give a twisting direction and strength. Such a liquid crystal composition with additives is sealed between transparent base plates in which active elements such as TFT and MIM are formed and is thus used as a liquid crystal display element. This element can have various undercoatings, overcoatings for orientation control, a polarizer plate, a filter and a reflector layer, as necessary. It can be made into a laminated cell or combined with other display elements. Semiconductor substrates and light sources can also be used to make various types of displays.

EXAMPLES

The details of this invention are described below by referring to specific examples.

[Examples]

The details of this invention are described below by referring to specific examples. The characteristics of the mixtures in the Examples were determined under the following conditions. Definitions of the symbols are also shown below.

$T_{NI}$=Nematic-Isotropic transition temperature (° C.)
$V_{th}$=Threshold voltage
  Cell electrode area: 1 cm$^2$
  Cell gap: 5 micrometers (TN cell)
  Orientation film=Polyimide made by Hitachi Chemical Co., Ltd. : LX-1400
  Frequency used for the measurement: 32 Hz square wave
  Measurement mode: Normally white
  Temperature at which the measurement was conducted: 25° C.

The threshold voltage is defined as the applied voltage at which the transmittance has decreased by 10% from the initial, value (100%) to 90% under the conditions described above.

$\Delta n$=Anisotropy of the refractive index
  Temperature at which the measurement was conducted: 25° C.
  Wave length used: 589.3 nm Abbe's refractometer was used and the sample was placed on a prism with a homeotropic orientation. $\Delta n$ is defined as the difference between the refractive index for the extraordinary ray n// and the refractive index for the ordinary ray n⊥.

VHR: Voltage retaining ratio
  Cell electrode area: 1 cm$^2$
  Cell gap: 5 micrometers (TN cell)
  Orientation film=Polyimide made by Hitachi Chemical Co., Ltd.: AL-1051
  Frequency used for the measurement: 30 Hz square wave
  Temperature at which the measurement was conducted: 100° C.
  Pulse width: 60 microseconds (+/−5 V TTL)

The voltage retaining ratio is defined as the retaining ratio of the voltage waveform across the electrodes measured under the conditions described above. "%" in the mixture compositions stands for "mol %".

[Example 1]

4-(trans-4-n-pentylcyclohexyl)-1-fluorobenzene: 7.5%
4-(trans-4-n-heptylcyclohexyl)-1-fluorobenzene: 7.5%
4-(trans-4-(trans-4-n-propylcyclohexyl) cyclohexyl-1,2,6-trifluorobenzene: 12.0%
4-(trans-4-(trans-4-n-butylcyclohexyl) cyclohexyl)-1,2,6-trifluorobenzene: 9.0%
4-(trans-4-(trans-4-n-pentylcyclohexyl) cyclohexyl)-1,2,6-trifluorobenzene: 9.0%
4-(trans-4-(trans-4-n-propyl-4-silacyclohexyl) cyclohexyl)-1-trifluoromethoxybenzene: 11.6%
4-(trans-4-(trans-4-n-pentyl-4-silacyclohexyl) cyclohexyl)-1-trifluoromethoxybenzene: 8.4%
4-a-(trans-4-(trans-4-n-propyl-4-silacyclohexyl) cyclohexyl)-1-difluoromethoxy-2,6-difluorobenzene: 8.6%
4-(trans-4-(trans-4-n-butyl-4-silacyclohexyl) cyclohexyl) -1-difluoromethoxy-2,6-difluorobenzene: 12.4%
4-(trans-4(trans-4-n-pentyl-4-silacyclohexyl) cyclohexyl) -1-difluoromethoxy-2,6-difluorobenzene: 14.0%

The liquid crystal mixture with the composition listed above exhibits the following characteristics:
$T_{NI}$=71.5° C., $V_{th}$=1.47 V, $\Delta n$=0.083, VHR=99.0%

[Example 2]

4-(trans-4-n-pentyl-4-silacyclohexyl)-1-fluorobenzene: 2.5%

4-(trans-4-n-heptyl-4-silacyclohexyl)-1-fluorobenzene: 1.5%

4-(trans-4-(trans-4-n-propylcyclohexyl) cyclohexyl)-1,2,6-trifluorobenzene: 16.0%

4-(trans-4-(trans-4-n-butylcyclohexyl) cyclohexyl)-1,2,6-trifluorobenzene: 12.0%

4-(trans-4-(trans-4-n-pentylcyclohexyl) cyclohexyl)-1,2,6-trifluorobenzene: 12.0%

4-(trans-4-(trans-4-n-propyl-4-silacyclohexyl) cyclohexyl)-1,2-difluorobenzene: 9.2%

4-(trans-4-(trans-4-n-pentyl-4-silacyclohexyl) cyclohexyl)-1,2-difluorobenzene: 10.8%

4-(trans-4-(trans-4-n-propyl-4-silacyclohexyl) cyclohexyl)-1-difluoromethoxy-2,6-difluorobenzene: 7.4%

4-(trans-4-(trans-4-n-butyl-4-silacyclohexyl) cyclohexyl)-1-difluoromethoxy-2,6-difluorobenzene: 10.6%

4-(trans-4-(trans-4-n-pentyl-4-silacyclohexyl) cyclohexyl)-1-difluoromethoxy-2,6-difluorobenzene: 12.0%

Trans, trans-4-(4-(4-n-propyl-4-silacyclohexyl) cyclohexyl)-3',4'-difluorobiphenyl: 1.9%

Trans, trans-4-(4-(4-n-pentyl-4-silacyclohexyl) cyclohexyl)-3',4'-difluorobiphenyl: 4.1%

The liquid crystal mixture with the composition listed above exhibits the following characteristics:

$T_{NI}$=87.9° C., $V_{th}$=1.37 V, $\Delta n$=0.084, VHR=98.6

[Example 3]

4-(trans-4-n-pentylcyclohexyl)-1-fluorobenzene: 5.0%

4-(trans-4-n-heptylcyclohexyl)-1-fluorobenzene: 5.0%

Trans-4-(trans-4-(2-(3,4,5-trifluorophenyl) ethyl) cyclohexyl)-1n-propylcyclohexane: 10.0%

Trans-4-(trans-4-(2-(3,4,5-trifluorophenyl) ethyl) cyclohexyl)-1-n-butylcyclohexane: 10.0%

Trans-4-(trans-4-(2-(3,4,5-trifluorophenyl) ethyl) cyclohexyl1)-1-n-pentylcyclohexane: 10.0%

4-(trans-4-(trans-4-n-propyl-4-silacyclohexyl) cyclohexyl)-1-trifluoromethoxybenzene: 11.6%

4-(trans-4-(trans-4-n-pentyl-4-silacyclohexyl) cyclohexyl)-1-trifluoromethoxybenzene: 8.4%

4-(trans-4-(trans-4-n-propyl-4-silacyclohexyl) cyclohexyl)-1-difluoromethoxy-2,6-difluorobenzene: 7.4%

4-(trans-4-(trans-4-n-butyl-4-silacyclohexyl) cyclohexyl)-1-difluoromethoxy-2,6-difluorobenzene: 10.6%

4-(trans-4-(trans-4-n-pentyl-4-silacyclohexyl) cyclohexyl)-1-difluoromethoxy-2,6-difluorobenzene: 12.0%

Trans-4-(2-(trans-4-(3,4-difluorophenyl) cyclohexyl) ethyl)-1-n-propyl-1-silacyclohexane: 5.3%

4-(trans-4-(2-(trans-4-(3,4-difluorophenyl) cyclohexyl) ethyl)-1-n-pentyl-1-silacyclohexane: 4.7%

The liquid crystal mixture with the composition listed above exhibits the following characteristics:

$T_{NI}$=75.8° C., $V_{th}$=1.47 V, $\Delta n$=0.081, VHR=99.0%

[Example 4]

4-(trans-4-n-pentyl-4-silacyclohexyl)-1-methoxybenzene: 10.0%

4-(trans-4-(trans-4-n-propylcyclohexyl) cyclohexyl)-1,2,6-trifluorobenzene: 8.0%

4-(trans-4-(trans-4-n-butylcyclohexyl) cyclohexyl)-1,2,6-trifluorobenzene: 6.0%

4-(trans-4-(trans-4-n-pentylcyclohexyl) cyclohexyl)-1,2,6-trifluorobenzene: 6.0%

4-(trans-4-(trans-4-n-propyl-4-silacyclohexyl) cyclohexyl)-1-trifluoromethoxybenzene: 17.5%

4-(trans-4-(trans-4-n-pentyl-4-silacyclohexyl) cyclohexyl)-1-trifluoromethoxybenzene: 12.5%

4-(trans-4-(trans-4-n-propyl-4-silacyclohexyl) cyclohexyl)-1-difluoromethoxy-2,6-difluorobenzene: 4.9%

4-(trans-4-(trans-4-n-butyl-4-silacyclohexyl) cyclohexyl)-1-difluoromethoxy-2,6-difluorobenzene: 7.1%

4-(trans-4-(trans-4-n-pentyl-4-silacyclohexyl) cyclohexyl)-1-difluoromethoxy-2,6-difluorobenzene: 8.0%

4'-(trans-4-n-propyl-4-silacyclohexyl)-2'-fluoro-4-trifluoromethoxybiphenyl: 7.1%

4'-(trans-4-n-pentyl-4-silacyclohexyl)-2'-fluoro-4-trifluoromethoxybiphenyl: 12.9%

The liquid crystal mixture with the composition listed above exhibits the following characteristics:

$T_{NI}$=77.5° C., $V_{th}$=1.53 V, $\Delta n$=0.092, VHR=98.5%

[Example 5]

4-(trans-4-n-pentyl-4-silacyclohexyl)-1-methoxybenzene: 10.0%

4-(trans-4-(trans-4-n-propylcyclohexyl) cyclohexyl)-1-trifluoromethoxybenzene: 7.5%

4-(trans-4-(trans-4-n-pentylcyclohexyl) cyclohexyl)-1-trifluoromethoxybenzene: 7.5%

4-(trans-4-(trans-4-n-propylcyclohexyl) cyclohexyl)-1,2,6-trifluorobenzene: 12.0%

4-(trans-4-(trans-4-n-butylcyclohexyl) cyclohexyl)-1,2,6-trifluorobenzene: 9.0%

4-(trans-4-(trans-4-n-pentylcyclohexyl) cyclohexyl)-1,2,6-trifluorobenzene: 9.0%

4'-(trans-4-n-propylcyclohexyl)-3,4-difluorobiphenyl: 6.7%

4'-(trans-4-n-pentylcyclohexyl)-3,4-difluorobiphenyl: 13.3%

4-(trans-4-(trans-4-n-propyl-4-silacyclohexyl) cyclohexyl)-1-difluoromethoxy-2,6-difluorobenzene: 6.2%

4-(trans-4-(trans-4-n-butyl-4-silacyclohexyl) cyclohexyl)-1-difluoromethoxy-2,6-difluorobenzene: 8.8%

4-(trans-4-(trans-4-n-pentyl-4-silacyclohexyl) cyclohexyl)-1-difluoromethoxy-2,6-difluorobenzene: 10.0%

The liquid crystal mixture with the composition listed above exhibits the following characteristics:

$T_{NI}$=91.3° C., $V_{th}$=1.49 V, $\Delta n$=0.095, VHR=98.7%

[Example 6]

4-(trans-4-n-pentylcyclohexyl)-1-fluorobenzene: 3.0%

4-(trans-4-n-heptylcyclohexyl)-1-fluorobenzene: 3.0%

4-(trans-4-(trans-4-n-propylcyclohexyl) cyclohexyl-1,2-difluorobenzene: 5.0%

4-(trans-4-(trans-4-n-butylcyclohexyl) cyclohexyl)-1,2-difluorobenzene: 5.0%

4-(trans-4-(trans-4-n-pentylcyclohexyl) cyclohexyl)-1,2-difluorobenzene: 5.0%

4'-(trans-4-n-propylcyclohexyl)-3,4,2',6'-tetrafluorobiphenyl: 6.0%

4'-(trans-4-n-butylcyclohexyl)-3,4,2',6'-tetrafluorobiphenyl: 7.0%

4'-(trans-4-n-pentylcyclohexyl)-3,4,2',6'-tetrafluorobiphenyl: 7.0%

4-(trans-4-(trans-4-n-propyl-4-silacyclohexyl) cyclohexyl)-1-trifluoromethoxybenzene: 8.7%

4-(trans-4-(trans-4-n-pentyl-4-silacyclohexyl) cyclohexyl)-1-trifluoromethoxybenzene: 6.3%

4-(trans-4-(trans-4-n-propyl-4-silacyclohexyl) cyclohexyl)-1-difluoromethoxy-2,6-difluorobenzene: 10.8%

4-(trans-4-(trans-4-n-butyl-4-silacyclohexyl) cyclohexyl)-1-difluoromethoxy-2,6'-difluorobenzene: 15.6%

4-(trans-4-(trans-4-n-pentyl-4-silacyclohexyl) cyclohexyl)-1-difluoroethoxy-2,6-difluorobenzene: 17.6%

[Example 7]

Trans-4-(2-(p-fluorophenyl) ethyl)-1-n-pentylcyclohexane: 3.0%

Trans-4-(2-(p-fluorophenyl) ethyl)-1-n-heptylcyclohexane: 3.0%

4-(trans-4-(trans-4-n-propylcyclohexyl) cyclohexyl)-1,2,6-trifluorobenzene: 14.0%

4-(trans-4-(trans-4-n-butylcyclohexyl) cyclohexyl)-1,2,6-trifluorobenzene: 10.5%

4-(trans-4-(trans-4-n-pentylcyclohexyl) cyclohexyl)-1,2,6-trifluorobenzene: 10.5%

4-(trans-4-(trans-4-n-propyl-4-silacyclohexyl) cyclohexyl)-1difluoromethoxy-2,6-difluorobenzene: 4%

4-(trans-4-(trans-4-n-butyl-4-silacyclohexyl) cyclohexyl)-1-difluoromethoxy-2,6-difluorobenzene: 7.1%

4-(trans-4-(trans-4-n-pentyl-4-silacyclohexyl) cyclohexyl)-1-difluoromethoxy-2,6-difluorobenzene: 8.0%

Trans-4-(trans-4-(2-(3,4-difluorophenyl) ethyl) cyclohexyl)-1-n-propyl-1-silacyclohexane)e : 7.1%

Trans-4-(trans-4-(2-(3,4-difluorophenyl) ethyl) cyclohexyl)-1-n-pentyl-1-silacyclohexane: 6.9%

4'-(trans-4-n-propyl-4-silacyclohexyl)-2'-fluoro-4-trifluoromethoxybiphenyl: 8.9%

4'-(trans-4-n-pentyl-4-silacyclohexyl)-2'-fluoro-4-trifluoromethoxybiphenyl: 16.1%

The liquid crystal mixture with the composition listed above exhibits the following characteristics:

T$_{NI}$76.5° C., V$_{th}$=1.37 V, Δn=0.097, VHR=98.8%

[Example 8]

4-(trans-4-n-pentyl-4-silacyclohexyl)-1-fluorobenzene: 3.8%

4-(trans-4-n-heptyl-4-silacyclohexyl)-1-fluorobenzene: 2.2%

4-(trans-4- (trans-4-n-propyl-4-silacyclohexyl) cyclohexyl)-1,2,6-trifluorobenzene: 16.2%

4-(trans-4-(trans-4-n-pentyl-4-silacyclohexyl) cyclohexyl)-1,2,6-trifluorobenzene: 8.8%

4-(trans-4-(trans-4-n-propyl1-4-silacyclohexyl) cyclohexyl)-1-difluoromethoxy-2,6-difluorobenzene: 9.8%

4-(trans-4- (trans-4-n-butyl-4-silacyclohexyl) cyclohexyl)-1-difluoromethoxy-2,6-difluorobenzene: 14.2%

4-(trans-4-(trans-4-n-pentyl-4-silacyclohexyl) cyclohexyl)-1-difluoromethoxy-2, 6-difluorobenzene: 16.0%

Trans-4-(trans-4-(2-(3,4-difluorophenyl) ethyl) cyclohexyl)-1n-propyl-1-silacyclohexane: 10.7%

Trans-4-(trans-4-(2-(3,4-difluorophenyl) ethyl) cyclohexyl)-1-n-pentyl-1-silacyclohexane: 10.3%

Trans, trans-4-(4-(4-n-propylcyclohexyl) cyclohexyl)-3', 4'-difluorobiphenyl: 2.5%

Trans, trans-4-(4-(4-n-pentylcyclohexyl) cyclohexyl)-3', 4'-difluorobiphenyl: 2.5%

The liquid crystal mixture with the composition listed above exhibits the following characteristics:

T$_{NI}$ =74.2° C., 1.53 V, Δn=0.083, VHR=98.5%

[Example 9]

4-(trans-4-n-pentyl-4-silacyclohexyl)-1-fluorobenzene: 3.8%

4-(trans-4-n-heptyl-4-silacyclohexyl)-1-fluorobenzene: 2.2%

4-(trans-4-(trans-4-n-propylcyclohexyl) cyclohexyl)-1,2,6-trifluorobenzene: 15.9%

4-(trans-4-(trans-4-n-butylcyclohexyl) cyclohexyl)-1,2,6-trifluorobenzene: 12.0%

4-(trans-4-(trans-4-n-pentylcyclohexyl) cyclohexyl)-1,2,6-trifluorobenzene: 12.0%

4-(trans-4-(trans-4-n-propyl-4-silacyclohexyl) cyclohexyl)-1trifluoromethoxybenzene: 10.5%

4-(trans-4-(-trans-4-n-pentyl-4-silacyclohexyl) cyclohexyl)-1-trifluoromethoxybenzene: 7.5%

4-(trans-4-(trans-4-n-propyl-4-silacyclohexyl) cyclohexyl)-1- difluoromethoxy-2,6-difluorobenzene: 6.9%

4-(trans-4-(trans-4-n-butyl-4-silacyclohexyl) cyclohexyl)-1difluoromethoxy-2,6-difluorobenzene: 9.9%

4-(trans-4-(trans-4-n-pentyl-4-silacyclohexyl) cyclohexyl)-1-difluoromethoxy-2,6-difluorobenzene: 11.2%

Trans, trans-2'-fluoro-4-(4-n-propyl-4-silacyclohexyl)-4'-(4-n-propylcyclohexyl) biphenyl: 2.7%

Trans, trans-2'-fluoro-4-(4-n-pentyl-4-silacyclohexyl)-4'-(4-n-propylcyclohexyl) biphenyl: 2.7%

Trans, trans-2'-fluoro-4-(4-n-pentylcyclohexyl)-4'-(4-n-pentylcyclohexyl) biphenyl: 2.7%

The liquid crystal mixture with the composition listed above exhibits the following characteristics:

T$_{NI}$=92.9° C., V$_{th}$=1.54 V, Δn=0.088, VHR=98.6%

[Example 10]

4-(trans-4-n-pentyl-4-silacyclohexyl)-1-methoxybenzene: 10%

4-(trans-4-(trans-4-n-propylcyclohexyl) cyclohexyl)-1,2,6-trifluorobenzene: 8.6%

4-(trans-4-(trans-4-n-pentylcyclohexyl) cyclohexyl)-1,2,6-trifluorobenzene: 6.4%

4-(trans-4-(trans-4-(1-propenyl) cyclohexyl) cyclohexyl)-1,2,6-trifluorobenzene: 10.0%

4-(trans-4-(trans-4-(3-methoxypropyl) cyclohexyl) cyclohexyl)-1-difluoromethoxy-2,6-difluorobenzene: 5.0%

4'-(trans-4-(4-fluoropentyl) cyclohexyl)-3-fluoro-4-difluoromethoxybiphenyl: 10.0%

4-(trans-4-(trans-4-n-propyl-4-silacyclohexyl) cyclohexyl)-1trifluoromethoxybenzene. 5.8%

4-(trans-4-(trans-4-n-pentyl-4-silacyclohexyl) cyclohexyl)-1-trifluoromethoxybenzene: 4.2%

4-(trans-4-(trans-4-n-propyl-4-silacyclohexyl) cyclohexyl)-1-difluoromethoxy-2,6-difluorobenzene: 4.9%

4-(trans-4-(trans-4-n-butyl-4-silacyclohexyl) cyclohexyl)-1-difluoromethoxy-2,6-difluorobenzene: 7.1%

4-(trans-4-(trans-4-n-pentyl-4-silacyclohexyl) cyclohexyl)-1difluoromethoxy-2,6-difluorobenzene: 8.0%

4-(trans-4-n-propyl-4-silacyclohexyl)-2'-fluoro-4-trifluoromethoxybiphenyl: 7.1%

4-(trans-4-n-pentyl-4-silacyclohexyl)-2'-fluoro-4-trifluoromethoxybiphenyl: 12.9%

[Example 11]

Trans, trans-4-(4-(2,2-difluorovinyl) cyclohexyl)-1-n-pentyl-1-silacyclohexane: 3.5%

Trans, trans-4-(4-(2,2-difluorovinyl) cyclohexyl)-1-n-heptyl-1-silacyclohexane: 3.5%

4-(trans-4-(trans-4-n-propyl-4-silacyclohexyl) cyclohexyl)-1,2-difluorobenzene: 18.7%

4-(trans-4-(trans-4-n-pentyl-4-silacyclohexyl) cyclohexyl)-1,2-difluorobenzene: 22.0%

4-(trans-4-(trans-4-n-propyl-4-silacyclohexyl) cyclohexyl)-1,2,6-trifluorobenzene: 7.3%

4-(trans-4-(trans-4-n-pentyl-4-silacyclohexyl) cyclohexyl)-1,2,6-trifluorobenzene: 4.0%

4-(trans-4-(trans-4-n-propyl-4-silacyclohexyl) cyclohexyl)-1-difluoromethoxy-2,6-difluorobenzene: 7.6%

4-(trans-4-(trans-4-n-butyl-4-silacyclohexyl) cyclohexyl)-1-difluoromethoxy-2,6-difluorobenzene:

4-(trans-4-(trans-4-n-pentyl-4-silacyclohexyl) cyclohexyl)-1-difluoromethoxy-2,6-difluorobenzene: 12.4%

Trans, trans-4-(4-(4-n-propyl-4-silacyclohexyl) cyclohexyl)-3',4',5'-trifluorobiphenyl: 3.1%

Trans, trans-4-(4-(4-n-pentyl-4-silacyclohexyl) cyclohexyl)-3',4',5'-trifluorobiphenyl: 6.9%

The liquid crystal mixture with the composition listed above exhibits the following characteristics:

$T_{NI}$=81.8° C.,$V_{th}$=1.42 V, $\Delta n$=0.081, VHR=99.2 %

[Example 12]

Trans, trans-4-(4-ethoxycyclohexyl)-1-n-pentyl-1-silacyclohexane: 5.0%

Trans, trans-4-(4-propoxycyclohexyl)-1-n-propyl-1-silacyclohexane. 5.0%

4-(trans-4-(trans-4-n-propyl-4-silacyclohexyl) cyclohexyl)-1-trifluoromethoxybenzene: 8.7%

4-(trans-4-(trans-4-n-butyl-4-silacyclohexyl) cyclohexyl)-1-trifluoromethoxybenzene: 4.5%

4-(trans-4-(trans-4-n-pentyl-4-silacyclohexyl) cyclohexyl)-1-trifluoromethoxybenzene: 5.7%

4-(trans-4-(trans-4-n-propyl-4-silacyclohexyl) cyclohexyl)-1,2,6-trifluorobenzene: 10.1%

4-(trans-4-(trans-4-n-pentyl-4-silacyclohexyl) cyclohexyl)-1,2,6-trifluorobenzene: 5.5%

4-(trans-4-(trans-4-n-propyl-4-silacyclohexyl) cyclohexyl)-1-(2,2-difluoroethoxy)-2,6-difluorobenzene: 7.6 %

4-(trans-4-(trans-4-n-butyl-4-silacyclohexyl) cyclohexyl)-1-(2,2-difluoroethoxy)-2,5-difluorobenzene: 25%

4-(trans-4-(trans-4-n-pentyl-4-silacyclohexyl) cyclohexyl)-1-(2,2-difluoroethoxy)-2,6-difluorobenzene: 22.8%

The liquid crystal mixture with the composition listed above exhibits the following characteristics:

$T_{NI}$=88.6° C.,$V_{th}$=1.68 V, $\Delta n$=0.081, VHR=99.3 %

[Example 13]

Trans, trans-4-(4-ethoxycyclohexyl)-1-n-pentyl-1-silacyclohexane: 5.0%6

Trans, trans-4-(4-n-propoxycyclohexyl)-1-n-propyl-1-silacyclohexane: 5.0%

4-(trans-4-(trans-4-n-propyl-4-silacyclohexyl) cyclohexyl)-1,2,6-trifluorobenzene: 16.3%

4-(trans-4-(trans-4-n-pentyl!-4-silacyclohexyl) cyclohexyl)-1,2,6-trifluorobenzene: 8.7%

4-(trans-4-(trans-4-n-propyl-4-silacyclohexyl) cyclohexyl)-1-difluoromethoxy-2,6-difluorobenzene:

4-(trans-4-(trans-4-n-butyl-4-silacyclohexyl) cyclohexyl)-1difluoromethoxy-2,6-difluorobenzene: 10. 6%

4-(trans-4-(trans-4-n-pentyl-4-silacyclohexyl) cyclohexyl)-1-difluoromethoxy-2,6-difluorobenzene: 12.0%

4'-(trans-4-n-propyl-4-silacyclohexyl)-2', 3,5-trifluoro-4-(2,2 -difluoroethoxy) biphenyl: 8. 6%

4'-(trans-4-n-pentyl-4-silacyclohexyl)-2', 3,5-trifluoro-4-(2,2 -difluoroethoxy) biphenyl:

Trans, trans-4'-(4-(4-n-propyl-4-silacyclohexyl) cyclohexyl)-3,4,5-trifluorobiphenyl: 2.8%

Trans, trans-4'-(4-(4-n-pentyl-4-silacyclohexyl) cyclohexyl)-3,4,5-trifluorobiphenyl: 2.2%

The liquid crystal mixture with the composition listed above exhibits the following characteristics:

$T_{NI}$=78.0° C.,$V_{th}$=1.30 V, $\Delta n$=0.092, VHR=99.0 %

[Example 14]

Trans, trans-4-(4-ethoxycyclohexyl)-1-n-pentyl-1-silacyclohexane: 4.9%

Trans, trans-4-(4-n-propoxycyclohexyl)-1-n-propyl-1-silacyclohexane: 4.9%

4-(trans-4-(trans-4-n-propyl-4-silacyclohexyl) cyclohexyl)-1trifluoromethoxybenzene: 7.7%

4-(trans-4-(trans-4-n-pentyl-4-silacyclohexyl) cyclohexyl)-1-trifluoromethoxybenzene: 5.5%

4-(trans-4-(trans-4-n-propyl-4-silacyclohexyl) cyclohexyl)-1,2-difluorobenzene: 6.8%

4-(trans-4-(trans-4-n-pentyl-4-silacyclohexyl) cyclohexyl)-1,2-difluorobenzene: 8.0%

4-(trans-4-(trans-4-n-propyl-4-silacyclohexyl) cyclohexyl)-1,2,6-Trifluorobenzene: 21. 6%

4-(trans-4-(Trans-4-n-pentyl1-4-silacyclohexyl) cyclohexyl)-1,2,6-trifluorobenzene: 11.5%

4'-(trans-4-n-propyl-4-silacyclohexyl)-2', 6'-difluoro-4-trifluoromethoxybiphenyl: 6.5%

4'-(trans-4-n-pentyl-4-silacyclohexyl)-2', 6'-difluoro-4-trifluoromethoxybiphenyl: 8.0%

Trans, trans-4-(4-(4-n-propyl-4-silacyclohexyl) cyclohexyl)-3',4'-difluorobiphenyl: 2.2%

Trans, trans-4-(4-(4-n-pentyl-4-silacyclohexyl) cyclohexyl)-3',4'-difluorobiphenyl: 4.8%

The liquid crystal mixture with the composition listed above exhibits the following characteristics:

$T_{NI}$=80.6° C.,$V_{th}$=1.50 V, $\Delta n$=0.090, VHR=99.0 %

[Example 15]

Trans, trans-4-(4-ethoxycyclohexyl)-1-n-pentylcyclohexane: 7.5%

Trans, trans-4-(4-n-propoxycyclohexyl)-1-n-propylcyclohexane: 7.5%

4-(trans-4-(-trans-4-n-propylcyclohexyl) cyclohexyl)-1,2,6-trifluorobenzene: 12.0%

4-(trans-4-(trans-4-n-butylcyclohexyl) cyclohexyl)-1,2,'6-trifluorobenzene: 9.0%

4-(trans-4-(trans-4-n-pentylcyclohexyl) cyclohexyl)-1,2,6-difluorobenzene: 9.0%

4-trans-4-(trans-4-n-propyl-4-silacyclohexyl) cyclohexyl)-1-trifluoromethoxybenzene: 11.6%

4-(trans-4-(trans-4-n-pentyl-4-silacyclohexyl) cyclohexyl)-1-trifluoromethoxybenzene: 8.4%

4-(trans-4-(trans-4-n-propyl-4-silacyclohexyl) cyclohexyl)-1-difluoromethoxy-2,6-difluorobenzene: 8.6%

4-(trans-4-(trans-4-n-butyl-4-silacyclohexyl) cyclohexyl)-1-difluoromethoxy-2,8-difluorobenzene: 12.4%

4-(trans-4-(trans-4-n-pentyl-4-silacyclohexyl) cyclohexyl)-1difluoromethoxy-2,6-di:fluorobenzene: 14.0%

The liquid crystal mixture with the composition listed above exhibits the following characteristics:

$T_{NI}$=87.0° C.,$V_{th}$=1.65 V, $\Delta n$=0.075, VHR=99.3 %

[Example16]

Trans, trans-4-(ethoxycyclohexyl)-1-n-pentyl-1-silacyclohexane: 4.0%

Trans, trans-4-(4-n-propoxycyclohexyl)-1-n-propyl-1-silacyclohexane: 4.0%

4-(trans-4-(trans-4-n-propylcyclohexyl) cyclohexyl)-1,2-difluorobenzene: 2.0%

4-(trans-4-(trans-n-butylcyclohexyl) cyclohexyl)-1,2-difluorobenzene: 2.0% 4-(trans-4-a-(trans-4-n-pentylcyclohexyl) cyclohexyl)-1,2-difluorobenzene: 1.9%

4-(trans-4-(trans-4-n-propylcyclohexyl) cyclohexyl)-1,2,6-trifluorobenzene: 12.1%

4-(trans-4-(trans-4-n-butylcyclohexyl) cyclohexyl)-1,2,6-trifluorobenzene: 12.1%

4-(trans-4-(trans-4-n-pentylcyclohexyl) cyclohexyl)- 1,2,6-trifluorobenzene: 12.0%

4-(trans-4-(trans-4-n-propyl-4-silacyclohexyl) cyclohexyl)-1,2,6-trifluorobenzene: 11.5%

4-(trans-4-(trans-4-n-pentyl-4-silacyclohexyl) cyclohexyl)-1,2,6-trifluorobenzene: 6.1%

Trans-4-(trans-4-(2-(3,4,5-trifluorophenyl) ethyl) cyclohexyl)-1n-propyl-1-silacyclohexane: 4-2%

Trans-4-(trans-4-(2-(3,4,5-trifluorophenyl) ethyl) cyclohexyl)-1n-pentyl-1-silacyclohexane: 1.7%

4'-(trans-4-n-propyl-4-silacyclohexyl)-2'-fluoro-4-trifluoromethoxybiphenyl: 4.9%

4-(trans-4-n-pentyl-4-silacyclohexyl)-2'-fluoro-4-trifluoromethoxybiphenyl: 8.8°'

4'-(trans-4-n-propyl-4-silacyclohexyl)-2', 6',3,4-tetrafluorobiphenyl: 1.5%

4'-(trans-4-n-pentyl-4-silacyclohexyl)-2', 6',3,4-tetrafluorobiphenyl: 2.1%

Trans, trans-4-(4-(4-n-propyl-4-silacyclohexyl) cyclohexyl)-3',4',5'-trifluorobiphenyl: 5.0%l Trans, trans-4-(4-(4-n-pentyl-4-silacyclohexyl) cyclohexyl)-3',4',5'-trifluorobiphenyl: 4.1%

The liquid crystal mixture with the composition listed above exhibits the following characteristics:

$T_{NI}$=81.8° C.,$V_{th}$=1.42 V, $\Delta n$=0.081, VHR=99.1 %

[Example 17]

4-(trans-4-n-pentyl-4-silacyclohexyl)-1-methoxybenzene:

4-(trans-4-(trans-4-n-ethylcyclohexyl ) cyclohexyl)-1,2-difluorobenzene: 14.1%

4-(trans-4-(
Trans-4-n-propylcyclohexyl) cyclohexyl)-1,2-difluorobenzene: 12.3%

4-(trans-4-(trans-4-ii-pentylcyclohexyl) cyclohexyl)-1,2-difluorobenzene: 8.8%

4-(trans-4-(trans-4-n-propyl-4-silacyclohexyl) cyclohexyl)-1,2,6-trifluorobenzene: 2.6%

4-(trans-4-(
Trans-4-n-pentyl-4-silacyclohexyl) cyclohexyl)-1,2,6-trifluorobenzene: 1.4%

4'-(trans-4-n-propyl-4-silacyclohexyl)-2'-fluoro-4-trifluoromethoxybiphenyl: 15.0%

4'-(trans-4-n-propyl-4-silacyclohexyl)-3-fluoro-4-difluoromethoxybiphenyl: 15.6%

4'-(trans-4-n-pentyl-4-silacyclohexyl)-3-fluoro-4-difluoromethoxybiphenyl: 19.4%

The liquid crystal mixture with the composition listed above exhibits the following characteristics:

$T_{NI}$=79.4° C.,$V_{th}$=1.36 V, $\Delta n$=0.108, VHR=98.5 %

[Example 18]

Trans-4-(2-(p-fluorophenyl) ethyl)-1-n-pentylcyclohexane:2.4%

Trans-4-(2-(p-fluorophenyl) ethyl)-1-n-heptylcyclohexane: 2.4%

4-(trans-4-(trans-4-n-propylcyclohexyl) cyclohexyl)-1,2-difluorobenzene: 1.6%

4-(trans-4-(trans-4-n-butylcyclohexyl) cyclohexyl)-1,2-difluorobenzene: 1.6%

4-(trans-4-(trans-4-n-pentylcyclohexyl) cyclohexyl)-1,2-difluorobenzene: 1.6%

4-(trans-4-(trans-4-n-propylcyclohexyl) cyclohexyl)-1,2,6-trifluorobenzene: 12.7%

4-(trans-4- (trans-4-n-butylcyclohexyl) cyclohexyl)-1,2,6-tri-fluorobenzene: 12.7%

4-(trans-4-(trans-4-n-pentylcyclohexyl) cyclohexyl)-1,2,6-trifluorobenzene: 12.7%

Trans-4-(trans-4-(2-(3,4,5-trifluorophenyl) ethyl) cyclohexyl)-1-n-propylcyclohexane: 3.2%

Trans-4-(trans-4-(2-(3,4,5-trifluorophenyl) ethyl) cyclohexyl)-1-n-butylcyclohexane: 3.2%

Trans-4-(trans-4-(2-(3,4,5-trifluorophenyl) ethyl) cyclohexyl)-1-n-pentylcyclohexane: 3.1%

4-(trans-4-(trans-4-n-propyl-4-silacyclohexyl) cyclohexyl)-1trifluoromethoxybenzene: 2.7%

4-(trans-4-(trans-4-n- pentyl-4-silacyclohexyl) cyclohexyl)-1-trifluoromethoxybenzene: 2.1%

4-(trans-4-(trans-4-n-propyl-4-silacyclohexyl) cyclohexyl)-1,2,6-trifluorobenzene: 9.1%

4-(trans-4-(trans-4-n-pentyl-4-silacyclohexyl) cyclohexyl)-,1,2,6-trifluorobenzene 5.2%

Trans-4-(trans-4-(2-(3,4,5-trifluorophenyl) ethyl) cyclohexyl)-1-n-propyl-1-silacyclohexane: 3.4 %

Trans-4-(trans-4-(2-(3,4,5-trifluorophenyl) ethyl) cyclohexyl)-1-n-pentyl-1-silacyclohexane: 1. 4%

4'-(trans-4-n-propyl-4-silacyclohexyl)-2'-fluoro-4-trifluoromethoxybiphenyl: 3.2%

4'-(trans-4-n-pentyl!-4-silacyclohexyl)-2'-trifluoromethoxybiphenyl: 6.3%

4'-(trans-4-n-propyl-4-silacyclohexyl)-3-fluoro-4-difluoromethoxybiphenyl: 4.1%

4-(trans-4-n-pentyl-4-silacyclohexyl)-3-fluoro-4-difluoromethoxybiphenyl: 5.4%

The liquid crystal mixture with the composition listed above exhibits the following characteristics:

$T_{NI}$=80.0° C., $V_{th}$=1.34 V, $\Delta n$=0.089, VHR=98.6%

[Example 19]

4-(trans-4-(trans-4-n-propylcyclohexyl) cyclohexyl)-1, 2-difluorobenzene: 2.6%

4-(trans-4-(trans-4-n-butylcyclohexyl) cyclohexyl)-1,2-difluorobenzene: 2.6%

4-(trans-4-(trans-4-n-pentylcyclohexyl) cyclohexyl)-1,2-difluorobenzene: 2.6%

4-(trans-4-n-propylcyclohexyl!) cyclohexyl)-1,2,6-trifluorobenzene: 5.1%

4-(Trans-4-(trans-4-n-butylcyclohexyl) cyclohexyl)-1,2, 6-trifluorobenzene: 5.1%

4-(trans-4-(trans-4-n-pentylcyclohexyl) cyclohexyl)-1,2, 6-trifluorobenzene: 5.2%

4-(trans-4-n-pentyl-4-silacyclohexyl)-1-methoxybenzene: 7.7%

4-(trans-4-(trans-4-n-propyl-4-silacyclohexyl) cyclohexyl)-1-trifluoromethoxybenzene: 4.5%

4-(trans-4-(trans-4-n-a-pentyl-4-silacyclohexyl) cyclohexyl)-1-tri-4trifluoromethoxybenzene: 3.2%

4-(trans-4-(trans-4-n-propyl-4-silacyclohexyl) cyclohexyl)-1,2,6-trifluorobenzene: 15.1%

4-(trans-4-(trans-4-n-pentyl-4-silacyclohexyl) cyclohexyl)-1,2,6-trifluorobenzene: 8.0%

Trans-4-(trans-4-(2-(3,4-difluorophenyl) ethyl) cyclohexyl)-1-propyl-1silacyclohexane: 5.5%

Trans-4-(trans-4-(2-(3,4-difluorophenyl) ethyl) cyclohexyl)-1-n-pentyl-1-silacyclohexane: 2.2%

4'-(trans-4-n-propyl-4-silacyclohexyl)-2', 6'-difluoro-4-trifluoromethoxybiphenyl: 6.9%

4'1(trans-4-n-pentyl-4-silacyclohexyl)-2', 6 -difluoro-4-trifluoromethoxybiphenyl: 8.5%

Trans, trans-4-(4-(4-n-propyl-4-silacyclohexyl) cyclohexenyl)-3',4',5'-trifluorobiphenyl: 8.5%

Trans, trans-4-(4-(4-n-pen -Y1-4-silacyclohexyl) cyclohexyl)-3',4',5'-trifluorobiphenyl: 6. 9%

The liquid crystal mixture with the composition listed above exhibits the following characteristics:

$T_{NI}$=86.9° C.,$V_{th}$=1.37 V, $\Delta n$=0.095, VHR=99.0 %

[Example 20]

4-(trans-4-n-pentyl-4-silacyclohexyl)-1methoxybenzene: 10. 8%

Trans-4-(2-(trans-4-(3, 4-difluorophenyl) cyclohexyl) ethyl)-1-ethylcyclohexane: 4.3%

Trans-4-(2-(trans-4-(3,4-difluorophenyl) cyclohexyl) ethyl)-1-n-propylcyclohexane: 1.7%

Trans-4-(2-(trans-4-(3,4-difluorophenyl) cyclohexyl) ethyl)-1-pentylcyclohexane: 4.0%

4-(trans-4-(trans-4-n-propyl-4-silacyclohexyl) cyclohexyl)-1trifluoromethoxybenzene: 17.0%

4-(trans-4-(trans-4-n-pentyl-4-silacyclohexyl) cyclohexyl)-1trifluoromethoxybenzene: 12.2%

4'-(trans-4-n-propyl-4-silacyclohexyl)-2'-fluoro-4-trifluoromethoxybiphenyl: 15.0%

4'-(trans-4-n-propyl-4-silacyclohexyl)-3-fluoro-4-difluoromethoxybiphenyl: 15.6%

4'-(trans-4-n-pentyl-4-silacyclohexyl)-3-fluoro-4-difluoromethoxybiphenyl: 19.4%

The liquid crystal mixture with the composition listed above exhibits the following characteristics:

$T_{NI}$=80.4° C., $V_{th}$=1.53 V, $\Delta n$=0.111, VHR=98.6 %

[Example 21]

4-(trans-4-(trans-4-n-propylcyclohexyl) cyclohexyl)-1,2-difluorobenzene: 2.0%

4-(trans-4-(trans-4-n-butylcyclohexyl) cyclohexyl)-1,2-di-fluorobenzene: 2.0%

4-(trans-4-(trans-4-n-pentylcyclohexyl) cyclohexyl)-1,2-difluorobenzene: 1.9%

4-(trans-4-(trans-4-n-propylcyclohexyl) cyclohexyl)-1,2, 6-trifluorobenzene: 11.8%

4-(trans-4-(trans-4-n-butylcyclohexyl) cyclohexyl)-1,2,6-trifluorobenzene: 11.8%

4-(trans-4-(trans-4-n-pentylcyclohexyl) cyclohexyl)-1,2, 6-trifluorobenzene: 11.7%

4'-(trans-4-n-propylcyclohexyl)-3,4-difluorobiphenyl: 5.9%

4'-(trans-4-n-pentylcyclohexyl)-3,4-difluorobiphenyl: 5.9%

4-(trans-4-n-pentyl-4-silacyclohexyl)-1-methoxybenzene: 5.9%

4-(trans-4-(trans-4-n-propyl-4-silacyclohexyl) cyclohexyl)-1,2,6-trifluorobenzene: 11.5%

4-(trans-4-(trans-4-n-pentyl-4-silacyclohexyl) cyclohexyl)-1,2,6-trifluorobenzene: 6.7%

Trans-4-(trans-4-(2-(3,4,5-trifluorophenyl) ethyl) cyclohexyl)-1-n-propyl-as-sa-lacyclohexane: 4. 2%

Trans-4-(trans-4-(2-(3,4,5-trifluorophenyl) ethyl) cyclohexyl)-1-n-pentyl-1-silacyclohexane: 1.7%

4'-(trans-4-n-pentyl-4-silacyclohexyl)-2'-fluoro-4-trifluoromethoxybiphenyl: 2.1%

4'-(trans-4-n-pentyl-4-silacyclohexyl)-2'-fluoro-4-trifluoromethoxybiphenyl: 3.8%

4'-(trans-4-n-propyl-4-silacyclohexyl)-2', 6',3, 4-tetrafluorobiphenyl: 0.7%

4? a-(trans-,4-n-pentyl-4-silacyclohexyl)-2', 6',3,4-tetrafluorobiphenyl: 1.0%

Trans, trans-4-(4-(4-n-pentyl-4-silacyclohexyl) cyclohexyl)-3',4',5'-trifluorobiphenyl: 2.3% Trans, trans-4-(4-(4-n-pentyl-4-silacyclohexyl) cyclohexyl)-3',4',5'-trifluorobiphenyl: 1.9%

The liquid crystal mixture with the composition listed above exhibits the following characteristics:

$T_{NI}$=75.3° C., $V_{th}$=1.35 V, $\Delta n$=0.091, VHR=98.5 %

[Example 22]

4-(trans-4-(trans-4-n-propylcyclohexyl) cyclohexyl)-1,2-difluorobenzene: 2.6%

4-(trans-4-(trans-4-n-butylcyclohexyl) cyclohexyl)-1,2-difluorobenzene: 2.6%

4-(trans-4-(trans-4-n-pentylcyclohexane) cyclohexyl)-1, 2-difluorobenzene: 2.5%

4-(trans-4-(trans-4-n-propylcyclohexyl) cyclohexyl)-1,2, 6-trifluorobenzene: 5.1%

4-(trans-4-(trans-4-n-butylcyclohexyl) cyclohexyl)-1,2,6-trifluorobenzene: 5.2%

4-(trans-4-(trans-4-n-pentylcyclohexyl) cyclohexyl)-1,2, 6-trifluorobenzene: 5.2%

4-(trans-4-n-pentyl-4-silacyclohexyl)-1-methoxybenzene: 7.7%

4-(trans-4-(trans-4-n-propyl-4-silacyclohexyl) cyclohexyl)-1-trifluoromethoxybenzene: 4.5%

4-(trans-4-(trans-4-n-pentyl-4-silacyclohexyl) cyclohexyl)-1-trifluoromethoxybenzene: 3.2%

4-(-trans-4-(trans-4-n-propyl-4-silacyclohexyl) cyclohexyl)-1,2,6-trifluorobenzene: 15.1%

4-(trans-4-(trans-4-n-pentyl-4-silacyclohexyl) cyclohexyl)-1,2,6-trifluorobenzene 8.0%

Trans-4-(trans-4-(2-(3,4,5-trifluorophenyl) ethyl) cyclohexyl)-1-n-propyl-1-silacyclohexane: 5.5%

Trans-4-(trans-4-(2-(3,4,5-trifluorophenyl) ethyl) cyclohexyl)-1-n-pentyl-1-silacyclohexane: 2.2%

4'-(trans-4-n-propyl-4-silacyclohexyl)-2', 6-difluoro-4-trifluoromethoxybiphenyl: 6.9%

4'-(trans-4-n-pentyl-4-silacyclohexyl)-2', 6-difluoro-4-trifluoromethoxybiphenyl: 8.5%

Trans, trans-4-(4-(4-n-propyl-4-silacyclohexyl) cyclohexyl)-3',4',5'-trifluorobiphenyl: 8.5%

Trans, trans-4-(4-(4-n-pentyl-4-silacyclohexyl) cyclohexyl)-3',4',4)5'-trifluorobiphenyl: 6.9%

The liquid crystal mixture with the composition listed above exhibits the following characteristics:

$T_{NI}$=86.9° C., $V_{th}$=1.37 V, Δn=0.095, VHR=99.0%

[Example 23]

4-(trans-4-n-pentyl-4-silacyclohexyl)-1-methoxybenzene: 10.8%

4'-(trans-4-ethylcyclohexyl)-3,4-difluorobiphenyl: 12.7%

4'-(trans-4-n-propylcyclohexyl)-3,4-difluorobiphenyl:- 13.3%

4'-(trans-4-n-propylcyclohexyl)-3,4-difluorobiphenyl: 24.0%

4-(trans-4-(trans-4-n-propyl-4-silacyclohexyl) cyclohexyl)-1-trifluoromethoxybenzene: 17.0%

4-(trans-4-(trans-4-n-pentyl-4-silacyclohexyl) cyclohexyl)-1trifluoromethoxybenzene: 12.2%

4-(trans-4-(trans-4-n-propyl-4-silacyclohexyl) cyclohexyl)-1,2,6-trifluorobenzene: 2.6%

4-(trans-4-(trans-4-n-pentyl-4-silacyclohexyl) cyclohexyl)-1,2,6-trifluorobenzene: 1.4%

4-(trans-4-(trans-4-n-propyl-4-silacyclohexyl) cyclohexyl)-1-difluoromethoxy-2,6-difluorobenzene: 1.5%

4-(trans-4-(trans-4-n-butyl-4-silacyclohexyl) cyclohexyl)-1difluoromethoxy-2,6-difluorobenzene: 2.1%

4-(trans-4-(trans-4-n-pentyl-4-silacyclohexyl) cyclohexyl)-1difluoromethoxy-2,6-difluorobenzene: 2.4%

The liquid crystal mixture with the composition listed above exhibits the following characteristics:

$T_{NI}$=83.6° C., $V_{th}$=1.53 V, Δn=0.111, VHR=98.5 %

[Example 24]

4-(trans-4-n-pentylcyclohexyl)-1-fluorobenzene: 5.0%

4-(trans-4-n-heptylcyclohexyl)-1-fluorobenzene: 5.0%

4-(trans-4-(trans-4-n-propylcyclohexyl) cyclohexyl)-1,2-difluorobenzene: 3.3%

4-(trans-4-(trans-4-n-butylcyclohexyl) cyclohexyl)-1,2-difluorobenzene: 3.3%

4-(trans-4-(trans-4-n-pentyl cyclohexyl) cyclohexyl)-1,2-difluorobenzene: 3.4%

4-(trans-4-(trans-4-n-propylcyclohexyl) cyclohexyl)-1,2, 6-trifluorobenzene: 6.7%

4-(trans-4-(trans-4-n-butylcyclohexyl) cyclohexyl)-1,2,6-trifluorobenzene: 6.7%

4-(trans-1-(trans-4-n-pentylcyclohexyl) cyclohexyl)-1,2, 6-trifluorobenzene: 6.6%

4-(trans-4-(trans-4-n-pentyl-4-silacyclohexyl) cyclohexyl)-1-trifluoromethoxybenzene: 11.6%

4-(trans-4-(trans-4-n-pentyl1-4-silacyclohexyl) cyclohexyl)-1-trifluoromethoxybenzene: 8.4%

4-(trans-4-(trans-4-n-propyl-4-silacyclohexyl) cyclohexyl)-1,2,6-trifluorobenzene: 13.1%

4-(trans-4-(trans-4-n-pentyl-4-silacyclohexyl) cyclohexyl)-1,2,6-trifluorobenzene: 6.9%

4'-(trans-4-n-pentyl -silacyclohexyl)-2'-fluoro-4-trifluoromethoxybiphenyl: 7.1% 4,-(trans-4-n-pentyl-4-silacyclohexyl/)-2'-fluoro-4-trifluoromethoxybiphenyl: 12.9%

The liquid crystal mixture with the composition listed above exhibits the following characteristics:

$T_{NI}$=75.2° C.,$V_{th}$=1.49 V, Δn=0.089, VHR=99.2 %

[Example 25]

4-(trans-4-(trans-4-n-pentylcyclohexyl)-1,2-difluorobenzene: 5.1%

4-(trans-4-(trans-4-n-heptylcyclohexyl)-1,2-difluorobenzene: 5.1%

4-(trans-4-(trans-4-n-propyl-4-silacyclohexyl) cyclohexyl)-1-trifluoromethoxybenzene: 19.7%

4-(trans-4-(trans-4-n-pentyl-4-silacyclohexyl) cyclohexyl)-1-trifluoromethoxybenzene: 14.1%

4-(trans-4-(trans-4-n-propyl-4-silacyclohexyl) cyclohexyl)-1-difluoromethoxy-2,6-difluorobenzene: 1.5%

4-(trans-4-(trans-4-n-butyl-4-silacyclohexyl) cyclohexyl)-1-difluoromethoxy-2,6-difluorobenzene: 2.1%

4-(trans-4-(trans-4-n-pentyl-4-silacyclohexyl) cyclohexyl)-1-difluoromethoxy-2,6-difluorobenzene: 2.4%

4'-(trans-4-n-propyl-4-silacyclohexyl)-2'-fluoro-4-trifluoromethoxybiphenyl: 15.0%

4'-(trans-4-n-propyl-4-silacyclohexyl)-3-fluoro-4-difluoromethoxybiphenyl: 15.6%

4'-(trans-4-n-pentyl-4-silacyclohexyl)-3-fluoro-4-difluoromethoxybiphenyl: 19.4%

[Example 26]

4-(trans-4-n-pentylcyclohexyl)-1-fluorobenzene: 5.0%

4-(trans-4-n-heptylcyclohexyl)-1-fluorobenzene: 5.0%

4-(trans-4-(trans-4-n-propylcyclohexyl) cyclohexyl)-1,2-difluorobenzene: 10.0%

4-(trans-4-(trans-4-n-butylcyclohexyl) cyclohexyl)-1,2-difluorobenzene: 10.0%

4-(trans-4-(trans-4-n-pentylcyclohexyl) cyclohexyl)-1,2-difluorobenzene: 10.0%

4-(trans-4-(trans-4-n-propyl-4-silacyclohexyl) cyclohexyl)-1,2,6-trifluorobenzene: 13.1%

4-(trans-4-(trans-4-n-pentyl-4-silacyclohexyl) cyclohexyl)-1,2,6-trifluorobenzene: 6.9%

4-(trans-4-(trans-4-n-propyl-4-silacyclohexyl) cyclohexyl)-1-difluoromethoxy-2,6-difluorobenzene: 3.7%

4-(trans-4-(trans-4-n-butyl-4-silacyclohexyl) cyclohexyl)-1-difluoromethoxy-2,6-difluorobenzene: 5.3%

4-(trans-4-(trans-4-n-pentyl-4-silacyclohexyl) cyclohexyl)-1-difluoromethoxy-2,6-difluorobenzene: 6.0%

4-(trans-4-n-pentyl-4-silacyclohexyl)-1-methoxybenzene: 5.0%

4'-(trans-4-n-propyl-4-silacyclohexyl)-2',6'-difluoro-4-trifluoromethoxybiphenyl: 4.5%

4'-(trans-4-n-pentyl-4-silacyclohexyl)-2',6'-difluoro-4-trifluoromethoxybiphenyl: 5.5%

Trans, trans-4-(4-(4-n-propyl-4-silacyclohexyl) cyclohexyl)-3',4',5'-trifluorobiphenyl: 5.5%

Trans, trans-4-(4-(4-n-pentyl-4-silacyclohexyl) cyclohexyl)-3',4',5'-trifluorobiphenyl: 4.5%

The liquid crystal mixture with the composition listed above exhibits the following characteristics:

$T_{NI}=79.1°$ C., $V_{th}=1.44$ V, $\Delta n=0.090$, VHR=98.8 %

[Example 27]

Trans-4-(2-(p-fluorophenyl) ethyl)-1-n-pentylcyclohexane: 1.6%

Trans-4-(2-(p-fluorophenyl) ethyl)-1-n-heptylcyclohexane: 1.6%

4-(trans-4-(trans-4-n-propylcyclohexyl) cyclohexyl)-1,2-difluorobenzene: 1.1%

4-(trans-4-(trans-4-n-butylcyclohexyl) cyclohexyl)-1,2-difluorobenzene: 1.1%

4-(trans-4-(trans-4-n-pentylcyclohexyl) cyclohexyl)-1,2-difluorobenzene: 1.0%

4-(trans-4-(trans-4-n-propylcyclohexyl) cyclohexyl)-1,2,6-trifluorobenzene: 8.6%

4-(trans-4-(trans-4-n-butylcyclohexyl) cyclohexyl)-1,2,6-trifluorobenzene: 8.6%

4-(trans-4-(trans-4-n-pentylcyclohexyl) cyclohexyl)-1,2,6-trifluorobenzene: 8.6%

Trans-4-(trans-4-(2-(3,4,5-trifluorophenyl) ethyl) cyclohexyl)-1-n-propylcyclohexane: 2.2%

Trans-4-(trans-4-(2-(3,4,5-trifluorophenyl) ethyl) cyclohexyl)-1n-butylcyclohexane: 2.2%

Trans-4-(trans-4-(2-(3,4,5-trifluorophenyl) ethyl) cyclohexyl1)-1n-pentylcyclohexane: 2.1%

4-(trans-4-(trans-4-n-propyl-4-silacyclohexyl) cyclohexyl)-1-trifluoromethoxybenzene: 1.9%

4-(trans-4-(trans-4-n-pentyl-4-silacyclohexyl) cyclohexyl)-1-trifluoromethoxybenzene: 1.3%

4-(trans-4-(trans-4-n-propyl-4-silacyclohexyl) cyclohexyl)-1,2,6-trifluorobenzene: 16.9%

4-(trans-4-(trans-4-n-pentyl-4-silacyclohexyl) cyclohexyl)-1,2,6-trifluorobenzene: 8.9%

4-(trans-4-(trans-4-n-propyl-4-silacyclohexyl) cyclohexyl)-1-difluoroethoxy-2,6-difluorobenzene: 2.7%

4-(trans-4-(trans-4-n-pentyl-4-silacyclohexyl) cyclohexyl)-1-difluoroethoxy-2,6-difluorobenzene: 3.8%

Trans-4-(trans-4-(2-(3,4,5-trifluorophenyl) ethyl) cyclohexyl)-1-n-propyl-1-silacyclohexane: 2.3%

Trans-4-(trans-4-(2-(3,4,5-trifluorophenyl) ethyl) cyclohexyl)-1n-pentyl-1-silacyclohexane:

4'-(trans-4-n-propyl-4-silacyclohexyl)-2'-fluoro-trifluoromethoxybiphenyl: 5.7%

4'-(trans-4-n-pentyl-4-silacyclohexyl)-2'-fluoro-4-trifluoromethoxybiphenyl: 10.4%

4'-(trans-4-n-propyl-4-silacyclohexyl)-3-fluoro-4-difluoromethoxybiphenyl: 2.9%

4'-(trans-4-n-pentyl-4-silacyclohexyl)-3-fluoro-4-difluoromethoxybiphenyl: 3.6%

The liquid crystal mixture with the composition listed above exhibits the following characteristics:

$T_{NI}=75.1°$ C., $V_{th}=1.32$ V, $\Delta n=0.089$, VHR=98.8 %

[Example 28]

4-(trans-4-n-pentyl-4-silacyclohexyl)-1-methoxybenzene: 10.8%

4-(trans-4-(trans-4-n-ethylcyclohexyl) cyclohexyl)-1,2-difluorobenzene: 14.1%

4-(trans-4-(trans-4-n-propylcyclohexyl) cyclohexyl)-1,2-difluorobenzene: 12.3%

4-(trans-4-(trans-4-n-pentylcyclohexyl) cyclohexyl)-1,2-difluorobenzene: 8.8%

4-(trans-4-(trans-4-n-propyl-4-silacyclohexyl) cyclohexyl)-1,2-difluorobenzene: 4.6%

4-(trans-4-(trans-4-n-pentyl-4-silacyclohexyl) cyclohexyl)-1,2-difluorobenzene: 5.4%

4-(trans-4-(trans-4-n-propyl-4-silacyclohexyl) cyclohexyl)-1,2,6-trifluorobenzene: 2.6%

4-(trans-4-(trans-4-n-pentyl-4-silacyclohexyl) cyclohexyl)-1,2,6-trifluorobenzene: 1.4%

4'-trans-4-n-propyl-4-silacyclohexyl)-2'-fluoro-4-trifluoromethoxybiphenyl: 15.0%

4'-(trans-4-n-propyl-4-silacyclohexyl)-3'fluoro-4-difluoromethoxybiphenyl: 11.1%

4'-(trans-4-n-pentyl-4-silacyclohexyl)-3-fluoro-4-difluoromethoxybiphenyl: 13.9%

The liquid crystal mixture with the composition listed above exhibits the following characteristics:

$T_{NI}=78.5°$ C., $V_{th}=1.38$ V, $\Delta n=0.101$, VHR=99.2 %

[Example 29]

4-(trans-4-n-pentylcyclohexyl)-1-fluorobenzene: 4.5%

4-(trans-4-n-heptylcyclohexyl)-1-fluorobenzene: 4.6%

4-(trans-4-(trans-4-n-propylcyclohexyl) cyclohexyl)-1,2-difluorobenzene: 3.0%

4-(trans-4-(trans-4-n-butylcyclohexyl) cyclohexyl)-1,2-difluorobenzene: 3.0%

4-(trans-4-(trans-4-n-pentylcyclohexyl) cyclohexyl)-1,2-difluorobenzene: 3.1%

4-(trans-4-(trans-4-n-propylcyclohexyl) cyclohexyl)-1,2,6-trifluorobenzene: 6.0%

4-(trans-4-(trans-4-n-butylcyclohexyl) cyclohexyl)-1,2,6-trifluorobenzene: 6.1%

4-(trans-4-(trans-4-n-pentylcyclohexyl) cyclohexyl)-1,2,6-trifluorobenzene: 6.1%

4-(trans-4-(trans-4-n-propyl-4-silacyclohexyl) cyclohexyl)-1-tri4fluoromethoxybenzene: 5.3%

4-(trans-4-(trans-4-n-pentyl-4-silacyclohexyl) cyclohexyl)-1-trifluoromethoxybenzene: 3.8%

4-(trans-4-(trans-4-n-propyl-4-silacyclohexyl) cyclohexyl)-1,2,6-trifluorobenzene: 17.8%

4-(trans-4-(trans-4-n-pentyl-4-silacyclohexyl) cyclohexyl)-1,2,6-trifluorobenzene: 9.5%

Trans-4-(trans-4-(2-(3,4,trifluorophenyl) ethyl) cyclohexyl)-1-n-propyl-1-silacyclohexane: 6.5%

Trans-4-(trans-4-(2-(3,4,5-trifluorophenyl) ethyl) cyclohexyl)-1-n-pentyl-1-silacyclohexane: 2.6%

4'-(trans-4-n-propyl-4-silacyclohexyl)-2', 6'-difluoro-4-trifluoromethoxybiphenyl: 4.1%

4'-(trans-4-n-pentyl-4-silacyclohexyl)-2', 6'-difluoro-4-trifluoromethoxybiphenyl: 5.0%.

Trans, trans-4-(4-(4-n-propyl-4-silacyclohexyl) cyclohexyl)-3',4',5'-trifluorobiphenyl: 5.0%

Trans, trans-4-(4-(4-n-pentyl-4-silacyclohexyl) cyclohexyl)-3',4',5'-trifluorobiphenyl: 4.1%

The liquid crystal mixture with the composition listed above exhibits the following characteristics:

$T_{NI}$=78.3° C., $V_{th}$=1.40 V, $\Delta n$=0.087, VHR=98.7 %

[Example 30]

4-(trans-4-n-pentyl-4-silacyclohexyl)-1-fluorobenzene: 4.1%

4-(trans-4-n-heptyl-4-silacyclohexyl)-1-fluorobenzene: 3.6%

4-(trans-4-(trans-4-n-propylcyclohexyl) cyclohexyl)-1-trifluoromethoxybenzene: 5.9%

4-(trans-4-(trans-4-n-butylcyclohexyl) cyclohexyl)-1-trifluoromethoxybenzene: 2.9%

4-(trans-4-(trans-4-n-pentylcyclohexyl) cyclohexyl)-1-trifluoromethoxybenzene: 6.6%

4-(trans-4-(trans-4-n-propyl-4-silacyclohexyl) cyclohexyl)-1,2,6-trifluorobenzene: 20.0%

4-(trans-4-(trans-4-n-pentyl-4-silacyclohexyl) cyclohexyl)-1,2,6-trifluorobenzene: 10.7%

4'-(trans-4-n-propyl-4-silacyclohexyl)-2'-fluoro-4-trifluoromethoxybiphenyl: 2.7%

4'-(trans-4-n-pentyl-4-silacyclohexyl)-2'-fluoro-4-trifluoromethoxybiphenyl: 5.0%

4'-(trans-4-n-propyl-4-silacyclohexyl)-3-fluoro-4-difluoromethoxybiphenyl-: 10.3%

4'-(trans-4-n-pentyl-4-silacyclohexyl)-3-fluoro-4-difluoromethoxybiphenyl: 12.8%

4'-(trans-4-n-propyl-4-silacyclohexyl)-2', 6'-difluoro-4-trifluoromethoxybiphenyl: 3.5%

4'-(trans-4-n-pentyl-4-silacyclohexyl)-2', 6'-difluoro-4-trifluoromethoxybiphenyl: 4.2%

Trans, trans-4-(4-(4-n-propyl-4-silacyclohexyl) cyclohexyl)-3',4',5'-trifluorobiphenyl: 4.2%

Trans, trans-4-(4-(4-n-pentyl-4-silacyclohexyl) cyclohexyl)-3',4',5'-trifluorobiphenyl: 3.5%

The liquid crystal mixture with the composition listed above exhibits the following characteristics:

$T_{NI}$=80.9° C., $V_{th}$=1.47 V, $\Delta n$=0.109, VHR=98.5 %

[Example 31]

4-(trans-4-(trans-4-n-propyl-4-silacyclohexyl) cyclohexyl)-1,2-difluorobenzene: 23.0%

4-(trans-d-(trans-4-n-pentyl-4-silacyclohexyl) cyclohexyl)-1,2-difluorobenzene: 27.0%

4-(trans-4-('trans-4-n-propyl-4-silacyclohexyl) cyclohexyl)-1,2,6-trifluorobenzene: 9.7%

4-(trans-4-(trans-4-n-pentyl-4-silacyclohexyl) cyclohexyl)-1,2,6-trifluorobenzene: 5.3%

4-(trans-4-(trans-4-n-propyl-4-silacyclohexyl) cyclohexyl)-1-difluoromethoxy-2,6-difluorobenzene: 8.6%

4-(trans-4-(trans-4-n-butyl-4-silacyclohexyl) cyclohexyl)-1-difluoromethoxy-2,6-difluorobenzene: 12.4%

4-(trans-4-(trans-4-n-pentyl-4-silacyclohexyl) cyclohexyl)-1-difluoromethoxy-2,6-difluorobenzene: 14.0%

The liquid crystal mixture with the composition listed above exhibits the following characteristics:

$T_{NI}$=74° C., $V_{th}$=1.24 V, $\Delta n$=0.076, VHR=99%

[Example 32]

4-(trans-4-n-pentyl-4-silacyclohexyl)-1-fluorobenzene: 3.0%

4-(trans-4-n-heptyl-4-silacyclohexyl)-1-fluorobenzene: 1.7%

4-(trans-4-(trans-4-n-propyl-4-silacyclohexyl) cyclohexyl)-1,2-difluorobenzene: 20.2%

4-(trans-4-(trans-4-n-propyl-4-silacyclohexyl) cyclohexyl)-1,2-difluorobenzene: 23.8%

4-(trans-4-(trans-4-n-propyl-4-silacyclohexyl) cyclohexyl)-1,2,6-trifluorobenzene: 8.6%

4-(trans-4-(trans-4-n-pentyl-4-silacyclohexyl) cyclohexyl)-1,2,6-trifluorobenzene: 4.7%

4-(trans-4-(trans-4-n-propyl-4-silacyclohexyl) cyclohexyl)-1-difluoromethoxy-2,6-difluorobenzene: 7.6%

4-(trans-4-(trans-4-n-butyl-4-silacyclohexyl) cyclohexyl)-1-difluoroethoxy-2,6-difluorobenzene: 11.0%

4-(trans-4-(trans-4-n-pentyl-4-silacyclohexyl) cyclohexyl)-1-difluoromethoxy-2,6-difluorobenzene: 12.4% trans, trans-4-(4-(4-n-propyl-4-silacyclohexyl) cyclohexyl)-3',4'-difluorobiphenyl: 2.2% trans, trans-4-(4-(4-n-pentyl-4-silacyclohexyl) cyclohexyl)-3',4'-difluorobiphenyl: 4.8%

The liquid crystal mixture with the composition listed above exhibits the following characteristics:

$T_{NI}$=78° C., $V_{th}$=1.33 V, $\Delta n$=0.083, VHR=98.5 %

[Example 33]

4-(trans-4-n-pentyl-4-silacyclohexyl)-1-methoxybenzene: 5.8%

4-(trans-4-(trans-4-n-propyl-4-silacyclohexyl) cyclohexyl)-1-trifluoromethoxybenzene: 7.7%

4-(trans-4-(trans-4-n-butyl-4-silacyclohexyl) cyclohexyl)-1-trifluoromethoxybenzene: 7.7%

4-(trans-4-(trans-4-n-pentyl-4-silacyclohexyl) cyclohexyl)-1-trifluoromethoxybenzene: 7.7%

4-(trans-4-(trans-4-n-propyl-4-silacyclohexyl) cyclohexyl)-1,2,6-trifluorobenzene: 10.1%

4-(trans-4-(trans-4-n-pentyl-4-silacyclohexyl) cyclohexyl)-1,2,6-trifluorobenzene: 5.5%

4-(trans-4-(trans-4-n-propyl-4-silacyclohexyl) cyclohexyl)-1-difluoromethoxy-2,6-difluorobenzene: 13.6%

4-(trans-4-(trans-4-n-pentyl4-silacyclohexyl) cyclohexyl)
-1-difluoromethoxy-2,6-difluorobenzene: 19.6%

4-(trans-4-(trans-4-n-pentyl-4-silacyclohexyl)
cyclohexyl)-1-difluoromethoxy-2,6-difluorobenzene:
22.3%

The liquid crystal mixture with the composition listed
above exhibits the following characteristics:

$T_{NI}$=73° C., $V_{th}$=1.45 V, $\Delta n$=0.077, VHR=99.0 %

[Example 34]

4-(trans-4-(trans-4-n-propyl-4-silacyclohexyl)
cyclohexyl)-1,2-difluorobenzene: 23.0%

4-(trans-4-(trans-4-n-pentyl-4-silacyclohexyl)
cyclohexyl)-1,2-difluorobenzene: 27.0%

4-(trans-4-(trans-4-n-propyl-4-silacyclohexyl)
cyclohexyl)-1-difluoromethoxy-2,6-difluorobenzene:
8.6%

4-(trans-4-(trans-4-n-butyl-4-silacyclohexyl) cyclohexyl)
-1-difluoromethoxy-2,6-difluorobenzene: 12.4 %

4-(trans-4-(trans-4-pentyl-4-silacyclohexyl) cyclohexyl)-
1-difluoromethoxy-2,6-difluorobenzene: 14.0% trans-4-(trans-4-(2-(3,4,5-trifluorophenyl) ethyl)
cyclohexyl)-1-n-propyl-1-silacyclohexane: 10.7% trans-4-(trans-4-(2-(3,4,5-trifluorophenyl) ethyl)
cyclohexyl)-1-n-pentyl-1-silacyclohexane: 4.3%

The liquid crystal mixture with the composition listed
above exhibits the following characteristics:

$T_{NI}$=74° C., $V_{th}$=1.34 V, $\Delta n$=0.076, VHR=99.0 %

[Example 35]

4-(trans-4-n-pentyl-4-silacyclohexyl)-1-
methoxybenzene: 4.6%

4-(trans-4-(trans-4-n-propyl-4-silacyclohexyl)
cyclohexyl)-1,2,6-trifluorobenzene: 8.8%

4-(traps-4-(trans-4-n-pentyl-4-silacyclohexyl)
cyclohexyl)-1,2,6-trifluorobenzene: 4.7

4-(trans-4-(trans-4-n-propyl-4-silacyclohexyl)
cyclohexyl)-1-difluoromethoxy-2,6-difluorobenzene:
11.8%

4-(trans-4-(trans-4-n-butyl-4-silacyclohexyl) cyclohexyl)
-1-difluoromethoxy-2,6-difluorobenzene: 17.0%

4-(trans-4-(trans-4-n-pentyl-4-silacyclohexyl)
cyclohexyl)-1difluoroethoxy-2,6-difluorobenzene:
19.3% trans-4-(trans-4-(2-(3,4-difluorophenyl)ethyl)
cyclohexyl)-1-n-propyl-1-silacyclohexane: 7.8% trans-
4-(trans-4-(2-(3,4-difluorophenyl)ethyl) cyclohexyl)-1-
n-pentyl-1-silacyclohexane: 7.5

4-trans-4-(trans-4-n-propyl-4-silacyclohexyl)-4-
cyclohexanol)-1-trifluoromethoxybenzene: 18.5%

The liquid crystal mixture with the composition listed
above exhibits the following characteristics:

$T_{NI}$=75° C., $V_{th}$=1.50 V, $\Delta n$=0.078, VHR=99.0 %

[Example 36]

4-(Trans-4-n-pentyl-4-silacyclohexyl)-1fluorobenzene:
3.2%

4-(trans-4-n-heptyl-4-silacyclohexyl)-1-fluorobenzene:
1.8%

4-(trans-4-(trans-4-n-propyl-4-silacyclohexyl)
cyclohexyl)-1,2,6-trifluorobenzene: 8.6%

4-(trans-4-(trans-4-n-pentyl-4-silacyclohexyl)
cyclohexyl)-1,2,6-trifluorobenzene: 4.6%

4-(trans-4-(trans-4-n-propyl-4-silacyclohexyl)
cyclohexyl)-1-difluoromethoxy-2,6-difluorobenzene:
10.8%

4-(trans-4-(trans-4-n-butyl-4-silacyclohexyl) cyclohexyl)
-1-difluoromethoxy-2,6-difluorobenzene: 15.6%

4-(trans-4-(trans-4-n-pentyl-4-silacyclohexyl)
cyclohexyl)-1-difluoromethoxy-2,6-difluorobenzene:
17.6% trans-4-(trans-4-(2-(3,4-difluorophenyl)ethyl)
cyclohexyl)-1- n-propyl-1-silacyclohexane: 22.1% trans-4-(trans-4-(2-(3,4-difluorophenyl)ethyl)
cyclohexyl)-1-n-pentyl-1-silacyclohexane: 8.7% trans, trans-4-(4-(4-n-propyl-4-silacyclohexyl)
cyclohexyl)-3',4'-difluorobiphenyl: 2.2% trans, trans-4-(4-(4-n-pentyl-4-silacyclohexyl)
cyclohexyl)-3', 4'-difluorobiphenyl: 4.8%

The liquid crystal mixture with the composition listed
above exhibits the following characteristics:

$T_{NI}$=77° C., $V_{th}$=1.49 V, $\Delta n$=0.083, VHR=98.8 %

[Example 37]

4-(trans-4-(trans-4-n-pentyl-4-silacyclohexyl)
cyclohexyl)-1,2,6-trifluorobenzene: 10.0%

4-(trans-4-(trans-4-n-pentyl-4-silacyclohexyl)
cyclohexyl)-1,2,6-trifluorobenzene: 5.4%

4-(trans-4-(trans-4-n-propyl-4-silacyclohexyl)
cyclohexyl)-1-difluoromethoxy-2,6-difluorobenzene:
8.8%

4-(trans-4-(trans-4-n-butyl-4-silacyclohexyl) cyclohexyl)
-1-difluoromethoxy-2,6-difluorobenzene:

4-(trans-4-(trans-4-n-pentyl-4-silacyclohexyl)
cyclohexyl)-1-difluoromethoxy-2,6-difluorobenzene:
14.3%

4'-(trans-4-n-propyl-4-silacyclohexyl)-3-fluoro-4-
difluoromethoxybiphenyl: 21.8%

4'-(trans-4-n-pentyl-4-silacyclohexyl)-3-fluoro-4-
difluoromethoxybiphenyl: 27.0%

The liquid crystal mixture with the composition listed
above exhibits the following characteristics: a aTah>130

$T_{NI}$=78° C., $V_{th}$=1.20 V, $\Delta n$=0.106, VHR=98.7 %

[Example 38]

4-(trans-4-n-pentyl-4-silacyclohexyl)-1-fluorobenzene:
1.8%

4-(trans-4-n-heptyl-4-silacyclohexyl)-1-fluorobenzene:
1.8%

4-(trans-4-(trans-4-n-propyl-4-silacyclohexyl)
cyclohexyl)-1,2,6-trifluorobenzene: 19.5%

4-(trans-4-4-(trans-4-n-pentyl-4-silacyclohexyl)
cyclohexyl)-1,2,6-tri'trifluorobenzene: 10.5%

4-(trans-4-a(trans-4-n-propyl-4-silacyclohexyl)
cyclohexyl)-1-difluoromethoxy-2,6-difluorobenzene:
9.8%

4-(trans-4-trans-4-n-butyl-a-4-silacyclohexyl)
cyclohexyl)-1-difluoromethoxy-2,6-difluorobenzene:

4-(trans-4-(trans-4-n-pentyl-4-silacyclohexyl)
cyclohexyl)-1-fluoromethoxy-2,6-difluorobenzene:
16.0% 4'-(Trans-4-n-propyl-4-silacyclohexyl)-3,4,
2',6'-tetrafluorobiphenyl: 10.0%

4'-a(trans-4-n-pentyl-4-silacyclohexyl)-3,4, 2',6'-
tetrafluorobiphenyl: 10.0% trans, trans-4-(4-(4-n-
propyl-4-silacyclohexyl) cyclohexyl)-3,4,2',6'-
tetrafluorobiphenyl: 2.5% trans,trans- 4'-(4-(4-n-pentyl-4-silacyclohexyl) cyclohexyl)-3,4,2',6'-tetrafluorobiphenyl: 2.5%

[Example 39]

4-(trans-4-n-pentyl-4-silacyclohexyl)-1-methoxybenzene: 10.8%

4-(trans-4-(trans-4-n-propyl-4-silacyclohexyl) cyclohexyl2)-1- trifluoromethoxybenzene: 29.2%

4-(trans-4-(trans-4-n-propyl-4-silacyclohexyl) cyclohexyl)-1,2,6-trifluorobenzene: 2.6%

4-(trans-4-(trans-4-n-pentyl-4-silacyclohexyl) cyclohexyl)-1,2,6-trifluorobenzene: 1.4%

4-(trans-4-(trans-4-n-propyl-4-silacyclohexyl) cyclohexyl)-1-difluoromethoxy-2,6-difluorobenzene: 1.5%

4-(trans-4-(trans-4-n-butyl-4-silacyclohexyl) cyclohexyl)-1-difluoromethoxy-2,6-difluorobenzene: 2.1%

4-(trans-4-(trans-4-n-pentyl-4-silacyclohexyl) cyclohexyl)-1-difluoromethoxy-2,6-difluorobenzene: 2.4%

4'-(trans-4-n-propyl-4-silacyclohexyl)-2'-fluoro-4-trifluoromethoxybiphenyl: 15.0%

4'-(trans-4-n-propyl-4-silacyclohexyl)-3-fluoro-4-difluoromethoxybiphenyl: 12.4%

4'-(trans-4-n-pentyl-4-silacyclohexyl)-3-fluoro-4-difluoromethoxybiphenyl: 22.6%

The liquid crystal mixture with the composition listed above exhibits the following characteristics:

$T_{NI}$=77° C., $V_{th}$=1.51 V, $\Delta n$=0.108, VHR=98.5 %

[Example 40]

4-(trans-4-n-pentyl-4-silacyclohexyl)-1-methoxybenzene: 4.7%

4-(trans-4-(trans-4-n-propyl-4-silacyclohexyl) cyclohexyl)-1-trifluoromethoxybenzene: 6.3%

4-(trans-4-(trans-4-n-butyl-4-silacyclohexyl) cyclohexyl)-1-trifluoromethoxybenzene: 6.3%

4-(trans-4-(trans-4-n-pentyl-4-silacyclohexyl) cyclohexyl)-1-trifluoromethoxybenzene: 6.3%

4-(trans-4-(trans-4-n-propyl-4-silacyclohexyl) cyclohexyl)-1difluoromethoxy-2,6-difluorobenzene: 11.5%

4-(trans-4-(trans-4-n-butyl-4-silacyclohexyl) cyclohexyl)-1-difluoromethoxy-2,6-difluorobenzene: 16.4%

4-(trans-4-(trans-4-n-pentyl-4-silacyclohexyl) cyclohexyl)-1-difluoromethoxy-2,6-difluorobenzene: 18.5% trans-4-(2-(trans-4-(3,4-difluorophenyl)cyclohexyl) ethyl)-1-n-propyl-1-silacyclohexane: 7.8% trans-4-(2-(trans-4-(3,4-difluorophenyl)cyclohexyl) ethyl)-1-n-pentyl-1-silacyclohexane: 7.5% trans-4-(trans-4-(2-(3,4,5-trifluorophenyl) ethyl) cyclohexyl)-1-n-propyl-1-silacyclohexane: 10.5% trans-4-(trans-4-(2-(3,4,5-trifluorophenyl) ethyl) cyclohexyl)-1-n-pentyl-1-silacyclohexane: 4.2%

The liquid crystal mixture with the composition listed above exhibits the following characteristics:

$T_{NI}$=72° C., $V_{th}$=1.48 V, $\Delta n$=0.079, VHR=99.0 %

[Example 41]

trans-4-(2-(p-ethoxyphenyl)ethyl)-1-n-pentyl1-silacyclohexane: 5.0%

4-(trans-4-(trans-4-n-propyl-4-silacyclohexyl) cyclohexyl)-1,2,6-trifluorobenzene: 9.7%

4-(trans-4-(trans-4-n-pentyl-4-silacyclohexyl) cyclohexyl)-1,2,6-trifluorobenzene: 5.3%

4-(trans-4-(trans-4-n-propyl-4-silacyclohexyl) cyclohexyl)-1-difluoromethoxy-2,6-difluorobenzene: 8.6%

4-(trans-4-4-(trans-4-n-butyl-4-silacyclohexyl) cyclohexyl)-1-difluoromethoxy-2,6-difluorobenzene: 12.4%

4-(trans-4-(trans-4-n-pentyl-4-silacyclohexyl) cyclohexyl)-1-difluoromethoxy-2,6-difluorobenzene: 14.0% trans-4-(trans-4-(2-(3,4-difluorophenyl)ethyl) cyclohexyl)-1-n-propyl-1-silacyclohexane: 7.7% trans-4-(trans-4-(2-(3,4-difluorophenyl)ethyl) cyclohexyl)-1-n-pentyl-1-silacyclohexane: 7.3%

4'-(trans-4-n-propyl-4-silacyclohexyl)-3-fluoro-4-difluoromethoxybiphenyl: 13.4%

4'-(trans-4-n-pentyl-4-silacyclohexyl)-3-fluoro-4-difluoromethoxybiphenyl: 16.6%

The liquid crystal mixture with the composition listed above exhibits the following characteristics:

$T_{NI}$=72° C., $V_{th}$=1.32 V, $\Delta n$=0.091, VHR =98.7%

[Example 42]

trans-4-(2-(p-fluorophenyl)ethyl)-1-n-pentyl-1-silacyclohexane: 2.0% trans-4-(2-(p-fluorophenyl)ethyl)-1-n-heptyl-1-silacyclohexane: 2.0%

4-(trans-4-(trans-4-n-propyl-4-silacyclohexyl) cyclohexyl)-1,2,6-trifluorobenzene: 9.7%

4-(trans-4-(trans-4-n-pentyl-4-silacyclohexyl) cyclohexyl)-1,2,6-trifluorobenzene: 5.3%

4-(trans-4-(trans-4-n-propyl-4-silacyclohexyl) cyclohexyl)-1-difluoromethoxy-2,6-difluorobenzene: 8.6%

4-(trans-4-(trans-4-n-butyl-4-silacyclohexyl) cyclohexyl)-1-difluoromethoxy-2,6-difluorobenzene: 12.4%

4-(trans-4-(trans-4-n-pentyl-4-silacyclohexyl) cyclohexyl)-1-difluoromethoxy-2,6-difluorobenzene: 14.0% trans-4-(trans-4-(2-(3,4-difluorophenyl)ethyl) cyclohexyl)-1-n-propyl-1-silacyclohexane: 5.1% trans-4-(trans-4-(2-(3,4-difluorophenyl)ethyl) cyclohexyl)-1-n-pentyl-1-silacyclohexane: 4.9%

4'-(trans-4-n-propyl-4-silacyclohexyl)-2'-fluoro-4-trifluoromethoxybiphenyl: 13.4%

4'-(trans-4-n-pentyl-4-silacyclohexyl)-2'-fluoro-4-trifluoromethoxybiphenyl: 16.6% trans, trans-4-(4-(4-n-propyl-4-silacyclohexyl) cyclohexyl)-3',4'-difluorobiphenyl: 1.9% trans, trans-4-(4-(4-n-pentyl-4-silacyclohexyl) cyclohexyl)-3',4'-difluorobiphenyl: 4.1%

The liquid crystal mixture with the composition listed above exhibits the following characteristics:

$T_{NI}$=80° C., $V_{th}$=1.38 V $\Delta n$=0.096, VHR=98.6%

[Example 43]

4-(trans-4-(trans-4-n-propyl-4-silacyclohexyl) cyclohexyl)-1,2-difluorobenzene: 20.2%

4-(trans-4-(trans-4-n-pentyl-4-silacyclohexyl) cyclohexyl)-1,2-difluorobenzene: 23.8%

4-(trans-4-(trans-4-n-propyl-4-silacyclohexyl) cyclohexyl)-1,2,6-trifluorobenzene: 8.6%

4-(trans-4-(trans-4-n-pentyl-4-silacyclohexyl) cyclohexyl)-1,2,6-trifluorobenzene: 4.7%

4-(trans-4-(trans-4-n-propyl-4-silacyclohexyl) cyclohexyl)-1-difluoromethoxy-2,6-difluorobenzene: 7.6%

4-(trans-4-(trans-4-n-butyl-4-silacyclohexyl) cyclohexyl)-1-difluoromethoxy-2,6-difluorobenzene: 11.0%

4-(trans-4-(trans-4-n-pentyl-4-silacyclohexyl) cyclohexyl)-1-difluoromethoxy-2,6-difluorobenzene: 12.4%

4-(trans-4-n-pentyl-4-silacyclohexyl) -1-fluorobenzene: 3.0%

4-(trans-4-n-heptyl-4-silacyclohexyl) -1-fluorobenzene: 1.7% trans, trans-4-(4-(4-n-propyl-4-silacyclohexyl) cyclohexyl)-2,6-difluoro-4'-trifluoromethoxybiphenyl: 3.5% trans, trans-4-(4-(4-n-pentyl-4-silacyclohexyl) cyclohexyl)-2,6-difluoro-4'-trifluoromethoxybiphenyl: 3.5%

[Example 44]

4-(trans-4-n-pentyl-4-silacyclohexyl)-1-fluorobenzene: 2.5%

4-(trans-4-n-heptyl-4-silacyclohexyl)-1-fluorobenzene: 1.5%

4-(trans-4-(trans-4-n-propyl-4-silacyclohexyl) cyclohexyl) -1,2,6-trifluorobenzene: 18.6%

4-(trans-4-(trans-4-n-pentyl4-silacyclohexyl) cyclohexyl) -1,2,6-trifluorobenzene: 10.1%

4-(trans-4-(trans-4-n-propyl-4-silacyclohexyl) cyclohexyl)-1-difluoromethoxy-2,6-difluorobenzene: 9.2%

4-(trans-4-(trans-4-n-butyl-4-silacyclohexyl) cyclohexyl) -1-difluoromethoxy-2,6-difluorobenzene: 13.1%

4-(trans-4-(trans-4-n-pentyl-4-silacyclohexyl) cyclohexyl)-1-difluoromethoxy-2,6-difluorobenzene: 15.0% trans-4-(trans-4-(2-(3,4-difluorophenyl)ethyl) cyclohexyl)-1-n-propyl-1-silacyclohexane: 12.2% trans-4-(trans-4-(2-(3,4-difluorophenyl)ethyl) cyclohexyl)-1n-pentyl-1silacyclohexane: 11.8% trans, trans-4-(2-(4-(4-n-propyl-4-silacyclohexyl) cyclohexyl)ethyl)-3',4'-difluorobiphenyl: 3.0% trans, trans-4-(2-(4-(4-n-pentyl-4-silacyclohexyl) cyclohexyl)ethyl)-3',4'-difluorobiphenyl: 3.0%

The liquid crystal mixture with the composition listed above exhibits the following characteristics:

$T_{NI}=73°$ C., $V_{th}=1.43$ V, $\Delta n=0.080$, VHR=98.8%

[Example 45]

4-(trans-4-n-pentyl-4-silacyclohexyl)-1-methoxybenzene: 5.0%

4-(trans-4-(trans-4-n-propyl-4-silacyclohexyl) cyclohexyl)-1-trifluoromethoxybenzene: 13.5%

4-(trans-4-(trans-4-n-propyl-4-silacyclohexyl) cyclohexyl)-1,2,6-trifluorobenzene: 8.6%

4-(trans-4-(trans-4-n-pentyl-4-silacyclohexyl) cyclohexyl)-1,2,6-trifluorobenzene: 4.7%

4-(trans-4-(trans-4-n-propyl-4-silacyclohexyl) cyclohexyl)-1-difluoromethoxy-2,6-difluorobenzene: 11.6%

4-(trans-4-(trans-4-n-butyl-4-silacyclohexyl) cyclohexyl) -1-difluoromethoxy-2,6-difluorobenzene: 16.7%

4-(trans-4-(trans-4-n-pentyl-4-silacyclohexyl) cyclohexyl)-1-difluoromethoxy-2,6-difluorobenzene: 18.8% trans-4-(trans-4-(2-(3,4-difluorophenyl)ethyl) cyclohexyl)-1-n-propyl-1-silacyclohexane: 7.7% trans-4-(trans-4-(2-(3',4-difluorophenyl)ethyl) cyclohexyl)-1-n-pentyl-1-silacyclohexane: 7.4% trans, trans-2'-fluoro-4-(4-n-propyl-4-silacyclohexyl)-4'-(4-n-propylcyclohexyl)biphenyl: 2.0% trans, trans-2'-fluoro-4-(4-n-pentyl-4-silacyclohexyl)-4'-(4-n-propylcyclohexyl)biphenyl: 2.0% trans, trans-2'-fluoro-4-(4-n-pentyl-4-silacyclohexyl)-4'-(4-n-propylcyclohexyl)biphenyl: 2.0%

The liquid crystal mixture with the composition listed above exhibits the following characteristics:

$T_{NI}=83°$ C., $V_{th}=1.54$ V, $\Delta n=0.081$, VHR=98.7%

[Example 46]

4-(trans-4-n-pentyl-4-silacyclohexyl)-1-methoxybenzene: 6.8%

4-(trans-4-(trans-4-n-propyl-4-silacyclohexyl) cyclohexyl)-1-trifluoromethoxybenzene: 18.2%

4-(trans-4-(trans-4-(1-propenyl)-4-silacyclohexyl) cyclohexyl)-1,2,6-trifluorobenzene: 9.0%

4-(trans-4-(trans-4-n-pentyl-4-silacyclohexyl) cyclohexyl)-1,2,6-trifluorobenzene: 6.0%

4-(trans-4-(trans-4-n-propylcyclohexyl)-4-silacyclohexyl)-1-difluoromethoxy-2,6-difluorobenzene: 8.8%

4-(trans-4-(trans-4-n-butyl-4-silacyclohexyl) cyclohexyl) -1-difluoroethoxy-2,6-difluorobenzene: 12.2%

4-(trans-4-(trans-4-(3-methoxypropyl)-4-silacyclohexyl) cyclohexyl)-1-difluoromethoxy-2,6-difluorobenzene: 14.0%

4'-(trans-4-n-propyl-4-silacyclohexyl)-3-fluoro-4-difluoromethoxybiphenyl: 10.0%

4'-(trans-4-(4-fluoropentyl)-4-silacyclohexyl)-3-fluoro-4-difluoromethoxybiphenyl: 15.0%

As described thus far, the liquid crystal composition of the present invention not only has a wide temperature range of the nematic liquid crystal phase, a low viscosity, a fast response time, compatibility between the liquid crystal compounds and stability with regard to moisture, air, light, heat and electric fields, but also has the following features due to the presence of the silacyclohexane ring in the molecular structure:

1) Low threshold voltage for low voltage drive

The liquid crystal composition of the present invention, compared with conventional liquid crystal compositions with the same value of $\Delta \epsilon$, allows reduction of the threshold voltage by introducing silicon even though the $\Delta \epsilon$ is the same.

2) High voltage retaining ratio under harsh environments

The liquid crystal composition of the present invention has a high voltage retaining ratio, 98% or more, even under the high temperature condition of 100° C. It was particularly difficult to have both a low threshold voltage and a high voltage retaining ratio at the same time with conventional liquid crystal materials and one of them had to be somewhat sacrificed. However, the present invention can achieve both of them.

3) Nematic stability a low temperatures, i.e. prevention of the smectic phase or the crystalline phase at low temperatures The liquid crystal composition of the present invention has a wide temperature range of the nematic liquid crystal phase. Introduction of silicon has an effect of expanding the range into a low temperature region and therefore the smectic phase and the crystalline phase at low temperatures are prevented.

4) As for the retardation (dΔn), the Δn is relatively small, 0.93 or less, for using the first minimum.

What is claimed is:

1. A liquid crystal composition comprising one or more types of compounds represented by general formula II:

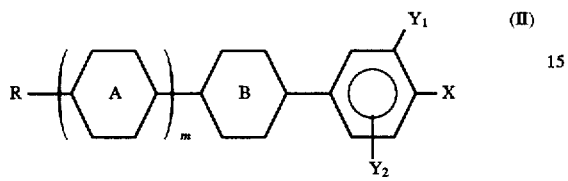

and one or more types of compounds selected from the group consisting of:

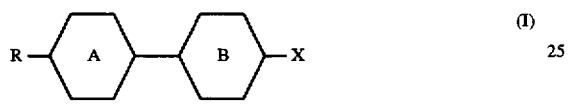

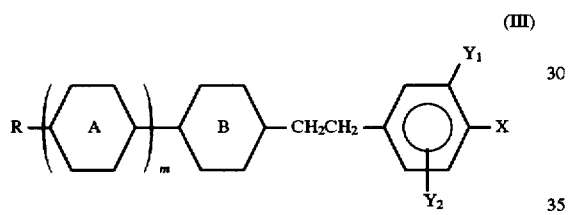

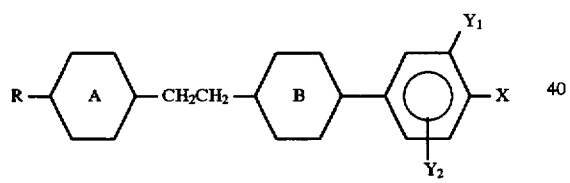

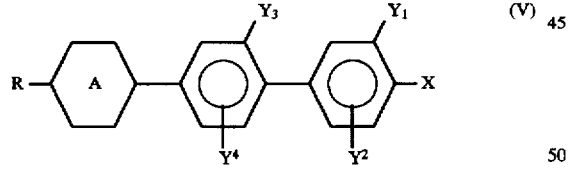

wherein R denotes an alkyl group with 1–7 carbons, an alkoxyalkyl group with 2–7 carbons, a mono- or di-fluoroalkyl group with 2–7 carbons or an alkenyl group with 2–7 carbons;

m denotes 0 or 1:

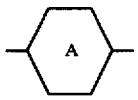

and

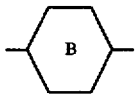

independently denote a trans-1-sila-1,4-cyclohexylene group, a trans-4-sila-1,4-cyclohexylene group or a trans-1,4-cyclohexylene group;

X denotes H, F, Cl, OCHF$_2$, OCF$_3$, CF$_3$, OC$_k$H$_{2k+1}$ (k denotes an integer of 1–5), C$_k$H$_{2k+1}$, (O)$_s$C$_p$H$_q$F$_r$ (p denotes 2, 3 or 4, and q and r are integers which satisfy the equation q+r=2p+1, and s denotes 0 or 1), (O)$_s$CY= CX$_1$X$_2$ (X$_1$ and Y denote H, F or Cl, and X$_2$ denotes F or Cl) or an alkoxy or alkyl group with 5 or less carbons;

Y$_1$, Y$_2$, Y$_3$ and Y$_4$ independently denote H or F; and at least one of the compounds contains a trans-1-sila-1,4-cyclohexylene group or a trans-4-sila-1,4-cyclohexylene group.

2. The liquid crystal composition of claim 1:

wherein said composition comprises one or more types of compounds selected from the group consisting of:

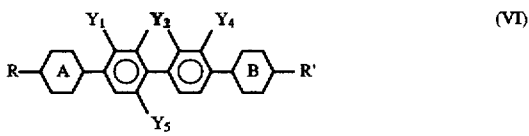

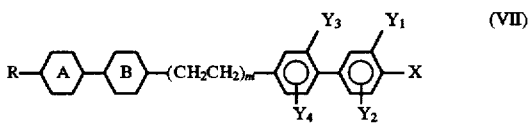

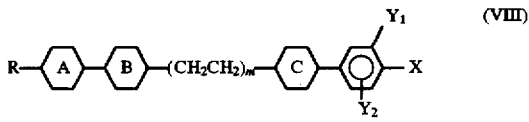

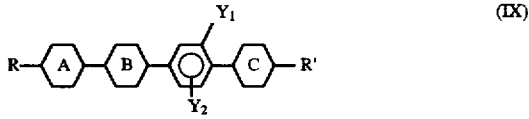

wherein R denotes an alkyl group with 1-7 carbons, an alkoxyalkyl group with 2-7 carbons, a mono- or di-fluoroalkyl group with 2-7 carbons or an alkenyl group with 2-7 carbons;

m denotes 0 or 1;

X denotes H, F, Cl, OCHF$_2$, OCF$_3$, CF$_3$, OC$_k$H$_{2k+1}$ (k denotes an integer of 1-5), C$_k$H$_{2k+1}$, (O)$_s$C$_p$H$_q$F$_r$, (p denotes 2, 3 or 4, and q and r are integers which satisfy the equation q+r=2p+1, and s denotes 0 or 1), (O)$_s$CY= CX$_1$X$_2$ (X$_1$ and Y denote H, F or Cl, and X$_2$ denotes F or Cl) or an alkoxy or alkyl group with 5 or less carbons;

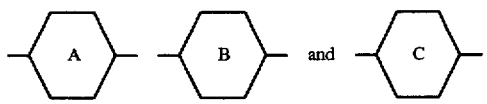

independently denote a trans-1-sila-1,4-cyclohexylene group, a trans-4-sila-1,4-cyclohexylene group or a trans-1,4-cyclohexylene group;

R' is the same as R; and

Y$_1$, Y$_2$, Y$_3$, Y$_4$ and Y$_5$ independently denote H or F.

3. The liquid crystal composition of claim 1; wherein:

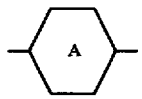

in the formula (V) and

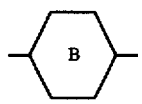

independently denote a trans-1-sila-1,4-cyclohexylene group or a trans-4-sila-1,4-cyclohexylene group when m=0; and at least one of:

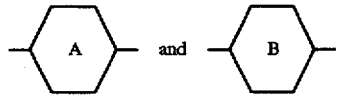

denotes a trans-1-sila-1,4-cyclohexylene group or a trans-4-sila-1,4-cyclohexylene group and the other denotes a trans-1,4-cyclohexylene group, a trans-1-sila-1,4-cyclohexylene group or a trans-4-sila-1,4-cyclohexylene group when m=1.

4. The liquid crystal composition of claim 3:

wherein said composition comprises one or more types of compounds selected from the group consisting of:

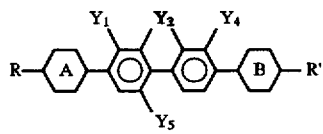
(VI)

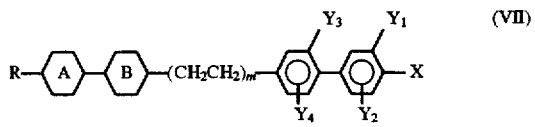
(VII)

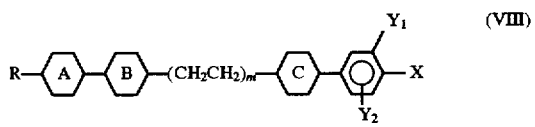
(VIII)

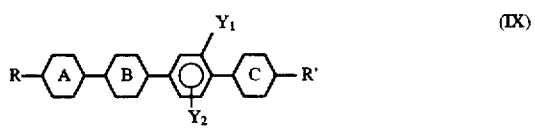
(IX)

wherein R denotes an alkyl group with 1-7 carbons, an alkoxyalkyl group with 2-7 carbons, a mono- or di-fluoroalkyl group with 2-7 carbons or an alkenyl group with 2-7 carbons;

m denotes 0 or 1;

X denotes H, F, Cl, OCHF$_2$, OCF$_3$, CF$_3$, OC$_k$H$_{2k+1}$ (k denotes an integer of 1-5), C$_k$H$_{2k+1}$, (O)$_s$C$_p$H$_q$F$_r$, (p denotes 2, 3 or 4, and q and r are integers which satisfy the equation q+r=2p+1, and s denotes 0 or 1), (O)$_s$CY= CX$_1$X$_2$ (X$_1$ and Y denote H, F or Cl, and X$_2$ denotes F or Cl) or an alkoxy or alkyl group with 5 or less carbons;

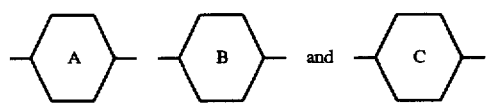

independently denote a trans-1-sila-1,4-cyclohexylene group, a trans-4-sila-1,4-cyclohexylene group or a trans-1,4-cyclohexylene group;

R' is the same as R; and

Y$_1$, Y$_2$, Y$_3$, Y$_4$ and Y$_5$ independently denote H or F.

5. The liquid crystal composition of claim 4:

wherein the blend ratios of one or more types of compounds selected from the group consisting of compounds (I)-(IV) is 70-98 wt % in the composition.

6. A liquid crystal display element which contains the liquid crystal composition of claim 1.

7. A liquid crystal display element which contains the liquid crystal composition of claim 2.

8. A liquid crystal display element which contains the liquid crystal composition of claim 3.

9. A liquid crystal display element which contains the liquid crystal composition of claim 4.

10. A liquid crystal display element which contains the liquid crystal composition of claim 5.

* * * * *